(12) United States Patent
Batchko et al.

(10) Patent No.: US 8,605,361 B2
(45) Date of Patent: Dec. 10, 2013

(54) FLUIDIC LENS WITH REDUCED OPTICAL ABERRATION

(75) Inventors: Robert G. Batchko, Albuquerque, NM (US); Andrei Szilagyi, Danville, CA (US)

(73) Assignee: Holochip Cororation, Albuquerque, NM (US)

( * ) Notice: Subject to any disclaimer, the term of this patent is extended or adjusted under 35 U.S.C. 154(b) by 165 days.

(21) Appl. No.: 13/301,492

(22) Filed: Nov. 21, 2011

(65) Prior Publication Data

US 2012/0063000 A1 Mar. 15, 2012

Related U.S. Application Data

(63) Continuation of application No. 12/706,637, filed on Feb. 16, 2010, now Pat. No. 8,064,142, and a continuation-in-part of application No. 11/383,216, (Continued)

(51) Int. Cl.
*G02B 3/12* (2006.01)
*G02B 1/06* (2006.01)

(52) U.S. Cl.
USPC .......................................... 359/666; 359/665

(58) Field of Classification Search
CPC .......... G02B 3/14; G02B 3/20; G02B 26/004; G02B 26/006
USPC ......... 359/665, 666, 667
See application file for complete search history.

(56) References Cited

U.S. PATENT DOCUMENTS

| 696,788 A | 4/1902 | Allen |
| 2,300,251 A | 10/1942 | Flint |

(Continued)

FOREIGN PATENT DOCUMENTS

| EP | 1925963 | 5/2008 |
| EP | 2034338 | 3/2009 |

(Continued)

OTHER PUBLICATIONS

Final Office Action for U.S. Appl. No. 12/828,192 dated Sep. 14, 2011.

(Continued)

*Primary Examiner* — David N Spector
(74) *Attorney, Agent, or Firm* — Joshua D. Isenberg; JDI Patent

(57) ABSTRACT

A fluidic optical device may include a first optical surface that includes an deformable material and a second optical surface that includes a rigid material. An optical fluid disposed between first and second optical surfaces and an actuator is disposed in communication with first optical surface. Activation of actuator results in a deformation of first optical surface and displacement of optical fluid. The deformation and displacement result in a change in an optical property of the device. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

19 Claims, 49 Drawing Sheets

Related U.S. Application Data

(63) filed on May 14, 2006, now Pat. No. 7,646,544, application No. 13/301,492, which is a continuation-in-part of application No. 11/747,845, filed on May 11, 2007, now Pat. No. 7,672,059, and a continuation-in-part of application No. 11/928,076, filed on Oct. 30, 2007, now Pat. No. 7,706,077, which is a continuation of application No. 11/383,216, filed on May 14, 2006, now Pat. No. 7,646,544, application No. 13/301,492, which is a continuation-in-part of application No. 11/928,216, filed on Oct. 30, 2007, now Pat. No. 7,701,643, which is a continuation of application No. 11/383,216, filed on May 14, 2006, now Pat. No. 7,646,544, application No. 13/301,492, which is a continuation-in-part of application No. 11/928,376, filed on Oct. 30, 2007, now Pat. No. 7,755,840, which is a continuation of application No. 11/383,216, filed on May 14, 2006, now Pat. No. 7,646,544, application No. 13/301,492, which is a continuation-in-part of application No. 12/828,192, filed on Jun. 30, 2010, now abandoned, which is a continuation of application No. 11/928,376, filed on Oct. 30, 2007, now Pat. No. 7,755,840, said application No. 12/706,637 is a continuation-in-part of application No. 12/117,625, filed on May 8, 2008, now Pat. No. 7,697,214, and a continuation-in-part of application No. 11/747,845, filed on May 11, 2007, now Pat. No. 7,672,059, and a continuation-in-part of application No. 11/383,216, filed on May 14, 2006, now Pat. No. 7,646,544, application No. 13/301,492, which is a continuation-in-part of application No. 12/260,502, filed on Oct. 29, 2008, said application No. 12/706,637 is a continuation-in-part of application No. 12/620,503, filed on Nov. 17, 2009, now Pat. No. 8,503,875.

(60) Provisional application No. 61/171,044, filed on Apr. 20, 2009, provisional application No. 60/680,632, filed on May 14, 2005, provisional application No. 60/683,072, filed on May 21, 2005, provisional application No. 60/703,827, filed on Jul. 29, 2005, provisional application No. 60/723,381, filed on Oct. 3, 2005, provisional application No. 60/916,739, filed on May 8, 2007, provisional application No. 61/115,456, filed on Nov. 17, 2008, provisional application No. 61/115,459, filed on Nov. 17, 2008.

(56) References Cited

U.S. PATENT DOCUMENTS

| 2,504,039 | A | 4/1950 | O'Leary |
| 4,261,655 | A | 4/1981 | Honigsbaum |
| 4,444,471 | A | 4/1984 | Ford, Jr. |
| 4,466,706 | A | 8/1984 | Lamothe, II |
| 4,514,048 | A | 4/1985 | Rogers |
| 4,783,155 | A | 11/1988 | Imataki |
| 4,784,479 | A | 11/1988 | Ikemori |
| 4,802,746 | A | 2/1989 | Baba |
| 4,890,903 | A | 1/1990 | Treisman |
| 4,892,396 | A | 1/1990 | Kushibiki |
| 5,138,494 | A | 8/1992 | Kurtin |
| 5,672,001 | A | 9/1997 | Bertling et al. |
| 5,774,273 | A | 6/1998 | Bornhorst |
| 5,973,852 | A | 10/1999 | Task |
| 6,081,388 | A | 6/2000 | Widl |
| 6,288,767 | B1 | 9/2001 | Murata et al. |
| 6,369,954 | B1 | 4/2002 | Berge |
| 6,542,309 | B2 | 4/2003 | Guy |
| 6,618,208 | B1 | 9/2003 | Silver |
| 6,860,601 | B2 | 3/2005 | Shadduck |
| 7,068,439 | B2 | 6/2006 | Esch |
| 7,072,086 | B2 | 7/2006 | Batchko |
| 7,142,369 | B2 | 11/2006 | Wu |
| 7,218,429 | B2 | 5/2007 | Batchko |
| 7,218,430 | B2 | 5/2007 | Batchko |
| 7,359,124 | B1 | 4/2008 | Fang et al. |
| 7,369,321 | B1 | 5/2008 | Ren |
| 7,369,723 | B1 | 5/2008 | Mescher |
| 7,374,301 | B1 | 5/2008 | Simmers |
| 7,440,193 | B2 | 10/2008 | Gunasekaran |
| 7,453,646 | B2 | 11/2008 | Lo |
| 7,612,948 | B2 | 11/2009 | Immink |
| 7,755,840 | B2 | 7/2010 | Batchko |
| 7,813,047 | B2 | 10/2010 | Wang |
| 8,064,142 | B2 | 11/2011 | Batchko |
| 2002/0154380 | A1 | 10/2002 | Gelbart |
| 2004/0082993 | A1 | 4/2004 | Woods |
| 2004/0240076 | A1 | 12/2004 | Silver |
| 2004/0262645 | A1 | 12/2004 | Huff |
| 2005/0030438 | A1 | 2/2005 | Nishioka |
| 2006/0077562 | A1 | 4/2006 | Silver |
| 2006/0126190 | A1 | 6/2006 | Berge |
| 2006/0164731 | A1 | 7/2006 | Wu |
| 2007/0030573 | A1 | 2/2007 | Batchko |
| 2007/0211207 | A1 | 9/2007 | Lo |
| 2007/0263293 | A1 | 11/2007 | Batchko |
| 2008/0144185 | A1 | 6/2008 | Wang |
| 2008/0218873 | A1 | 9/2008 | Batchko |
| 2008/0225379 | A1 | 9/2008 | Mescher |
| 2008/0231963 | A1 | 9/2008 | Batchko |
| 2008/0239503 | A1 | 10/2008 | Conradi et al. |
| 2008/0259463 | A1 | 10/2008 | Shepherd |
| 2008/0285143 | A1 | 11/2008 | Batchko |
| 2009/0021823 | A1 | 1/2009 | Heim |
| 2009/0040361 | A1 | 2/2009 | Heim |
| 2009/0052049 | A1 | 2/2009 | Batchko |
| 2009/0195882 | A1 | 8/2009 | Bolle |
| 2010/0103542 | A1 | 4/2010 | Yasuda |
| 2010/0231783 | A1 | 9/2010 | Bueler |
| 2010/0232161 | A1 | 9/2010 | Aschwanden |
| 2011/0007161 | A1* | 1/2011 | Batchko et al. ............... 348/144 |
| 2013/0176628 | A1* | 7/2013 | Batchko et al. ............... 359/665 |

FOREIGN PATENT DOCUMENTS

| EP | 2238952 | 10/2010 |
| EP | 2239600 | 10/2010 |
| GB | 1327503 | 8/1973 |
| JP | 1166003 | 6/1989 |
| JP | 1166004 | 6/1989 |
| JP | 05303011 | 11/1993 |
| JP | 10144975 | 5/1998 |
| JP | 11133210 | 5/1999 |
| JP | 2000081504 | 3/2000 |
| KR | 1020010094241 | 10/2001 |
| KR | 1020080000577 | 1/2008 |
| WO | 9918456 | 4/1999 |
| WO | 2005096028 | 10/2005 |
| WO | 2008018387 | 2/2008 |
| WO | 2008138010 | 11/2008 |
| WO | 2010015093 | 2/2010 |
| WO | 2010015095 | 2/2010 |
| WO | 2010103037 | 9/2010 |
| WO | 2010104904 | 9/2010 |

OTHER PUBLICATIONS

Final Office Action dated Sep. 17, 2007 for U.S. Appl. No. 12/117,625 entitled "Fluidic Lens With Manually-Adjustable Focus".
Notice of Allowance dated Aug. 13, 2009 for U.S. Appl. No. 11/928,216 entitled "Fluidic Optical Devices".
Notice of Allowance dated Aug. 28, 2009 for U.S. Appl. No. 11/383,216 entitled "Fluidic Optical Devices".
Notice of Allowance dated Jul. 9, 2009 for U.S. Appl. No. 11/747,845 entitled "Fluidic Lens With Electrostatic Actuation".

(56) References Cited

OTHER PUBLICATIONS

Ex Parte Quayle Action dated Aug. 20, 2009 for U.S. Appl. No. 11/928,076 entitled "Fluidic Optical Devices".
Notice of Allowance and Fee(s) Due dated Nov. 16, 2009 issued for U.S. Appl. No. 11/928,076.
Notice of Allowance and Fee(s) Due dated Nov. 20, 2009 issued for U.S. Appl. No. 12/117,625.
Final Office Action dated Jan. 22, 2009 for U.S. Appl. No. 11/383,216, 18 pages.
Notice of Allowance dated Mar. 10, 2009 for U.S. Appl. No. 11/747,845, 8 pages.
Notice of Allowance and Fee(s) Due dated Apr. 23, 2009 for U.S. Appl. No. 11/928,076, 7 pages.
Notice of Allowance and Fee(s) Due dated Apr. 9, 2009 for U.S. Appl. No. 11/393,216, 6 pages.
Office Action dated Apr. 28, 2009 for U.S. Appl. No. 12/117,625, 6 pages.
Office Action dated Mar. 5, 2009 for U.S. Appl. No. 11/928,216.
U.S. Appl. No. 60/916,739 to Robert G. Batchko, et al., filed May 8, 2007.
U.S. Appl. No. 60/680,632 to Robert G. Batchko, et al., filed May 14, 2005.
U.S. Appl. No. 60/683,072 to Robert G. Batchko, et al., filed May 21, 2005.
U.S. Appl. No. 60/703,827 to Robert G. Batchko, et al., filed Jul. 29, 2005.
U.S. Appl. No. 60/723,381 to Robert G. Batchko, et al., filed Oct. 3, 2005.
U.S. Appl. No. 60/747,181 to Robert G. Batchko, et al., filed May 12, 2006.
U.S. Appl. No. 60/395,849 to Robert G. Batchko, entitled "Digital Focus Lens System" filed Jul. 11, 2002.
U.S. Appl. No. 60/242,395 to Robert G. Batchko, entitled "Combinatorial Optics" filed Oct. 20, 2000.
International Search Report and Written Opinion of the International Searching Authority for the international application No. PCT/US08/63107, Aug. 4, 2008, 7 pages.
J. Chen et al.,"Variable—Focusing Microlens with Microfluidic Chip", J. Micromech. Microeng. 14,p. 675-680,2004.
S. Perichon et al. "Stretchable Gold Conductors on Elastomeric Substrate", Applied. Physics. Letter, vol. 82, No. 15, p. 2404-2406, Apr. 14, 2003.
Hongwen Ren et al. "Variable—Focus Liquid Lens by Changing Aperature", Applied Physics Letters, vol. 86, No. 21107, May 17, 2005, p. 211107-3.
International Search Report and Written Opinion of the International Searching Authority dated Aug. 8, 2008—International Patent Application No. PCT/US08/63122, 9 pages.
Office Action dated Jul. 23, 2008 for U.S. Appl. No. 11/747,845, 9 pages.
Office Action dated Oct. 22, 2008 for U.S. Appl. No. 11/928,076, 8 pages.
Office Action dated Jun. 12, 2008 for U.S. Appl. No. 11/383,216, 22 pages.
Office Action dated Sep. 21, 2009 for U.S. Appl. No. 11/928,376.
Notice of Allowance and Fee(s) due dated Feb. 22, 2010 for U.S. Appl. No. 11/928,376.
U.S. Appl. No. 12/828,192, filed Jun. 30, 2010.
Office Action dated Feb. 4, 2011 issued for U.S. Appl. No. 12/828,192.
Notice of Allowance and Fee(s) Due dated Jan. 18, 2011 for U.S. Appl. No. 12/758,751.
Unit—Definition from the Merriam-Webster Online Dictionary , http://www.merriam-webster.com/dictionary / unit, downloaded on Mar. 20, 2009,1 page.
Piston—Definition from the Merriam-Webster Online Dictionary , http:// www.merriam-webster.com/dictionary/piston, dowmloaded on Mar. 19, 2009, 2 pages.
Integral—Definition from the Merriam-Webster Online Dictionary, http:// www.merriam-webster.com/dictionary/integral[1],downloaded on Mar. 17, 2009, 1 page.
U.S. Appl. No. 61/115,456 to Robert G. Batchko, et al., filed Nov. 17, 2008.
U.S. Appl. No. 61/115,459 to Robert G. Batchko, et al., filed Nov. 17, 2008.
PCT International Search Report dated Dec. 24, 2010 for international application No. PCT/US2010/031776.
Office Action dated Feb. 15, 2011 for U.S. Appl. No. 12/706,637.
Notice of Allowance and Fee(s) Due dated Oct. 21, 2013 issued for U.S. Appl. No. 13/113,985.

* cited by examiner

FLUIDIC LENS WITH REDUCED OPTICAL ABERRATION

CLAIM OF PRIORITY

This application is a continuation of and claims the priority benefit of commonly-assigned U.S. patent application Ser. No. 12/706,637, to Robert G. Batchko et al., entitled FLUIDIC LENS WITH REDUCED OPTICAL ABERRATION, filed Feb. 16, 2010, the entire disclosures of which are incorporated herein by reference in their entirety This application is related to and claims the priority benefit of commonly-assigned U.S. Provisional Patent Application No. 61/171,044, to Robert G. Batchko et al., entitled "VARIABLE-FOCAL-LENGTH FLUIDIC LENS WITH REDUCED OPTICAL ABERRATION", filed Apr. 20, 2009 the entire disclosures of which are incorporated herein by reference in their entirety.

This application claims the benefit of priority of the U.S. Provisional Patent Application No. 60/747,181, entitled "ELECTROSTATIC ACTUATION OF FLUIDIC LENS", filed May 12, 2006, which is hereby incorporated by reference. This application is a continuation-in-part of commonly assigned U.S. patent application Ser. No. 11/383,216 entitled "FLUIDIC OPTICAL DEVICE", now U.S. Pat. No. 7,646,544, the contents of which are incorporated herein by reference this application claims the benefit of priority of U.S. patent application Ser. No. 11/383,216 and the benefit of priority of all applications to which U.S. patent application Ser. No. 11/383,216 claims the benefit of priority including U.S. Provisional Patent Application 60/680,632 to Robert G. Batchko et al entitled "FLUIDIC OPTICAL DEVICES", filed May 14, 2005, the entire disclosures of which are incorporated herein by reference, U.S. Provisional Patent Application 60/683,072 to Robert G. Batchko et al entitled "FLUIDIC OPTICAL DEVICES", filed May 21, 2005, the entire disclosures of which are incorporated herein by reference, U.S. Provisional Patent Application 60/703,827 to Robert G. Batchko et al entitled "FLUIDIC OPTICAL DEVICES", filed Jul. 29, 2005, the entire disclosures of which are incorporated herein by reference, U.S. Provisional Patent Application 60/723,381 to Robert G. Batchko et al., filed Oct. 3, 2005, the entire disclosures of which are incorporated herein by reference.

This application is a continuation-in-part of and claims the priority benefit of commonly-assigned U.S. patent application Ser. No. 11/747,845, to Robert G. Batchko et al., entitled "FLUIDIC LENS WITH ELECTROSTATIC ACTUATION", filed May 11, 2007, now U.S. Pat. No. 7,672,059 the entire disclosures of which are incorporated herein by reference in its entirety. U.S. patent application Ser. No. 11/747,845, claims the priority benefit of U.S. patent application Ser. No. 11/383,216.

This application is a continuation-in-part of and claims the priority benefit of commonly-assigned U.S. patent application Ser. No. 11/928,076, now U.S. Pat. No. 7,706,077, to Robert G. Batchko et al., entitled "FLUIDIC OPTICAL DEVICES", filed Oct. 30, 2007, the entire disclosures of which are incorporated herein by reference in their entirety. Application Ser. No. 11/928,076 is a continuation of and claims the priority benefit of U.S. patent application Ser. No. 11/383,216. Application Ser. No. 11/928,076 also claims the priority benefit of U.S. Provisional Patent Applications 60/680,632, 60/683/072, 60/703,827, 60/723,381, and 60/747,181, which have been incorporated herein by reference.

This application is a continuation-in-part of and claims the priority benefit of commonly-assigned U.S. patent application Ser. No. 11/928,216, now U.S. Pat. No. 7,701,643, to Robert G. Batchko et al., entitled "FLUIDIC OPTICAL DEVICES", filed Oct. 30, 2007 as the present application, the entire disclosures of which are incorporated herein by reference in its entirety. Application Ser. No. 11/928,216 is a continuation of and claims the priority benefit of U.S. patent application Ser. No. 11/383,216. Application Ser. No. 11/928, 216 also claims the priority benefit of U.S. Provisional Patent Applications 60/680,632, 60/683/072, 60/703,827, 60/723, 381, and 60/747,181, which have been incorporated herein by reference.

This application is a continuation-in-part of related to and claims the priority benefit of commonly-assigned U.S. patent application Ser. No. 11/928,376, now U.S. Pat. No. 7,755,840 to Robert G. Batchko et al., entitled "FLUIDIC OPTICAL DEVICES", filed Oct. 30, 2007, the entire disclosures of which are incorporated herein by reference in its entirety. Application Ser. No. 11/928,376 is a continuation of and claims the priority benefit of U.S. patent application Ser. No. 11/383,216. Application Ser. No. 11/928,216 also claims the priority benefit of U.S. Patent Provisional Patent Applications 60/680,632, 60/683/072, 60/703,827, 60/723,381, and 60/747,181, which have been incorporated herein by reference.

This application is a continuation-in-part of related to and claims the priority benefit of commonly-assigned U.S. patent application Ser. No. 12/828,192, to Robert G. Batchko et al., entitled "FLUIDIC OPTICAL DEVICES", filed Jun. 30, 2010, the entire disclosures of which are incorporated herein by reference in its entirety. Application Ser. No. 12/828,192 is a continuation of and claims the priority benefit of U.S. patent application Ser. No. 11/928,376, which has been incorporated herein by reference.

This application is a continuation-in-part of and claims the priority benefit of commonly-assigned U.S. patent application Ser. No. 12/117,625, now U.S. Pat. No. 7,697,214 to Robert G. Batchko et al., entitled "FLUIDIC LENS WITH MANUALLY-ADJUSTABLE FOCUS", filed May 8, 2008, the entire disclosures of which are incorporated herein by reference in their entirety. U.S. patent application Ser. No. 12/117,625 is a nonprovsional of U.S. Provisional Patent Application Number 60/916,739, to Robert G. Batchko et al., entitled "FLUIDIC LENS WITH MANUALLY-ADJUSTABLE FOCUS" filed May 8, 2007. Application Ser. No. 12/117,625 is a continuation-in-part of and claims the priority benefit of U.S. patent application Ser. Nos. 11/747,845 and 11/383,216, wherein have been incorporated herein by reference. Application Ser. No. 12/117,625 also claims the priority benefit of U.S. Patent Provisional Patent Applications 60/680, 632, 60/683/072, 60/703,827, 60/723,381, and 60/747,181, which have been incorporated herein by reference.

The present application is also a nonprovsional of U.S. Provisional Patent Application No. 60/916,739, filed May 8, 2007, the entire contents of which are incorporated herein by reference.

This application is a continuation-in-part of and claims the priority benefit of commonly-assigned U.S. patent application Ser. No. 12/260,502, to Robert G. Batchko et al., entitled "FLUIDIC STABILIZED FOCUS DEVICE", filed Nov. 17, 2009, the entire disclosures of which are incorporated herein by reference in its entirety. Application Ser. No. 12/620,502 is a nonprovisional of U.S. Provisional Applications 61/115, 456 and 61/115,459 filed Nov. 17, 2008, the contents of both of which are incorporated herein by reference in their entirety.

This application is related to and claims the priority benefit of commonly-assigned U.S. Provisional Patent Application No. 61/115,456, to Robert G. Batchko et al., entitled "FLUIDIC STABILIZED FOCUS DEVICE", filed Nov. 17, 2008, the entire disclosures of which are incorporated herein by reference in their entirety.

This application is a continuation-in-part of and claims the priority benefit of commonly-assigned U.S. patent application Ser. No. 12/620,503, to Robert G. Batchko et al., entitled "VIEW FINDER WITH FLUIDIC LENS", filed Nov. 17, 2008, the entire disclosures of which are incorporated herein by reference in its entirety. Application Ser. No. 12/620,503 is a nonprovisional of U.S. Provisional Application 61/171,044 and U.S. Provisional Applications 61/115,456 and 61/115,459 filed Nov. 17, 2008, the contents of both of which are incorporated herein by reference in their entirety.

This application is related to and claims the priority benefit of commonly-assigned U.S. Provisional Patent Application No. 61/115,459, to Robert G. Batchko et al., entitled "VIEW FINDER WITH FLUIDIC LENS", filed Nov. 17, 2008, the entire disclosures of which are incorporated herein by reference in their entirety.

FIELD OF THE INVENTION

This invention generally relates to fluidic lens systems and more particularly to fluidic lenses having an elastic membrane.

BACKGROUND OF THE INVENTION

The prior art contains a number of references to fluidic lens systems. A notable example is provided by those based on the electro-wetting effect (see, e.g. Bruno Berge, et al., "Lens with variable focus", PCT Publication No. WO 99/18456). In that system, a lens-like volume of one refractive liquid is separated from its surroundings on at least one side by another immiscible refractive liquid. Although this yields a conveniently compact system, it is difficult to provide enough refractive index difference between the two liquids to provide adequate light-ray bending ability. A refractively superior system has also been demonstrated (see J. Chen et al., J. Micromech. Microeng. 14 (2004) 675-680) wherein only one lenticular body is provided, bounded on at least one side by an optically clear, compliant membrane. In that system, the refractive power of the lens is controlled by pumping in or out a controlled amount of fluid, thereby changing the curvature of the bounding membrane. Although improved, that system still suffers from the disadvantage that the pressurized fluid source is located remotely. This makes the form-factor of the whole system inconvenient.

One type of fluidic lens described, e.g., U.S. Patent Application Publication 20070030573 incorporates a fluid-filled chamber which is capable of squeezing transparent fluid into a lens which is centrally-disposed and includes one or more elastic-membranes. Actuation of the lens is accomplished by pressurization of the fluid. This pressurization, in turn, causes the membranes to bulge, thereby controllably altering the optical power of the lens. The elastic energy of the membranes may provide a restoring force which may counteract the actuation force. Once the actuation force is diminished, the restoring force of the membrane may contribute to the restoration of the membrane to its original or non-actuated state.

The membranes incorporated in fluidic lenses may be typically chosen for their elastic properties. That is, a membrane material having low elastic modulus is often desirable since it may reduce the force required by the actuator. One elastomeric membrane material commonly used in fluidic lenses is polydimethylsiloxane (PDMS) Sylgard 184 manufactured by Dow Corning. This material is used for its optical and mechanical properties. These properties may include its Young's modulus, which can range from about 0.05 to 2 MPa, optical transparency, ease of fabrication and replication of small features and surface wetability.

However, while many of the properties of PDMS and similar elastomers may be desirable in fluidic lenses, the value of the Young's modulus presents an inherent disadvantage for certain applications. As used herein, the word "modulus" may be interpreted to mean "Young's modulus" or "elastic modulus". That is, for a lens having a membrane with a sufficiently low modulus, the lens may be susceptible to disturbances, such as instabilities in focus and tilt due to forces of acceleration, and aberrations, such as coma, which may be due to gravitational forces.

One solution to this problem is to pre-tension, or stretch, the membrane during fabrication of the lens, thereby increasing the "effective modulus" (or "effective stiffness"). However, disadvantages with pre-tensioning the membrane may include a slow long-term relaxation of the membrane that lowers its effective stiffness, sensitivity to small non-uniformities in tension of the membrane resulting in optical aberrations across the dynamic range of the lens, and the possible appearance of bulk defects in the membrane upon tensioning that result in optical scattering. Further, as the lens aperture is increased, the pre-tensioning must generally be increased in order to avoid the effects of acceleration and gravity, thereby increasing the sensitivity of the lens to these undesirable effects. Similarly, as the optical power (i.e., the radius of curvature of the membrane) is increased, the pre-tensioning of the membrane must be increased in order to avoid these effects.

Another inherent disadvantage of PDMS is its permeability, or inability to effectively block the passage of some gases and fluids. Such permeability may result in air bubbles developing in, or fluid leaking out of, the lens. These effects can diminish the durability, lifetime, optical quality, dynamic range and other performance properties of the lens. Some approaches to solving this problem may include coating the PDMS with a high-barrier material or increasing the thickness of the membrane. However, these approaches can result in disadvantageous effects such as increasing the complexity of fabrication, optical scatter and loss, and aberrations.

Thus, there is a need in the art, for a fluidic lens that overcomes the above disadvantages.

BRIEF DESCRIPTION OF THE DRAWINGS

Objects and advantages of the invention will become apparent upon reading the following detailed description and upon reference to the accompanying drawings in which.

DESCRIPTION OF THE SPECIFIC EMBODIMENTS

Figure 1A:
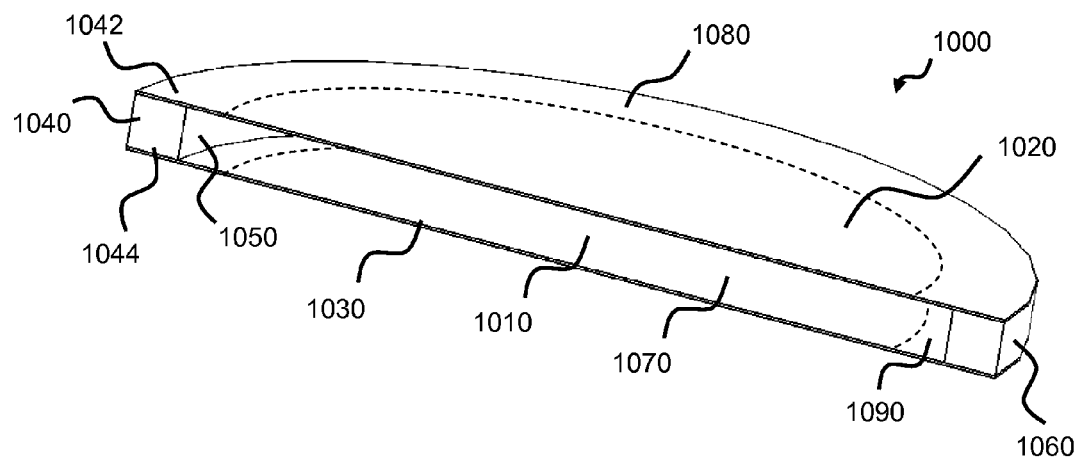
FIG. 1A is a cross-sectional three-dimensional view of a lens member according to an embodiment of the present invention.

FIG. 1A shows a lens member 1000 according to an embodiment of the present invention. A lens chamber 1010 is defined by a first optical surface 1020 and a second optical surface 1030 (also referred to as "optical surfaces 1020, 1030"). Optical surfaces 1020, 1030 may include rigid and/or compliant materials, including elastic membranes, elastic members, elastic thick optical elements and static optical elements. In the present embodiment, optical surfaces 1020, 1030 may include elastic and/or resilient, low elastic modulus, high elastic modulus, low stiffness, or high stiffness membrane material such as elastomer, plastic, semiconductor, crystal, metal, thick glass and thin glass sheets. Further, any of these materials may be pre-tensioned or not pre-tensioned. In the present embodiment, optical surfaces 1020, 1030 may be disposed generally parallel and at a given distance apart (or "separation" or "gap") from each other when lens member 1000 is in a first state of actuation; however, upon transition to a second state of actuation, portions of optical surfaces 1020, 1030 may be allowed to flex (or alter their relative positions) in terms of angle and separation. In other embodiments, optical surfaces 1020, 1030 may be disposed at any relative orientation to each other, such as at any angle, including small angles thereby forming a wedged optical element. Further, in some applications, for example, a plasma lens, one or more of the optical surfaces may be at least partially conductive. Such conductivity may be disposed on either surface (for example, by depositing a conductive coating such as indium tin oxide) or in the bulk of the optical surfaces. In other applications, for example superlenses or cloaking devices, optical surfaces may include metamaterials such as photonic crystals, negative index metamaterials, electromagnetic bandgap metamaterials, left-handed materials, double positive mediums, bi-isotropic and bianisotropic metamaterials, and chiral metamaterials.

A support member 1040 may be provided supporting portions of optical surfaces 1020, 1030. Support member 1040 includes a first support member surface 1042 and a second support member surface 1044. At least a portion of first optical surface 1020 may be in contact with first support member surface 1042, and at least a portion of second optical surface 1030 may be in contact with second support member surface 1044. In a preferred implementation of this embodiment, at least some of the optical surfaces 1020, 1030, support surface 1042, 1044 and support member 1040 may be bonded to each other by any known method including oxygen plasma bonding, thermal bonding, anodic bonding, adhesive bonding; however, any other method may also be employed including clamping or mechanically or physically holding the components in contact by the use of clamps. Further, in other embodiments, at least a portion of optical surfaces 1020, 1030, support member 1040 and support member surfaces 1042, 1044 may be integral, or formed in a single piece or unit by such methods as molding, three-dimensional printing, rapid prototyping, stereolithography and photolithography. As described above, support member 1040 may provide a defined "gap" or distance, and angle, according to which optical surfaces 1020, 1030 may be disposed relative to each other. Support member 1040 may be comprised of at least partially rigid and/or compliant material including elastomer, plastic, glass, semiconductor and metal. In the present embodiment, support member 1040 may be constructed from a relatively compliant material, such as an elastomeric silicone. Support member 1040 includes an inner sidewall support surface 1050 and an outer sidewall support surface 1060

(also referred to as "sidewall support surfaces 1050, 1060"). Support member 1040 may have any shape in terms of its general form, as well as its cross-section. In the present embodiment, support member 1040 may be in the shape of a ring having a substantially square cross-section. However, support member 1040 may alternatively comprise any form of cross-section, including circular, elliptical, rectangular, polygonal, parabolic and other curved shapes.

Chamber 1010 may be at least partially filled with an optical fluid 1070. Optical fluid 1070 may comprise a liquid, gas, gel, plasma or solid and may be chosen for its performance characteristics including optical, mechanical, physical and chemical properties. One or more of optical surfaces 1020, 1030 or fluid 1070 may be at least partially transmissive at desired portions of the electromagnetic spectrum, including the infrared, visible, and ultraviolet portions. For example, fluid 1070 and/or optical surfaces 1020, 1030 may be at least partially transmissive at vacuum wavelengths such as x-rays (0.1 to 10 nm), extreme ultraviolet (or "UV") ($10^{-2}$ to $10^{-1}$ micron), UV C (100 to 280 nm), UV B (280 to 315 nm) UV A (315 to 400 nm), visible (400 to 750 nm), near infrared (750 to 800 nm)), intermediate infrared (800 nm to 10 micron), far infrared (10 to 100 micron), extreme infrared (100 to 1000 micron), or at longer wavelengths such as terahertz waves, microwaves or radio waves.

Support member 1040 may be disposed and function in conjunction with optical surfaces 1020, 1030 to provide a seal for chamber 1010 such that fluid 1070 may be prevented from leaking out of one or more of chamber 1010 or lens member 1000. Lens member 1000 may be considered to comprise the core of a variable optical element such as in the case of the present embodiment, a variable focal length lens. In other embodiments, the variable optical element may comprise a variable prism, variable diffractive optical element, variable diffraction grating, variable holographic optical elements, variable optical filter, and variable optical aperture, stop or shutter. First optical surface 1020 may include a first peripheral region 1080 (with a boundary indicated by dashed lines), and second optical surface 1030 may include a second peripheral region 1090 (with a boundary indicated by dashed lines). Peripheral regions 1080, 1090 may at least partially overlap one or more of the regions of optical surfaces 1020, 1030 where support member 1040 and/or support surfaces 1042, 1044 may be disposed in contact with optical surfaces 1020, 1030.

Figure 1B:
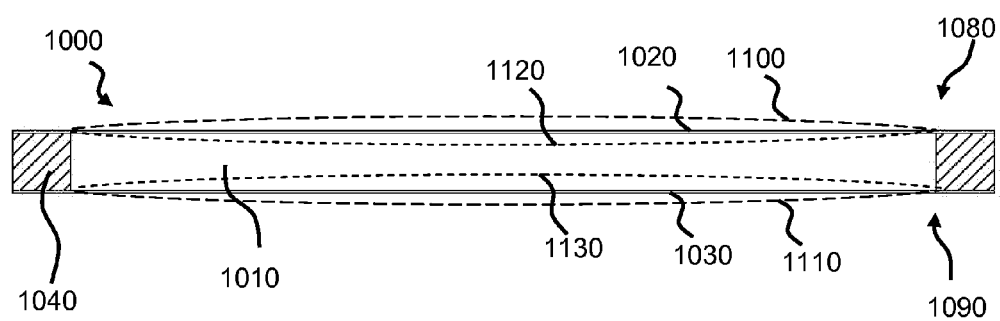
FIG. 1B is a cross-sectional view of a lens member according to an embodiment of the present invention illustrating the deflection of the optical surfaces.

FIG. 1B illustrates the device of FIG. 1A in cross-sectional view. In the present form, the focal length of a variable focal length lens may be adjusted mechanically by external means. Such means may be manual, electronic (or remotely) actuated and may include one or more mechanical interfaces (not shown) which force at least a portion of first optical surface 1020 toward (or away) from that of second optical surface 1030. In some designs, it may be preferable that the mechanical interface (not shown) includes a compliant material which permits the peripheral region of the membranes to change slope, or "pivot". By way of example, peripheral regions 1080, 1090 may be actuated toward each other, and may thereby increase the pressure internal to chamber 1010, resulting in the displacement of at least a portion of the fluid 1070 (not shown) contained in chamber 1010. This increase in pressure may cause at least a portion of optical surfaces 1020, 1030 to deflect away from each other (as indicated by dashed lines 1100, 1110), thereby increasing the optical power of lens member 1000. Likewise, actuating peripheral regions 1080, 1090 so that they are displaced away from each other may decrease the pressure internal to chamber 1010. This decrease in pressure may cause at least a portion of optical surfaces 1020, 1030 to bulge toward each other (as indicated by dashed lines 1120, 1130), thereby decreasing the optical power of lens member 1000.

Figure 1C:
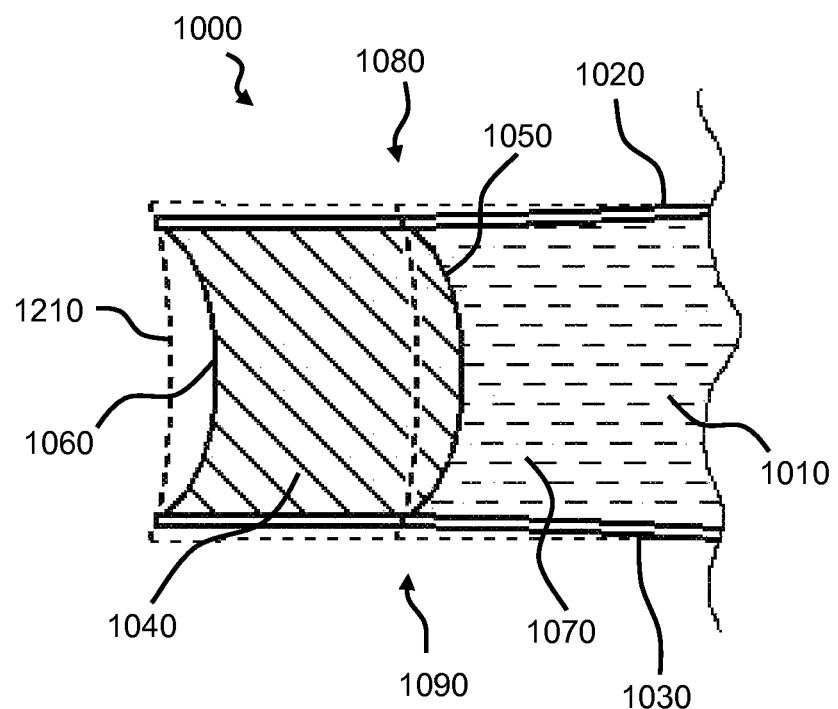
FIG. 1C is a cross-sectional view of a lens member according to an embodiment of the present invention with a support member having curved sidewalls.

FIG. 1C is a cross-sectional view of an alternative embodiment of the present lens member 1000 which provides enhanced actuation. In the present embodiment, support member 1040 may comprise an at least partially compliant ring having an at least partially curved inner sidewall support surface 1050 and/or outer sidewall support surface 1060. As used herein, a structure may be said to be "at least partially compliant" if a portion of the structure is compliant. When lens member 1000 is actuated such that peripheral regions 1080, 1090 may be displaced axially toward or away from each other, the pressure in chamber 1010 changes, resulting in the displacement of fluid 1070 and optical surfaces 1020, 1030 as described above. Additionally, upon actuation of peripheral regions 1080, 1090, support member 1040 may undergo axial compression or tension. This may result in at least a portion of inner sidewall support surface 1050 preferentially bulging radially inward or outward relative to chamber 1010. This deflection of inner sidewall support surface 1050 provides an additional change in pressure in chamber 1010, thereby resulting in an enhanced change in optical power of lens member 1000. Further, at least a portion of sidewall support surfaces 1050, 1060 may comprise a shape which serves to reduce the amount of force required to axially compress or tension support member 1040. For example, in FIG. 1C, outer sidewall support surface 1060 is shown as having a cross-section with curvature that is convex relative to chamber 1010. In this fashion, support member 1040 may require less force in order to achieve a certain amount of compression compared to that of a similar support member 1040 having a straight outer sidewall support surface (as described by dashed lines 1200). In alternative embodiments, surfaces sidewall support surfaces 1050, 1060 may be of any form, including having cross-sections that may be convex, concave, flat (described in dashed lines 1210) or of other curvature relative to chamber 1010.

Figure 2A:
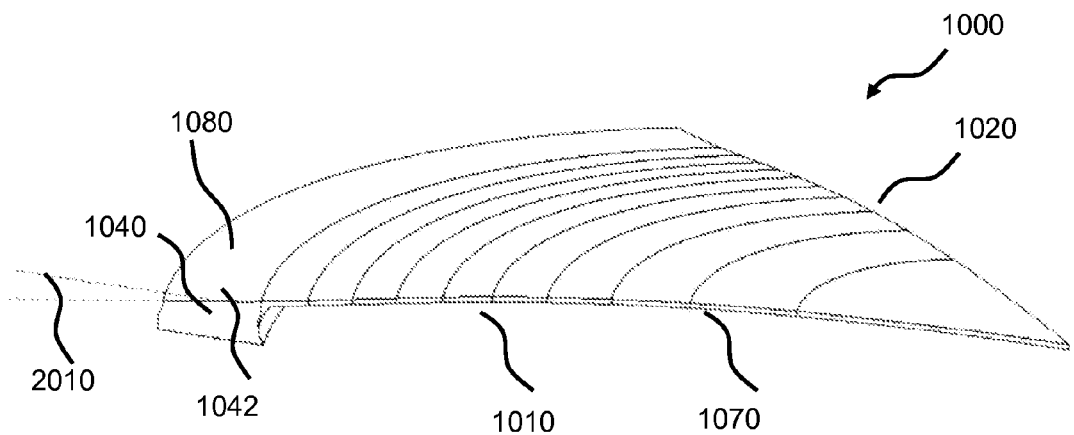
FIG. 2A is a three-dimensional cross-sectional view showing the deflection of an optical surface in combination with a compliant support member.

FIG. 2A shows the lens member 1000, specifically detailing the deflection of first surface 1020 subject to a uniform pressure loading applied by chamber 1010. At least a portion of first surface 1020 and/or first peripheral region 1080 may be in communication with at least a portion of support member 1040 and/or first support surface 1042. In this example, the first optical surface 1020 may be preferably made of a relatively stiff material (i.e., a material with large Young's modulus) such as glass, optical-grade plastic, polymer, film or stretched (or "pre-strained" polymer, plastic or film), but may alternatively be comprised of any material, lamination, or combination of materials that is capable of deforming elastically under pressure. Depending on the magnitude of the pressure, the type of support, the membrane thickness and material properties, the resulting deflection can be substantial and capable of performing well in adaptive optical power applications. Numerous candidate materials are commercially available for use as membranes in optical surfaces 1020, 1030. Examples of such materials include: (a) Aclar®, chlorotrifluoroethylene (CTFE), modulus (machine direction): 1170-1480 MPa, modulus (transverse direction): 1240-1380 MPa, manufactured by Honeywell International, Inc.; (b) APEL™, cyclo-olefin copolymer (COC); manufactured by Mitsui Chemicals, Inc.; (c) TOPAS®, cyclic olefin copolymer (COC), modulus: ~3000 MPa, manufactured by Topas Advanced Polymers, Inc.; (d) Zeonor, cyclo-olefin polymers (COP), manufactured by Zeon Chemicals L.P.; (e) Corning 0211, borosilicate glass, modulus: 74430 MPa, manufactured by Corning, Inc.; and (f) Schott D263 T, modulus: 72900

MPa, borosilicate glass, Schott North America, Inc. By way of example, and not by way of limitation, optical surfaces 1020, 1030 made of glass may have a thickness between 0.001 inch and 0.040 inch.

By way of example, and not by way of limitation, the optical surfaces 1020, 1030 may have an elastic modulus in a suitable range. Examples of suitable ranges include, but are not limited to, 0.1 MPa to 100 GPa, 5 MPa to 1 GPa, 1 GPa to 3 GPa, and 3 GPa to 65 GPa, and 65 GPa to 90 GPa.

An inherent advantage of optical surfaces 1020, 1030 at least partially comprising glass membranes, compared to an elastomeric optical surface or membrane, is the relative immunity of glass membranes to disturbances such as those due to gravitational forces and acceleration. This may be due to the glass having an elastic modulus of about 65 to 90 GPa; an amount greater by about 4 to 5 orders of magnitude than that of a typical silicone elastomeric membrane. This advantage becomes particularly important for large aperture optical components, such as lenses with diameters of about a centimeter or greater.

The greatly increased stiffness of glass membranes also implies a greatly reduced membrane deflection compared to an elastomeric membrane. Nevertheless, as illustrated by way of example in FIG. 2A, application of only about 1 psi excess internal pressure (i.e., in chamber 1010) may cause a 50-μm-thick membrane (i.e., first optical surface 1020) with a diameter of about 15 mm to form a dome with a height of about 210 μm. Such a large displacement may be realized with the commercial availability of such thin glass sheets from manufacturers such as Dow Corning and Schott.

A significant difference between high-stiffness membranes (such as glass) and those having lower stiffness (such as silicone elastomer) relates to the stress-strain (or stress-deformation) characteristics of the materials. Under an applied transverse load (such as a pressure difference applied across the thickness of the membrane), low-stiffness (or low bending stiffness, or low elastic modulus) materials such as PDMS respond (or deform or deflect) elastically, predominantly by stretching. As a result of this stretching, a fluidic lens incorporating a membrane having a low bending stiffness (such as PDMS) can be susceptible to unintentional disturbances such as accelerations not aligned with the optical axis. Notable consequences may include gravity-induced non-uniformities and other non-uniform or asymmetric aberrations. On the other hand, under applied stress (which may correspond to a transverse load), a higher-stiffness membrane (such as glass) responds (or deforms or deflects) predominantly (or substantially) by a bending strain (or responds by bending). As used herein, the response of the membrane is predominantly (or substantially) a macroscopic bending deformation if it is substantially greater than any other deformation, e.g., stretching. Such bending makes a fluidic lens based on a higher-stiffness membrane (such as glass) much less susceptible to non-uniformities thereby improving its optical performance. Due to this bending characteristic, it may be generally desirable to support a stiff membrane in a fashion that allows the radial dimension of its perimeter to change as it bends. Such change in radius may result from an approximate conservation of surface area of a bending membrane. As used herein, the surface area of a bending membrane may be said to be approximately, predominantly or substantially conserved if the difference of the areas before and after application of a deforming load is less than what would be the case for other possible deformations, e.g., stretching, resulting from similar transverse loads. By contrast, a low-stiffness membrane, which can stretch under stress, may typically not conserve surface area. It should be noted that the conventional usage of the term "membrane" typically implies the dominance of stretching deformation. However, in recent years with the advent of MEMS technology, the term "membrane" has been employed even in applications where bending effects may be important. Consequently, as used herein, the term "membrane" encompasses both of these usages of the term. Some examples of techniques for supporting membranes, which may allow radial movement of the membrane perimeter, are discussed below.

In addition to glass and the optical polymers mentioned before, the choice of optical materials may further include other stiff materials in several categories such as amorphous or crystalline, ceramic, semiconductors, insulators, etc. It should be noted that in amorphous materials such as many forms of glass and in ceramics and polycrystals, the elastic properties may be generally isotropic. By incorporating such an isotropic-modulus membrane into a fluidic lens it is possible to reduce or eliminate the introduction of asymmetries in the optical properties of the lens by the deflection of the membrane. For instance, a fluidic lens based on an isotopic-modulus membrane may function as variable-focal-length spherical or aspheric lens. However, in crystals, the elastic constants may behave anisotropically, as may be determined by examination of their tensor form. For a fluidic lens that incorporates such an anisotropic membrane, deflection of the membrane may lead to axial asymmetry in the optical properties of the lens. For instance, such a fluidic lens based on an anisotropic-modulus membrane may function as variable-focal-length anamorphic or astigmatic lens.

The ability to choose a stiff or compliant membrane material, as indicated in certain embodiments of the present invention may be a valuable tool in the hands of the skilled fluidic lens designer. It allows optical power range to be traded against optical quality requirements of the application under consideration. More specifically, a fluidic lens with elastomeric membranes may have large focal power adjustability, although its optical quality may be vulnerable to mechanical disturbances. Conversely, a fluidic lens based on glass or stiff polymer membranes, should have superior optical quality, although its refractive adjustability, or range in focal power, may be reduced.

As described above, first optical surface 1020 may be supported by bonding, molding or clamping it to support member 1040. Support member 1040 may be a ring of rigid or compliant material such as a plastic, polymer or elastomer. In the present embodiment, support member 1040 may be preferably at least partially compliant. Support member 1040 serves to at least partially support or constrain first optical surface 1020 around its perimeter. Additionally, support member 1040 may serve to provide a fluid seal for lens member 1000 to prevent leakage of fluid 1070.

One advantage of a compliant support member 1040 may be that such compliant nature enables it to behave like a hinge. The use of a compliant, or hinge-like, support member 1040 may provide additional advantages to the actuation of the membrane 1010. Such advantages may include an increase in the deflection of the membrane 1010 for a given pressure, and a more spherical shape compared to that associated with a support which is generally more rigid. In this fashion, as support member 1040 undergoes compression or tension due to actuation, at least a portion of first peripheral region 1080 and first optical surface 1020 may be allowed to flex in terms of their angular orientation (as described by dashed lines 2010). In certain embodiments, support member 1040 may be disposed at any radial position relative to the center of optical surfaces 1020, 1030. In certain cases where support member 1040 is disposed near the radial center of optical surfaces 1020, 1030 the hinge functionality of support member 1040 may be substantially reduced compared to the present embodiment where it may be disposed near the outer edges of optical surfaces 1020, 1030 or near peripheral regions 1080, 1090.

Figure 2B:
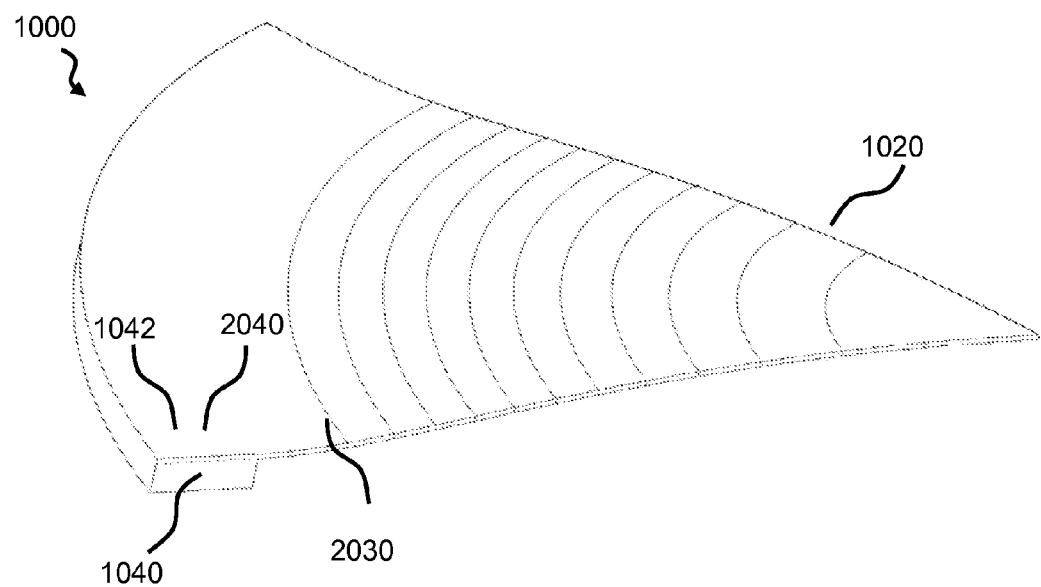
FIG. 2B is a three-dimensional cross-sectional view showing the deflection of an optical surface in combination with a rigid support member.

FIG. 2B shows an alternative embodiment of the present device, specifically illustrating first optical surface 1020 in communication with a rigid support member 1040. In present embodiment, rigid support member 1040 may be dimensionally similar to compliant support member 1040 (see FIG. 2A), however, now support member 1040 may be substantially rigid (i.e., lacking compliance). In the present case, if the same optical surface 1020 is subject to the same pressure but now support member 1040 may be comprised of a substantially rigid material such as rigid polymer, plastic, metal, glass, crystal, silicon or other semiconductor. In this case of a rigid support member 1040, a substantially different deflection profile results compared to that shown in FIG. 2A. As shown FIG. 2B, a rigid support member 1040 restrains the peripheral slope of first optical surface 1020 to be substantially tangent to a rigid upper support surface 1042. One consequence of using a rigid support member 1040 may be that the peak deflection (i.e., height of the dome) of first optical surface 1020 may be reduced. In the present example, this reduction may be nearly a factor of two, from 210 µm in the case of a compliant support member to 114 µm in the present case of a rigid support. Another consequence may be the appearance of a region of the membrane having a curvature of opposite sign to that near the center of the deflection dome (region of negative curvature) 2030. Optically, the region of negative curvature 2030 may be responsible for additional spherical or other aberrations in lens member 1000.

An intermediate layer 2040 may be disposed at least partially between, and serve as an interface for, support member 1040 and first optical surface 1020. Intermediate layer 2040 may be rigid or compliant and provides communication between support member 1040 and first optical surface 1020. One or more of support member 1040, upper support member surface 1042 and first optical surface 1020 may be contacted or fixed to intermediate layer 2040 using any known method including plasma bonding, anodic bonding, clamping, adhesive bonding, molding and forming as a unit. Well known bonding techniques for glass-to-glass bonds include direct anodic and UV-activated adhesive bonding. Bonding either a glass membrane or glass support to a silicone elastomer such as PDMS involves activation of the polymer surface by such methods as oxygen plasma treatment, corona discharge, etc. Intermediate layer 2040 may comprise compliant and bondable material such as a silicone elastomer. Intermediate layer 2040 may be thin, such as on the order of thickness of the first optical surface 1020 (for example, between about 25 and 250 microns). Alternatively, intermediate layer 2040 may be thick, such as on the order of support member 1040 (i.e., or generally greater than about 250 microns. Preferably, the thickness of the intermediate layer 2040 may be small compared to its radial extent; in this fashion, its effect on the profile of first optical surface 1020 may be negligible. While intermediate layer 2040 has been described as serving as an interface between support member 1040 and first optical surface 1020, it is understood that intermediate layer 2040 may be similarly disposed between a support member 1040 which may be at least partially compliant and first optical surface 1020.

Although the following embodiments are described with preference to the use of stiff membranes such as glass, plastic and polymer, it will be understood by those skilled in the art that this does not exclude the use of other membrane materials, such as those of lower modulus.

While FIGS. 2A, 2B describe only first support member surface 1042, first optical surface 1020 and first peripheral region 1080 in conjunction with support member 1040, it is understood that only these elements are specifically illustrated for the purpose of providing a clear description of the present device. Clearly, the above discussion may also apply to one or more of second support member surface 1044, second optical surface 1030 second peripheral region 1090, and a second intermediate layer (not shown) being similarly disposed in conjunction with support member 1040.

Figure 3A:
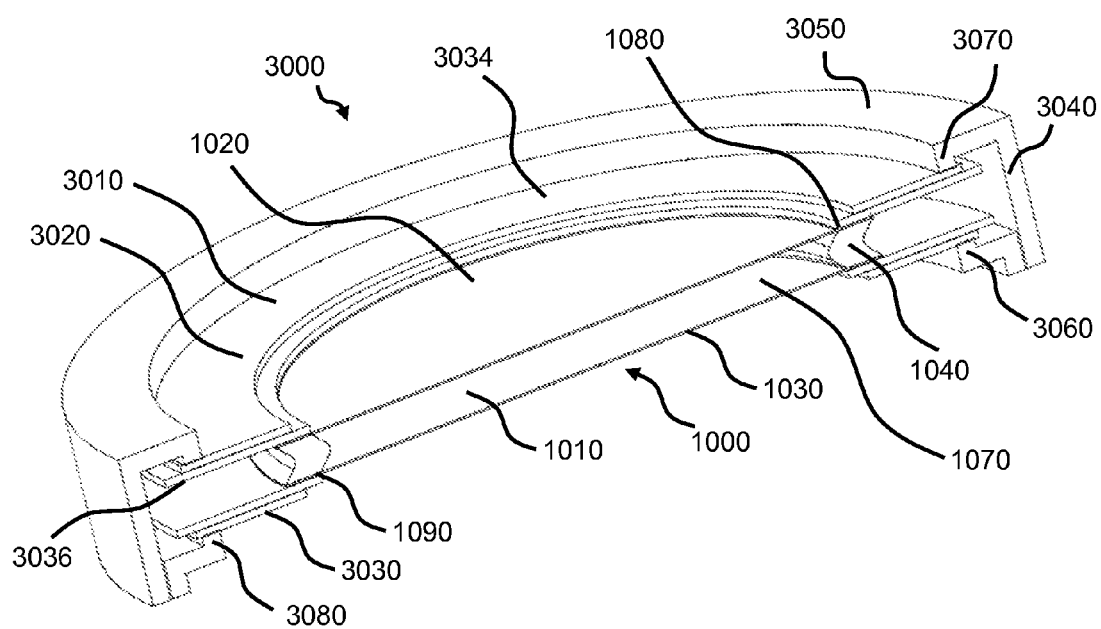
FIG. 3A is a three-dimensional cross-sectional view of a lens system according to an embodiment of the present invention with ring bender actuators and a support member having curved sidewalls.

FIG. 3A shows an embodiment of a device according to an embodiment of the present invention comprising a variable focal length lens system ("lens system") 3000. Lens member 1000 may be disposed in conjunction with an actuator 3010. Actuator 3010 may be in communication with one or more of optical surfaces 1020, 1030 and support member 1040 and serves to apply a mechanical force to chamber 1010, thereby controlling the pressure in chamber 1010. Actuator 3010 may include a first actuator 3020 and a second actuator 3030. In the device depicted in FIG. 3A, actuator 3010 preferably comprises one or more ring bender actuators, however it is understood that actuator 3010 may include any suitable form or actuator, including unimorph and bimorph ring bender actuators, electroded piezoceramic ring actuators, dielectric polymer actuators and electro-active polymer actuators. Actuator 3010 may be similar in construction to common commercially available ring benders.

As it is known in the art, a typical fabricated piezoceramic plate may be characterized by a poling direction, representing the orientation of a preponderance of microscopic dipole moments. In the absence of physical constraints, application of an electric field in the poling direction induces an extension of the material in that direction (i.e., the so-called "$d_{33}$ effect") accompanied by a contraction of the material in the plane perpendicular to the poling direction (i.e., the so-called "$d_{31}$ effect"). Such idealized movements are known in the art as "free strain". More realistically, contact with the physical world introduces restraints which result in conversion of a portion of such strains into internal stresses. Numerous ways are known of harnessing such stresses to the production of useful work. In particular, bonding a poled piezoceramic plate to a passive plate (or "shim") results in a useful structure known as a unimorph bender. In the embodiment depicted in FIG. 3A, similar to typical unimorph ring benders, a piezoceramic ring member 3034 may be bonded to a passive bendable plate member 3036 (i.e., such as a brass or other metal shim). Electrodes on actuator 3010 provide electrical contact to both surfaces of the piezoceramic ring member (i.e., both the surface which is proximal to the bendable plate as well as the exposed surface which is distal to the bendable plate member). Upon the application of voltage across the electrodes, the ring bender acquires a bowed shape of minimal energy, wherein the exposed surface of piezoceramic ring member 3034 acquires an area that is as close as possible to the area associated with its free strain. Other the other hand, the bonded surface of piezoceramic ring member 3034 maintains an area that is as close as possible to its original, undeformed area. Therefore, upon applied voltage, this mismatch in constraint between the two surfaces of piezoceramic ring member 3034 results in a bending (or bowing) of ring bender actuator 3010. Typically, the displacement associated with bending may be large in comparison to the displacement of piezoceramic ring member 3034 due to the piezoelectric free strain alone. Bimorph actuators are similar to unimorph actuators, except that a second piezoceramic ring member may additionally be employed in order to allow the actuator to bend in two opposing directions. Thus, bimorphs may generally be capable of achieving a greater potential amount of bending than unimorphs (which generally may be only capable of bending in a single direction). This potential, however, is frequently not realized, due to increased complexities associated with fabrication, electrical interface and cost.

A housing 3040 provides structural support and an enclosure for lens system 3000. Housing 3040 may include a first housing member 3050 and a second housing member 3060. Housing members 3050, 3060 may comprise a single part or multiple parts which may be held or bonded together by any known technique. Housing 3040 may be disposed in communication with one or more of lens member 1000 and actuator 3010. Preferably, housing 3040 may be disposed in communication with first and second actuators 3020, 3030. In one embodiment of the present device, first and second actuators 3020, 3030 comprise two unimorph-type piezoelectric ring benders. First and second actuators 3020, 3030 may be supported by housing 3040 in a "pre-load" state (i.e., housing 3040 applies a preload force on one or more of first and second actuators 3020, 3030). This pre-load state serves to provide firm and uniform contact by the inside edges of the first and second actuators 3020, 3030 with one or more of peripheral regions 1080, 1090 of lens member 1000. When a suitable voltage signal is applied to one or more of actuator 3010, first and second actuators 3020, 3030 (via electrical connections, not shown), their inside edges communicate an axial compression to lens member 1000, resulting in an adjustment to the focal length of lens member 1000. One or more housing interface supports 3070, 3080 may be disposed on housing 3040 (or housing members 3050, 3060). In the present embodiment, housing interface supports 3070, 3080 may be raised ring-shaped features. Housing interface supports 3070, 3080 serve to provide anchoring (or a mechanical interface) between housing 3040 and actuators 3020, 3030. Additionally, housing interface supports 3070, 3080 may serve to communicate the preload between housing 3040 and actuators 3020, 3030.

Figure 3B:
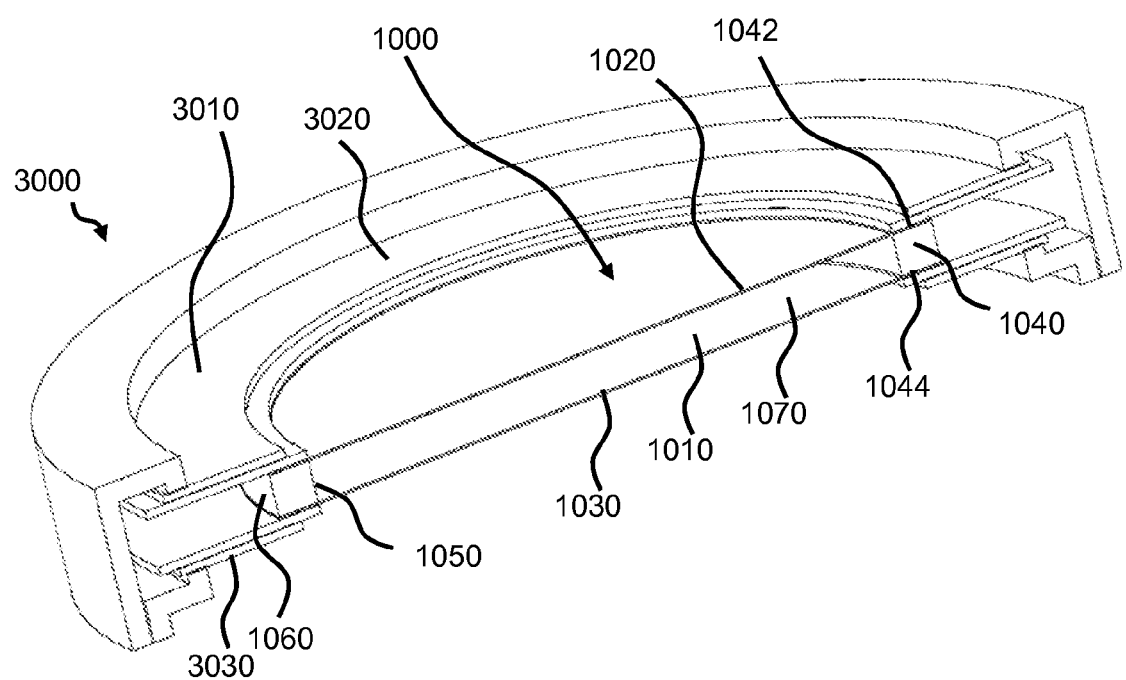
FIG. 3B is a three-dimensional cross-sectional view of a lens system according to an embodiment of the present invention with ring bender actuators and a support member having straight walls.

In the embodiment depicted in FIG. 3A, support member 1040 includes at least partially curved sidewall support surfaces 1050, 1060. FIG. 3B, by contrast, shows an alternative embodiment of the lens system 3000 wherein lens member 1000 includes a support member 1040 having sidewall support surfaces 1050, 1060 with cross sections that may be at least partially straight (or "flat", i.e., corresponding to a cylindrical three-dimensional shape). The shape and composition of one or more of support member 1040, sidewall support surfaces 1050, 1060 and support member surfaces 1042, 1044 may serve to function similar to that of a spring (i.e., support member 1040 provides a restoring force in reaction to force applied by one or more of actuators 3010, 3020, 3030) and thereby balance the preload force applied to actuator 3010. In certain cases, it may be desirable to utilize straight (i.e. cylindrical) sidewall support surfaces 1050, 1060. Such cylindrical sidewall support surfaces 1050, 1060 may serve to increase the force necessary to apply pressure to chamber 1010. For example, one case where straight sidewall support surfaces 1050, 1060 might be desirable may be when the preload state results in a significant force being applied to one or more of actuators 3010, 3020, 3030 and lens member 1000. However, such preload may also have to be balanced by the compliance of the support member 1040 so as to not substantially increase the pressure in chamber 1010. It is understood that, in addition to the restoring force provided by support member 1040 in response to the force applied by actuator 3010, optical surfaces 1020, 1030 may also exert a similar restoring force.

Figure 4A:
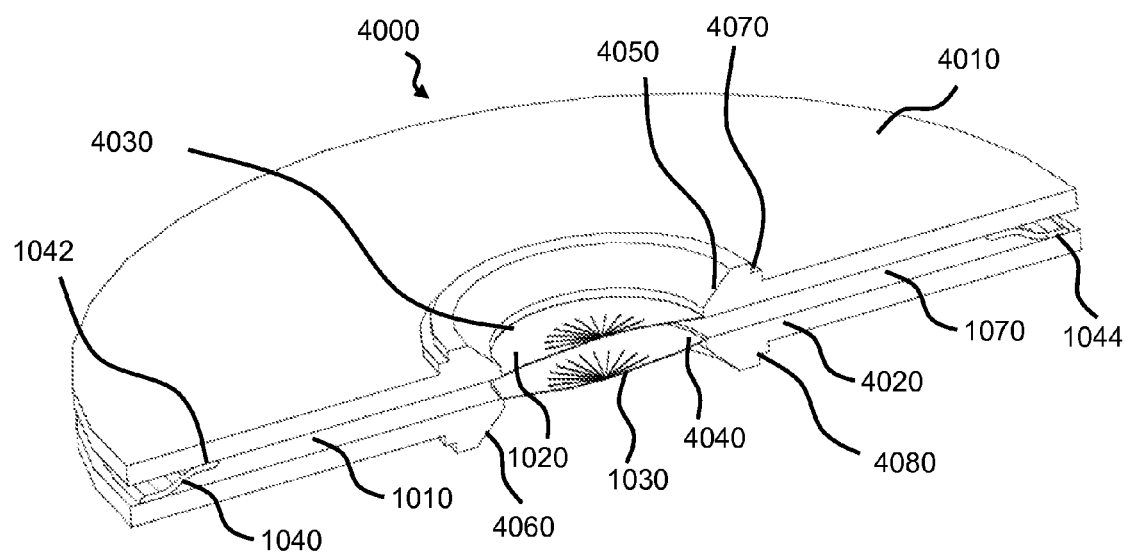
FIG. 4A is a three-dimensional cross-sectional view of a lens member with an s-shaped support member according to an embodiment of the present invention.
Figure 4B:
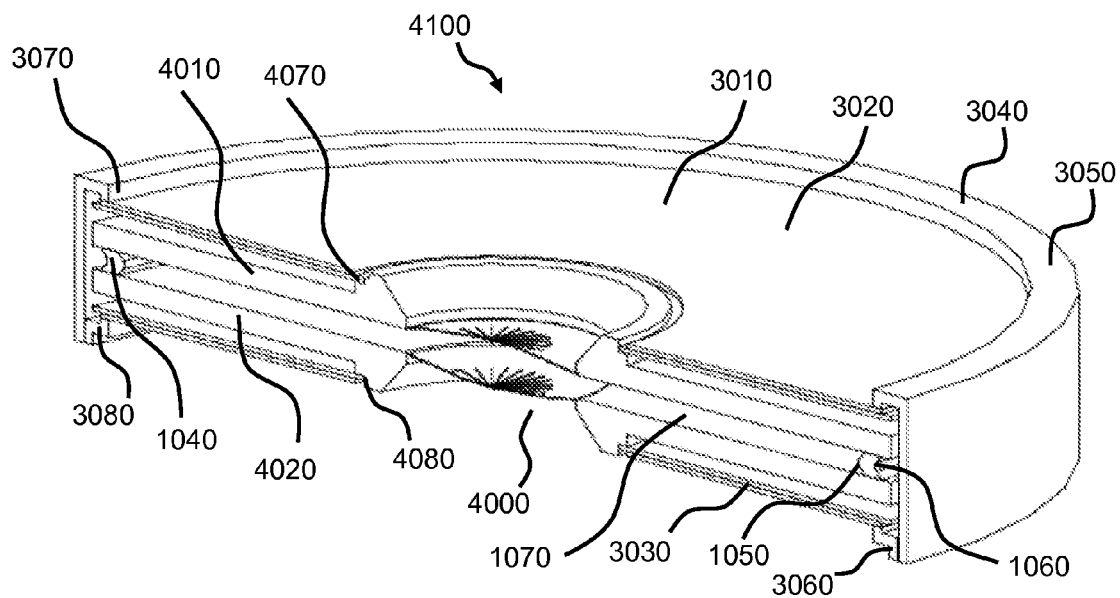
FIG. 4B is a three-dimensional cross-sectional view of a lens system with ring bender actuators and plates according to an embodiment of the present invention.

FIG. 4A shows an alternative embodiment of the present lens member 4000 which includes one or more plate members 4010, 4020 (or "plates" or "first plate 4010" and "second plate 4020") and an s-shaped support member 1040. Plate members 4010, 4020 may be at least partially rigid or compliant. The volume of fluid located between said plate members represents a reservoir capable of delivering or withdrawing liquid into the optically active central region of the device. S-shaped support member 1040 may be comprised of a compliant material, such an elastomer, and formed with an s-shaped cross-sectional profile. Such s-shaped profile serves to increase the compliance of support member 1040, thereby reducing the actuation force required by actuator (actuator is shown in FIG. 4B). Further, such an s-shaped profile may serve to increase the effective radial dimension of chamber 1010 and its fluid reservoir and, hence, increase the change in optical power of lens member 4000. For example, given a fixed amount of compression of chamber 1010 (i.e., a fixed change in the axial dimension of chamber 1010; or a fixed "stroke" of actuator), an increase in the radial dimension of chamber 1010 increases the volume of fluid 1070 that may be displaced in chamber 1010. Since the displacement of fluid 1070 serves to change the curvature of optical surfaces 1020, 1030, an increase in the volume of displaced fluid 1070 increases the change in curvature of optical surfaces 1020, 1030, thereby increasing the change in focal power of lens member 4000.

In the embodiment depicted in FIG. 4A, plate members 4010, 4020 may be substantially circular in shape, however it is understood that they may comprise any shape, including square, rectangular, or any other shape. Specifically, in the present embodiment, plate members 4010, 4020 may be preferably circular annular plates (or disks) having generally thin cross-sectional profile (i.e., wherein the thickness of the plates may be generally smaller than the outer diameter of the plates). In the present embodiment, plate members 4010, 4020 may be rigid material (i.e., any rigid material as described above), however it is understood that they may be compliant or at least partially compliant. Plate members 4010, 4020 may be annular with one or more apertures 4030, 4040 (or, "first aperture 4030" and "second aperture 4040"). Apertures 4030, 4040 may be any shape, including circular, square, rectangular or any other shape. In the present embodiment, apertures 4030, 4040, may be disposed near the axial center of plates 4010, 4020. It is understood that apertures 4030, 4040, may be disposed anywhere on plates 4010, 4020, and in some embodiments, at a position that may be generally radially internal to the location where support member 1040 communicates with plates 4010, 4020. It is yet further understood that there may be more than one aperture 4030, 4040 disposed on each of plates 4010, 4020, such as in the case of an array of variable-focal-length lenses (or microlenses), (see FIG. 4C). Further, apertures 4030, 4040 may include a conical taper (or bevel) 4050, 4060 disposed on the surfaces of plates 4010, 4020 external to chamber 1010. Tapers 4050, 4060 serve to allow light to be received or transmitted by lens member 4000 at an increased angle of incidence to optical surfaces 1020, 1030.

First plate 4010 communicates with first support member surface 1042 and second plate 4020 communicates with second support member surface 1044. Plates 4010, 4020 may be fixed, bonded, adhered, clamped or formed as a single piece with support member 1040 using any technique known and as described above. Intermediate layers (not shown) as described above (see FIG. 2B), may be disposed in communication with one or more of plates 4010, 4020, support member 1040, and support member surfaces 1042, 1044 in order to improve the bonding or to add compliance to support member 1040. In the present embodiment, plate members 4010, 4020 may be generally flat and may be comprised of any at least partially rigid material having any color or optical property. However, in other embodiments, plates 4010, 4020 may have any color, transmission, reflectance, shape, structure, coating or other optical property, allowing them to function as static or dynamic optical elements; such elements may include lenses, mirrors, filters, optical fiber bundles, windows, polarizers, wave plates, optical fiber bundles, gratings, prisms, holographic optical elements, diffractive optics, active or passive shutters (for instance, liquid crystal shutters, or stacks of liquid crystal shutters, may be disposed with a plate that may be composed of a material that may be substantially transparent over a given range of wavelengths), stops, and the like.

First optical surface 1020 may be supported by first plate 4010 and at least partially covers first aperture 4030. Likewise, second optical surface 1030 may be supported by second plate 4020 and at least partially covers second aperture 4040. Preferably, optical surfaces completely cover apertures 4030, 4040, forming a seal to chamber 1010 such that fluid 1070 may be prevented from leaking out of chamber 1010.

One or more plate interface supports 4070, 4080 may be disposed on one or more of plates 4010, 4020. In the present embodiment, plate interface supports 4070, 4080 may be raised ring-shaped features having an external groove (or bevel, or shoulder). Further, plate interface supports 4070, 4080 may be disposed on the surfaces of plates 4010, 4020 proximal to apertures 4030, 4040. Plate interface supports 4070, 4080 serve to provide anchoring (or a mechanical interface) between plates 4010, 4020 and actuators 3020, 3030. Plate interface supports 4070, 4080 additionally serve to communicate a preload between lens member 4000 and actuators 3020, 3030 (see FIG. 4B).

FIG. 4B shows an embodiment of a lens system 4100 which includes lens member 4000 in conjunction with a housing 3040 (which may include housing members 3050, 3060) and actuator 3010 (which may include first actuator 3020 and second actuator 3030). In the embodiment shown in FIG. 4B, support member 1040 includes curved sidewall support surfaces 1050, 1060, however, it is understood that shape sidewall support surfaces 1050, 1060 may be disposed in any shape. First housing interface support 3070 provides a mechanical interface between housing 3040 and the outer perimeter (i.e., the region proximal to the outer diameter) of first actuator 3020. First plate interface support 4070 provides a mechanical interface between first plate 4010 and the inner perimeter (i.e., the region proximal to the inner diameter) of first actuator 3020. Similarly, second housing interface support 3080 provides a mechanical interface between housing 3040 and the outer perimeter (i.e., the region proximal to the outer diameter) of second actuator 3030. Second plate interface support 4080 provides a mechanical interface between second plate 4020 and the inner perimeter (i.e., the region proximal to the inner diameter) of second actuator 3030. In this fashion, a preload may be communicated between housing 3040, lens member 4000 and actuators 3020, 3030.

In the embodiments shown in FIGS. 3A and 3B, fluid 1070 which presses on (or communicates force to) optical surfaces 1020, 1030 may be collected from the volume of chamber 1010 that may be located in the axial shadow of optical surfaces 1020, 1030 themselves. However, a greater amount of fluid 1070 may be displaced for the same actuator stroke if plates 4010, 4020 are employed as shown in the embodiments of FIGS. 4A and 4B. In this fashion, plates 4010, 4020 provide an at least partially rigid annular (and/or radial) extension to optical surfaces 1020, 1030. Therefore, the larger outer diameter of plates 4010, 4020 sweeps a larger volume during the actuator stroke than the smaller diameter of optical surfaces 1020, 1030 alone, thus resulting in a greater potential optical power range for the device. However, the increased optical power must be traded-off against the large lateral footprint of the device. The larger footprint also entails a larger actuation force requirement for a given fluid pressure. The ability to select the size of the reservoir separately from the size of the clear aperture provides a degree of freedom in designing the device for specific applications. In particular, a larger reservoir (hence, the inner diameter of support member 1040) reduces the stroke requirement at the expense of an increase in the force requirement. This dependence allows selection of an actuator design best matched to the load characteristics (i.e., force vs. displacement). Other options open in this embodiment may include (a) replacing one or more of optical surfaces 1020, 1030 with static optical components, and (b) actuating only one of the two optical surfaces 1020, 1030 while the other becomes fixed with respect to housing 3040. The availability of such options can obviously have value in meeting diverse application requirements, such as optical power range, lateral dimensions and cost.

Figure 4C:
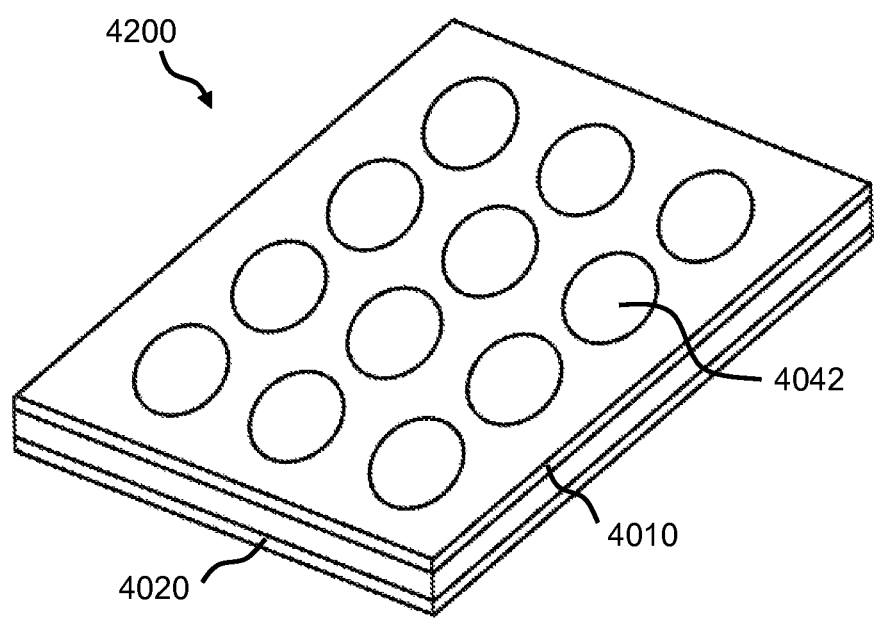
FIG. 4C is a three-dimensional view of a lens member having an array of lenslets according to an embodiment of the present invention.

FIG. 4C shows an example of an embodiment of a lens array system 4200. Lens array system 4200 includes a plurality of apertures 4042 disposed on one or more of plate 4010, 4020 as described previously. Each aperture 4042 has its own pair of optical surfaces (not shown) and thus represents an individual variable-focal length lens (or, "lenslet") in the lens array system 4200. By actuating (or compressing) plates 4010, 4020 in the fashion described previously, apertures 4042 may be substantially actuated in parallel with each other (i.e., the instantaneous focal power of each lenslet may be identical to, or a function of, every other lenslet disposed in lens array system 4200). Plates 4010, 4020 are shown to be rectangular, however, as described previously, they may be disposed in any shape. Such an embodiment may have advantages in applications including Shack-Hartmann wavefront sensors, phased optical arrays, optical pumping of lasers, cameras, display projectors, three-dimensional displays, optical interconnects, wavelength division multiplexing (WDM) optical interfaces, optical networking and chip-to-chip optical interfaces.

Figure 5A:
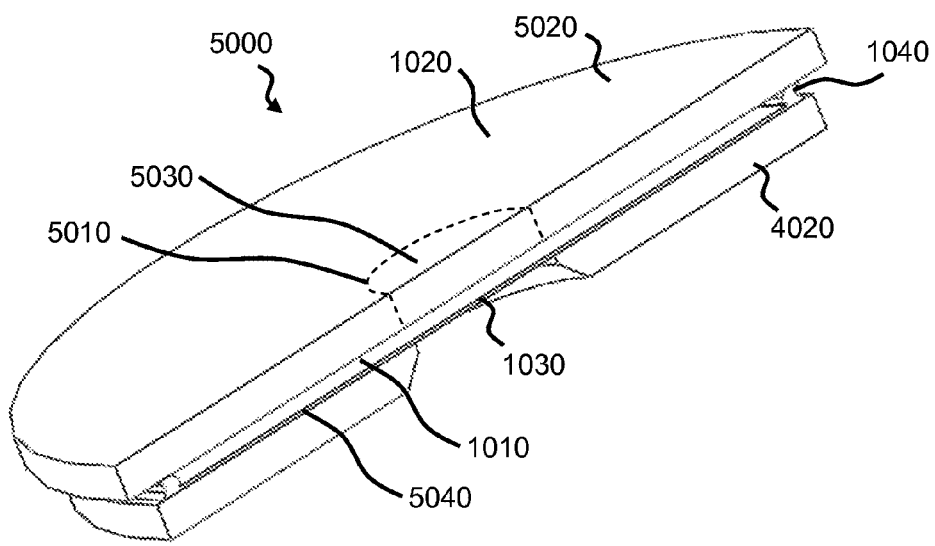
FIG. 5A is a three-dimensional cross-sectional view of a lens member with a plate, an elastomeric optical surface and bonding layer according to an embodiment of the present invention.

FIG. 5A shows the present embodiment of a lens member 5000 wherein first optical surface 1020 may be comprised of a substantially rigid material (such as glass, ceramic, crystal, polymer or plastic) and may be at least partially transparent over a desired range of wavelengths. In this fashion, first optical surface 1020 may be similar to first plate 4010 (see FIG. 4A) (i.e., first optical surface 1020 may be considered to be similar to a first plate 4010 which may be in the form of a continuous disk instead of an annulus, not having an aperture). Preferably, first optical surface 1020 may be at least partially transparent in a region proximal to an aperture (having a boundary described by dashed lines 5010), however, it is understood, that first optical surface 1020 may have any desirable optical property, including, for example, having at least partial reflectivity and functioning similar to that of a mirror. Alternatively, instead of being formed in a single piece, first optical surface 1020 may include a first rigid member 5020 and a second rigid member 5030. In the present embodiment, first rigid member 5020 may be similar to first plate 4010 (see FIG. 4A), and second rigid member 5030 may be a substantially rigid optical surface that may be disposed proximal to an aperture 5010 (described by dashed lines). In the preferred embodiment, a plate 4020 may be disposed in conjunction with a second optical surface 1030. Second optical surface

1030 may be at least partially compliant and may include a membrane comprised of an elastomeric (or other materials such as glass or polymer). Plate 4020 may be at least partially rigid and may form the largest boundaries (i.e., the largest outer diameter) of chamber 1010, however it is understood that plate 4020 may be compliant as well. An at least partially compliant support member 1040 may be provided and may be in communication with one or more of first optical surface 1020, second optical surface 1030 and plate 4020 and serves to provide a compliant separation (or gap) between first optical surface 1020 and plate 4020, and provides a fluid seal to chamber 1010, as previously described.

Variations to the present embodiment may include the following: (a) second rigid member 5030 may be replaced by a compliant (or elastic) membrane (similar to first optical surface described in FIGS. 4A and 4B); (b) a layer member 5040 (such as a thin annular sheet) of elastomer may be bonded to plate 4020; (c) one or more of second optical surface 1030, layer member 5040 and support member 1040 may be molded or formed together in a single piece thereby improving the fluid seal of chamber 1010.

It is understood that any of lens member 1000, first rigid member 5020, second rigid member 5030, first plate 4010, plate 4020, first optical surface 1020, second optical surface 1030, layer member 5040, aperture 5010, and any of the other optical elements described herein may have any desired static or active (i.e., "dynamic" or "adaptive") optical properties and may include optical components such as lenses, mirrors, gratings, holographic optical elements, diffractive optics, prisms, filters, coatings, liquid crystal devices, polymers, glass, metal, plastic, etc. Further, these elements may be at least partially rigid or compliant, and have any shape as desired (for instance, flat, plano-convex, plano-concave, meniscus, aspheric, parabolic, Fresnel, conical, etc.).

Figure 5B:
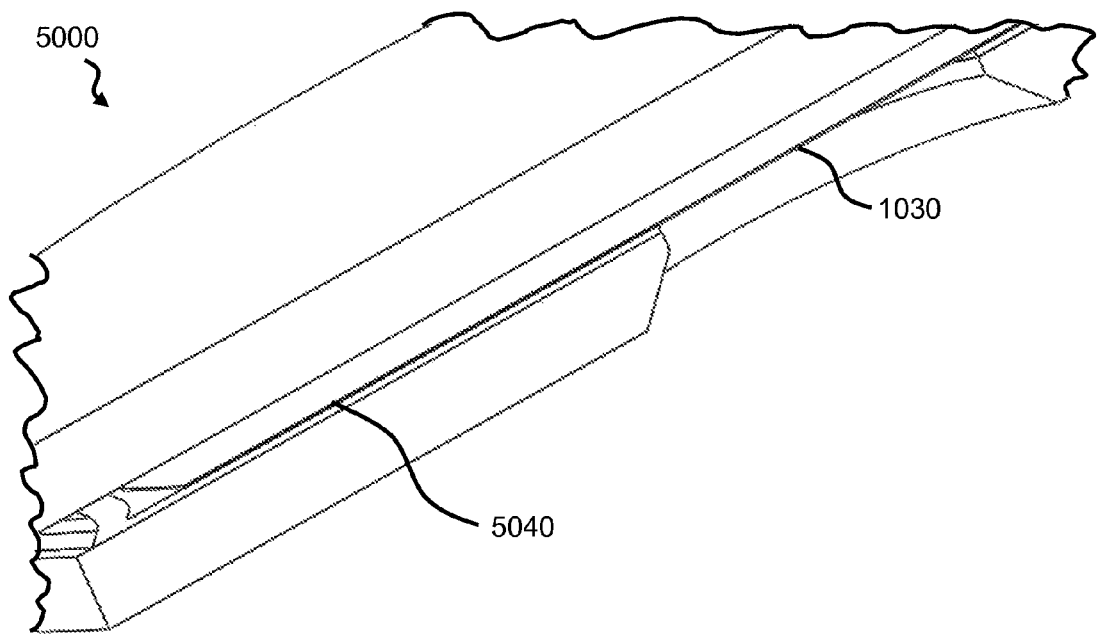
FIG. 5B is a detailed three-dimensional cutaway view of a portion of a lens member with plates and an elastomeric bonding layer securing an optical surface according to an embodiment of the present invention.

FIG. 5B shows an alternative embodiment of the lens member 5000. Second optical surface 1030 may comprise a membrane material having a high modulus such as a thin glass disk (alternatively, other membrane materials may be used such as plastic or tensioned or "pre-strained" elastomer). Layer member 5040 may comprise an annular shape and serve as a bonding layer for second optical surface 1030. This present embodiment affords an additional degree of design freedom, whereby the thickness of layer member 5040 may be adjusted to gradually change the effective boundary conditions of second optical surface 1030 between a rigid support and a compliant, elastic or "hinge-like" support. Clearly, a thick elastomeric bonding layer with good compliance may permit the outer regions of second optical surface 1030 to pivot more readily around an imaginary circular flexible hinge. Such ability of second optical surface 1030 to pivot (or "hinge") may be important when second optical surface 1030 is comprised of materials having very high modulus, such as glass.

Figure 5C:
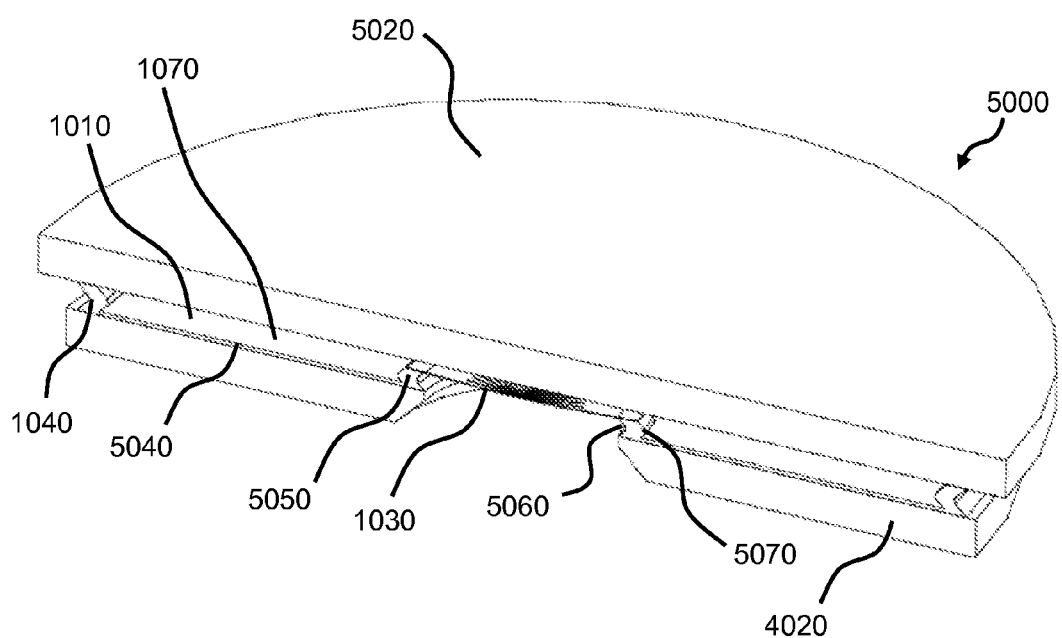
FIG. 5C is a three-dimensional cross-sectional view of a lens member with plates and an optical surface secured to a hinge-like inner support member according to an embodiment of the present invention.

FIG. 5C shows one embodiment of lens member 5000 incorporating such hinge-like support of second optical surface 1030. An optical surface support member (or "inner support member") 5050 may be provided and may be in communication with second optical surface 1030 and plate 4020. Inner support member 5050 may be similar to support member 1040 and may be at least partially compliant and be composed of complaint or elastic materials as previously described. Inner support member 5050 may be fixed, clamped, bonded to, or molded-with one or more of second optical surface 1030, layer member 5040 and plate 4020 by any known techniques as previously described. Further, one or more of inner support member 5050, layer member 5040, plate 4020 and support member 1040 may be formed in a single piece or at least partially in communication with each other using any known technique as previously described. Optical surface sidewall support member surfaces (or "sidewall surfaces") 5060, 5070 preferably have at least partially curved cross-sectional profiles, however it is understood that they may comprise any desired shape. Further, sidewall surfaces 5060, 5070 may be formed in such a fashion that, upon compression, inner support member 5050 urges its radial protrusion farther into chamber 1010 thus resulting in additional displacement of fluid 1070. This additional displacement of fluid 1070 may therefore result in an increase in the change of optical power of lens member 5000. In alternative embodiments, layer member 5040 may be eliminated.

Several advantages of the present embodiment (FIG. 5C) can be understood by following its operation. Upon force applied by actuator (actuator not shown; see actuators 3020, 3030 in FIGS. 4A and 4B), first optical surface 1020 and plate 4020 may be displaced toward each other, resulting in an increase in fluid pressure internal to chamber 1010. This increase in pressure in chamber 1010 results in a force (or hydrostatic force) on second optical surface 1030, causing it to bulge outward (i.e., "outward", or "away", from chamber 1010), thereby changing the optical power of lens member 5000. Further, as second optical surface 1030 bulges, it also applies a compressive force on inner support member 5050. This compression of inner support member 5050 results in a slight displacement of its radial dimension toward the region internal to chamber 1010, also adding to the change in fluid pressure in chamber 1010. Note, in the present embodiment, the compression of inner support member 5050, upon actuation, results in improved fluid seal (or "gasket"), and minimizes the risk of delamination, between one or more of inner support member 5050, second optical surface 1030, plate 4020 and layer member 5040. Yet further, in addition to providing support to second optical surface 1030, the compliance of inner support member 5050 allows the edges of second optical surface 1030 to tilt (or "pivot", or "hinge"), thereby allowing second optical surface 1030 to maintain a more spherical contour and provide reduced optical aberrations.

Figure 5D:
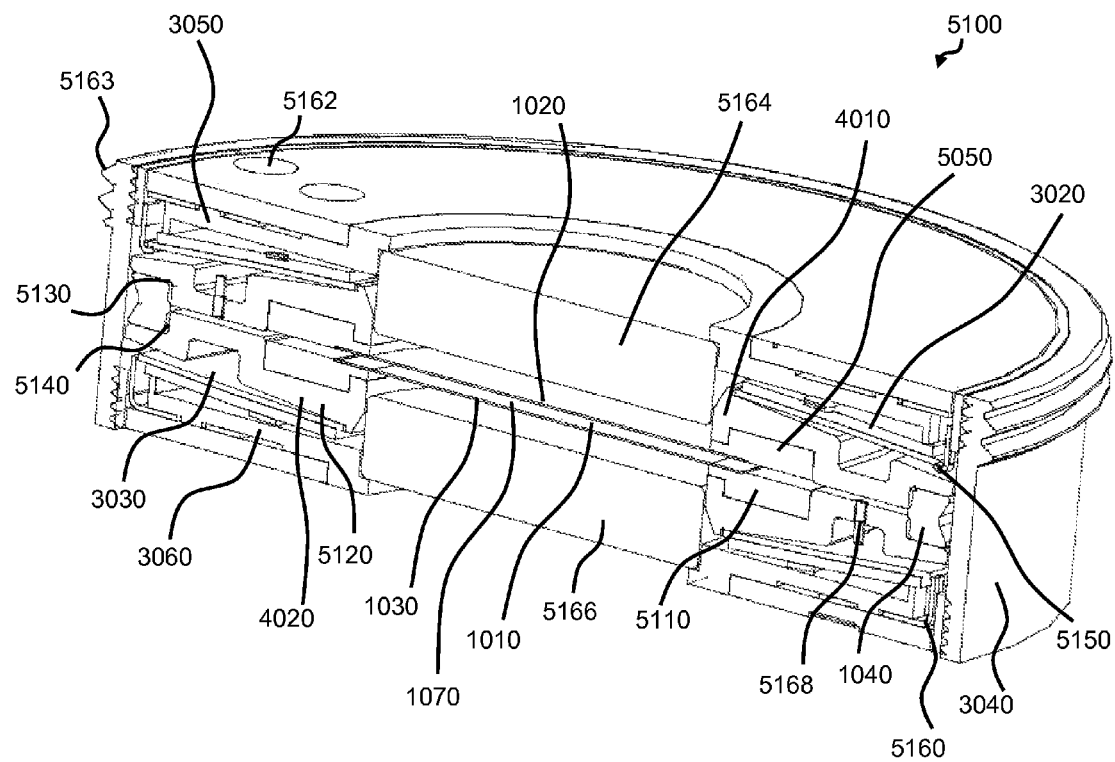
FIG. 5D is a three-dimensional cross-sectional view of a lens system according to an embodiment of the present invention with ring bend actuators, plates and optical surfaces secured to hinge-like inner support members.

FIG. 5D shows an embodiment of a lens system 5100 based on ring-bender actuators and an enhanced support of optical surfaces 1020, 1030. Optical surfaces 1020, 1030 may comprise a membrane material having high modulus (for example, such as glass disks having thickness between 25 and 250 microns). Optical surfaces 1020, 1030 may be in communication with, and supported in a hinge-like fashion by, inner support members 5050, 5110 as previously described. Inner support members 5050, 5110 provide an elastomeric seal to chamber 1010. Preferably, the position of the inner support members 5050, 5110 may be such that increasing the internal pressure in chamber 1010 (i.e., compressing or actuating lens member 5120) results in improving the elastomeric seal as previously described. The outer edge of each of optical surfaces 1020, 1030 may be embedded into its respective inner support member 5050, 5110. Methods of accomplishing such embedding (i.e., embedding units composed of glass, plastic, polymer, metal or other materials in combination with other units composed of similar or dissimilar materials) are well known in the art; one such example is the process of insert molding. Preferably, during the curing process of the elastomer inner support members 5050, 5110, a slight shrinkage of the elastomer may occur. This shrinkage may help create a protective compressive stress which may be then communicated to the edge of the optical surfaces 1020, 1030. This protective compressive stress may help optical surfaces 1020, 1030 achieve an increased resistance to cyclic bending loads that they may encounter during actuation. One or more plate shoulder 5130, 5140 may be disposed in each of plates 4010, 4020. Support member 1040 may be preferably disposed with a slight dimensional interference against one or more of plate shoulders 5130, 5140. Such dimensional interference may take place in one or more of the radial and axial directions of plates 4010, 4020, thereby providing an improvement in the seal of chamber 1010. Preferably, the axial height of the chamber 1010 may be as short as possible without creating excessive viscous drag due to boundary layer effects. In the present embodiment, one or more ring bender actuators 3020, 3030 (or "actuators 3020, 3030") may be disposed and represent a very low profile method of actuation, well matched to the physical foot-print of chamber 1010. Each of ring bender actuators 3020, 3030 may be disposed in communication with one or more actuator electrodes 5150, 5160. A housing 3040 may be disposed and provides support and protection for the internal components of lens system 5100. One or more electrode vias 5162 may be preferably disposed in communication with housing 3040 and provide a passageway for actuator electrodes 5150, 5160 to communicate with drive electronics (not shown) located externally to lens system 5100. One or more windows 5164, 5166 may be disposed and may be preferably in communication with a housing 3040 and provide protection for the internal components of lens system 5100. Housing 3040 may include threaded regions 5163 for fixing lens system 5100 to external components or mounts (not shown). Windows 5164, 5166 may be preferably static optical elements such as optical flats, lenses or mirrors, however, it is understood that that they may include any other static or dynamic, rigid or compliant, optical element as desired. One or more fill-hole-and-plug combinations ("fill-ports-and-plugs") 5168 may be disposed in communication with one or more of plates 4010, 4020. Fill-ports-and-plugs 5168 provide a way to fill chamber 1010 with fluid 1070, and then seal chamber 1010, as understood in the art. Housing members 3050, 3060 may be provided and each may be adjustable in its position relative to housing 3040. Adjustment of the position of housing members 3050, 3060 may be accomplished by tapped and threaded (e.g., screw) interfaces or by other methods understood in the art.

Figure 5E:
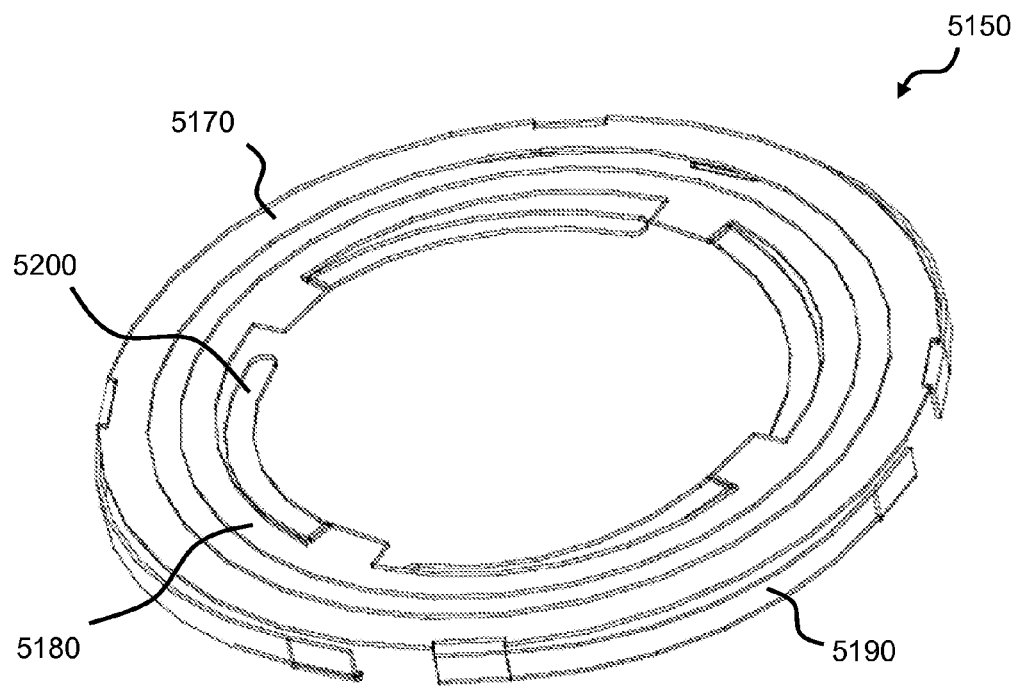
FIG. 5E is a three-dimensional view of a compliant electrode for use with ring bender actuators.

FIG. 5E shows one possible embodiment of actuator electrode 5150 (i.e., one of the pair of actuator electrodes 5150, 5160). Actuator electrodes 5150, 5160 serve to deliver drive voltage to actuators 3020, 3030 (see FIG. 5D). Each of actuator electrodes 5150, 5160 may include a first electrode member 5170 and a second electrode member 5180 (or "electrode members 5170, 5180). Preferably, electrode members 5170, 5180 may be at least partially disposed concentrically with respect to each other, however, other arrangements may be employed as desired. Further, electrode members 5170, 5180 may be preferably electrically isolated from each other and serve to allow proper delivery of drive voltages across each of actuators 3020, 3030 (see FIG. 5D) as understood in the art. First electrode member 5170 includes one or more radial spring contact members 5190 for contacting a first electrode of each of actuators 3020, 3030 (not shown). Likewise, second electrode member 5180 includes one or more axial spring contact members 5200 for contacting a second electrode of each of actuators 3020, 3030 (not shown). In the present embodiment, actuators 3020, 3030 preferably may include unimorph ring benders. However, as understood in the art, bimorph benders or other types of actuators may be employed. In the case of bimorph benders, multiple electrode members 5170, 5180, or electrodes having any number of isolated, or non-isolated, contact members may be employed as necessary for delivering the proper voltages to actuators 3020, 3030. Preferably, electrode members 5170, 5180 may be disposed in a fashion such that they may each be conveniently accessible from the same side of their respective actuator 3020, 3030. Further, at least a portion of electrode members 5170, 5180, radial spring contact members 5190 and axial spring contact members 5200 may be at least partially resilient such that they may provide electrical contact to actuators 3020, 3030 while not presenting an unduly large parasitic mechanical load to actuators 3020, 3030.

Figure 5F:
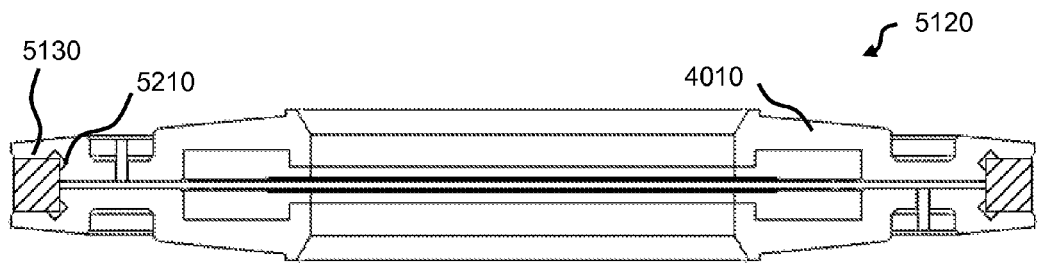
FIG. 5F is a cross-sectional view of a lens member having plate shoulders with recessed corners.

FIG. 5F shows an alternative embodiment of lens member 5120. In the embodiment depicted in FIG. 5F, rigid plate 4010 includes a recessed corner 5210 disposed in communication with plate shoulder 5130.

Figure 5G:
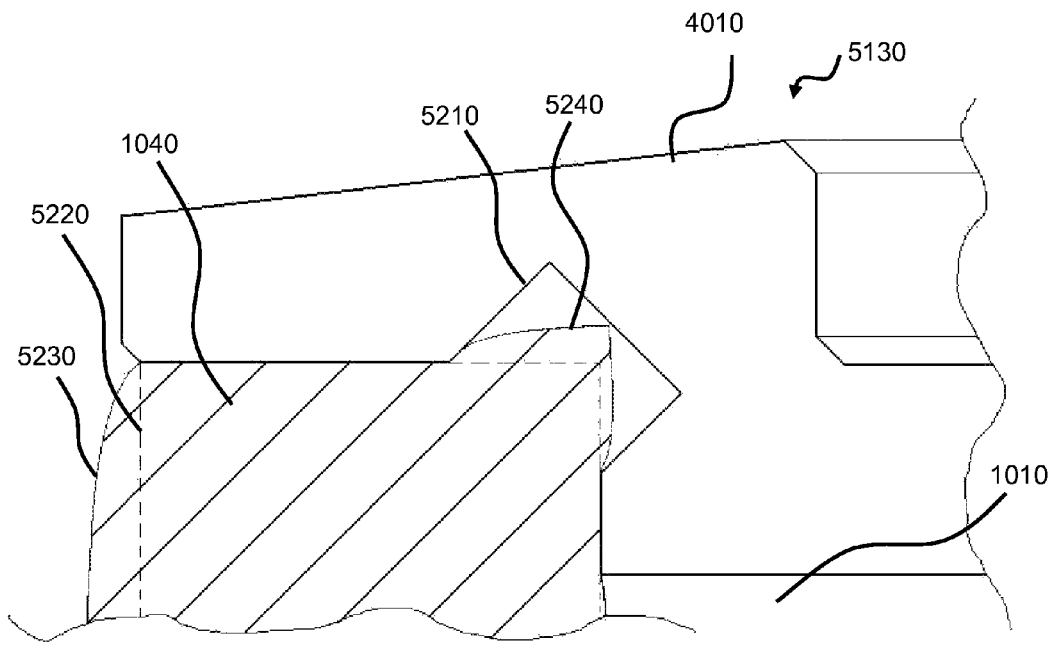
FIG. 5G is a detailed cross-sectional view of a plate shoulder with recessed corner providing increased friction for support member.

FIG. 5G shows a detailed view of the present embodiment of plate shoulder 5130. Support member 1040 may be disposed in communication with plate shoulder 5130. Upon compression, the increase in pressure in chamber 1010 (as described previously) may result in a pressure being applied in the radial direction to support member 1040. Such pressure may result in a force acting on support member 1040, tending to move it out of its position (i.e., or weaken its bond) with respect to plate shoulder 5130. A recessed corner 5210 may be disposed in communication with plate shoulder 5130. Recessed corner 5210 may take the shape of a square notch or groove, or any other desirable shape. Further, any number of recessed corners 5210 may be disposed at any desirable location in the proximity of plate shoulder 5130. The "non-actuated state" of support member 1040 (i.e., the state of support member 1040 when it is substantially not under compression or "not squeezed") is described by dashed lines 5220. The "actuated state" of support member 1040 (i.e., the state of support member 1040 when it is under compression) is described by solid lines 5230. Under compression, at least a portion of support member 1040 may expand into the space of recessed corner 5210 (i.e., "expanded-portion-of-support-member 5240"). In this fashion, expanded-portion-of-support-member 5240 may serve to create additional friction between support member 1040 and plate shoulder 5130. This increase in friction may serve to counteract the force due to compression, thereby helping to prevent support member 1040 from being forced out of its position in plate shoulder 5130. It is understood that one or more of plate shoulder 5130, support member 1040, recessed corner shoulder and rigid plate 4010 may take other alternative shapes similarly helping to fix support member 1040 in its position. For instance, the plate shoulder 5130 may have its contact area with support member 1040 sloped (slope not shown). The introduction of such a slope may have two beneficial consequences: (i) The effective stiffness of the support member 1040 may be reduced by localizing the applied axial force over an (initially) reduced contact area, and (ii) establishment of a radial pressure gradient (decreasing radially inward) may further improve the ability of the design to prevent leaks by effectively driving the support member 1040 toward the center. It is also understood that in other embodiments, the force applied to support member 1040 may, in addition to compression, include tension, shear, volumetric and other types of force. For example, the actuator may be configured to apply a tensile force in such a fashion that the separation between plates 4010, 4020 may be increased thereby creating a decrease in pressure in chamber 1010 and causing one or more of optical surfaces 1020, 1030 to deflect inward toward chamber 1010 in a concave fashion. Just as recessed corner 5210 may be provided for helping to secure support member 1040 under compressive force, additional features (not shown) may be incorporated in one or more of plates 4010, 4020 or support member 1040 to aid in securing support member 1040 upon the application of tensile force.

Figure 5H:
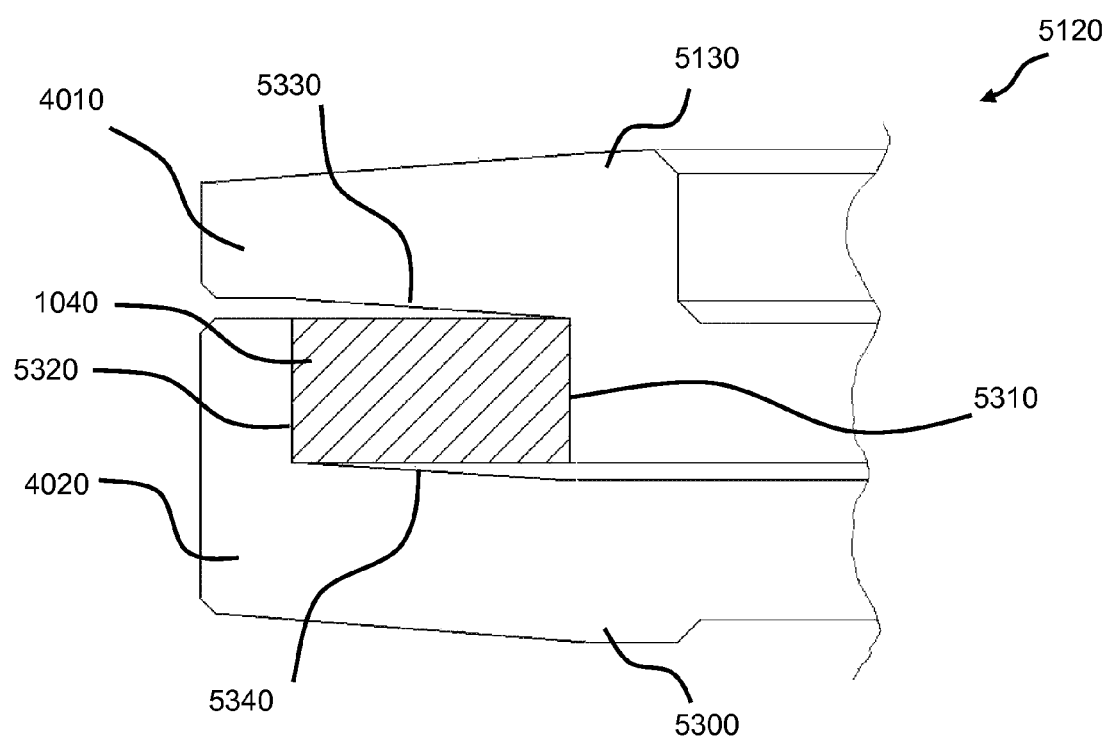
FIG. 5H is a detailed cross-sectional view of a plate shoulder with sloped surfaces in a non-actuated configuration.
Figure 5I:
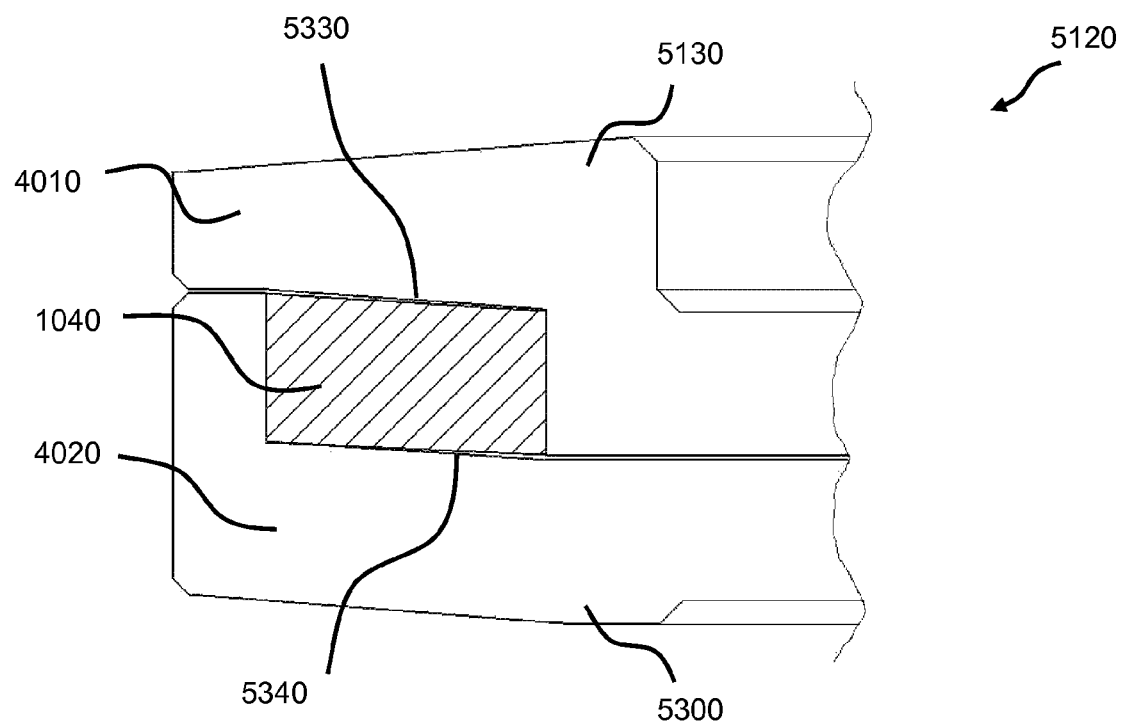
FIG. 5I is a detailed cross-sectional view of a plate shoulder with sloped surfaces in an actuated configuration illustrating shear strain deformation of a support member.

FIGS. 5H and 5I show two configurations of an alternative embodiment of the lens member 5120 wherein portions of the plates 4010, 4020, support member 1040 and plate shoulders 5130, 5300 may be adapted for the application of a shear stress to support member. In some cases, it may be undesirable to apply only compressive and/or tensile stress to the support member 1040. For example, the amount of force required to compress support member 1040 such that lens member 5120 alters its focal power by a given amount of diopters might exceed the capability of the actuator (e.g., the effective stiffness of the support member 1040 may be too great). In such case, it may be beneficial to configure lens member 5120 such that a shear stress may be applied to support member 1040, thereby reducing the effective stiffness of support member 1040 and, thus, reducing the amount of force required by the actuator in order to deliver the desired change in diopters to lens member 5120. FIG. 5H shows a first (for example, "non-actuated") configuration of lens member 5120 which has been adapted for applying a shear stress to support member 1040. First plate 4010 may be fixed to (or in communication with) support member 1040 on first surface 5310. Likewise, second plate 4020 may be fixed to (or in communication with) support member 1040 on second surface 5320. First plate shoulder 5130 may include a first sloped surface 5330. Similarly, second plate shoulder 5300 may include a second sloped surface 5340. Sloped surfaces 5330, 5340 may be provided in order to accommodate a shear-strain deformation that support member 1040 may undergo upon actuation.

FIG. 5I shows a second (for example, "actuated") configuration of lens member 5120 which has been adapted for applying a shear stress to support member 1040. Upon actuation, plates 4010, 4020 may be brought closer together. Actuation of plates 4010, 4020 results in support member 1040 undergoing a shear stress. The resulting shear strain deformation of support member 1040 may be such that portions of support member 1040 may be displaced into the regions of plate shoulders 5130, 5300 provided by sloped surfaces 5330, 5340. Upon the removal of actuation force, the resilience of support member 1040, or various elements of lens member 5120 including but not limited to the optical surfaces or inner support members (not shown), may cause lens member 5120 to return to its non-actuated configuration wherein the shear strain or other strain (i.e, compressive, tensile, volumetric or other strain) on support member 1040 may partially or completely removed.

Figure 5J:
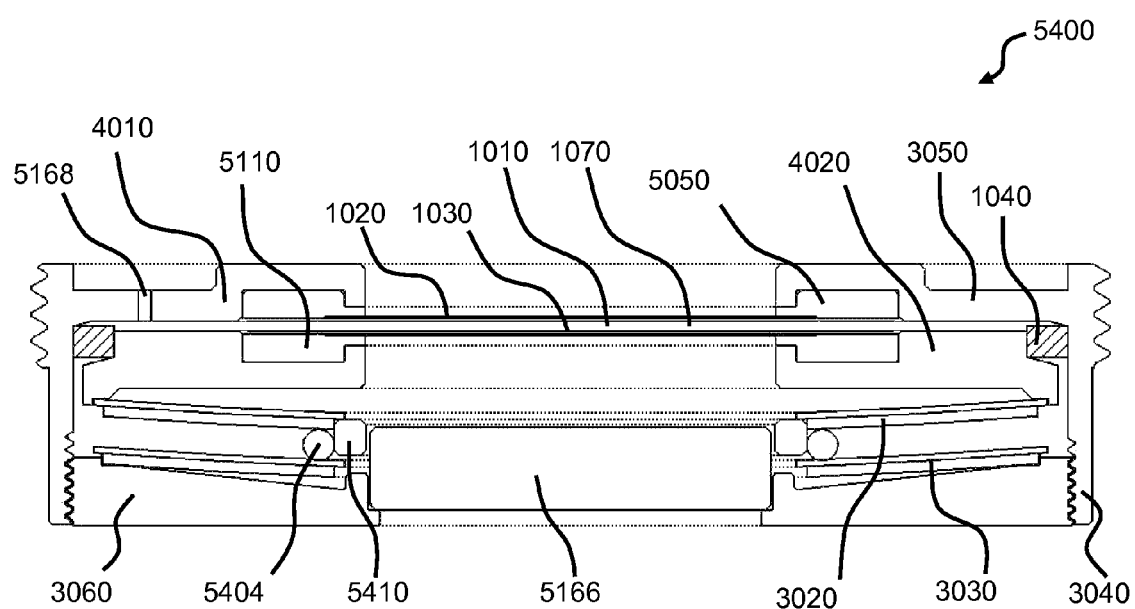
FIG. 5J is a cross-sectional view of a lens system according to an embodiment of the present invention with ring bend actuators disposed in a unilateral configuration and support member and plates disposed in a shear-strain configuration.

FIG. 5J shows an embodiment of the present lens system 5400 wherein actuators 3020, 3030 may be disposed in a unilateral fashion relative to (i.e., proximal to the same side of) optical surfaces 1020, 1030. As will be discussed further below, we may refer to this arrangement of actuators as a "unilateral" configuration. As described in FIG. 5D, chamber 1010, fluid 1070, inner support members 5050, 5110, plates 4010, 4020, housing 3040, housing members 3050, 3060, window 5166, fill-port-and-plug combination 5168, and support member 1040 may be provided. Optical surfaces 1020, 1030, inner support members 5050, 5110, plates 4010, 4020, housing 3040, and support member 1040 may be disposed in communication as described previously and provide a fluid seal, thereby forming chamber 1010 for containing fluid 1070. Actuators 3020, 3030 may be provided in unilateral configuration and may be disposed in communication with one or more actuator electrodes (not shown). One or more of housing 3040, plate 4010 and housing member 3050 may be integrated as a single (i.e., unitary) part thereby simplifying the design of the device. Housing member 3060 may be adjustable in its position relative to housing 3040 by a screw interface or other methods as described previously. Such adjustability of housing member 3060 may serve to allow an adjustment of a preload force on one or more of actuators 3020, 3030, support member 1040, optical surfaces 1020, 1030 or inner support members 5050, 5010. Support member 1040 and plates 4010, 4020 may be disposed in a fashion such that support member 1040 undergoes shear strain deformation upon actuation. However, in other configurations, support member 1040 may undergo compressive, tensile, volumetric or other strain deformations upon actuation. An actuator spacer ring 5404 may be disposed in communication with and between actuators 3020, 3030. Actuator spacer ring 5404 may be at least partially compliant or rigid. In some embodiments, actuator spacer ring 5404 may be at least partially electrically conductive and be at least partially composed of conductive materials such as conductive polymer or a polymer or elastomer doped with conductive particles such as nickel or carbon. In this fashion, actuator spacer ring 5404 may provide electrical communication between actuators 3020, 3030 thereby simplifying the design of the device. Alternatively, actuator spacer ring 5404 may be electrically insulating to provide electrical isolation between actuators 3020, 3030. An actuator centering ring 5410 may be provided and disposed in communication with one or more of actuators 3020, 3030, or actuator spacer ring 5404. Actuator centering ring 5410 may be at least partially compliant or rigid. Actuator centering ring 5410 may serve to help maintain the relative positions of one or more of actuators 3020, 3030, or actuator spacer ring 5404 during actuation. In some embodiments, actuator centering ring 5410 and actuator spacer ring 5404 may be comprised of a single unitary or integrated part. In some embodiments, actuator centering ring 5410 may be electrically conductive to provide electrical communication between actuators 3020, 3030. Alternatively, actuator centering ring 5410 may be electrically insulating to provide electrical isolation between actuators 3020, 3030. In some embodiments, support member 1040 may be at least partially electrically conductive and be at least partially composed of conductive materials such as conductive polymer or a polymer or elastomer doped with conductive particles such as nickel or carbon. In this fashion, support member 1040 may provide electrical communication between one or more of actuators 3020, 3030, plates 4010, 4020, or housing 3040 thereby simplifying the design of the device. Alternatively, support member 1040 may be electrically insulating. Likewise, in some embodiments, fluid 1070 may be electrically conductive or insulating in order to provide electrical communication or insulation between various components of lens system 5400. In one embodiment, an electrical circuit may be formed by a first actuator, support member, plate and second actuator. Another embodiment of the present lens system 5400 connected to a control circuit is described below with respect to FIG. 19.

Figure 6:
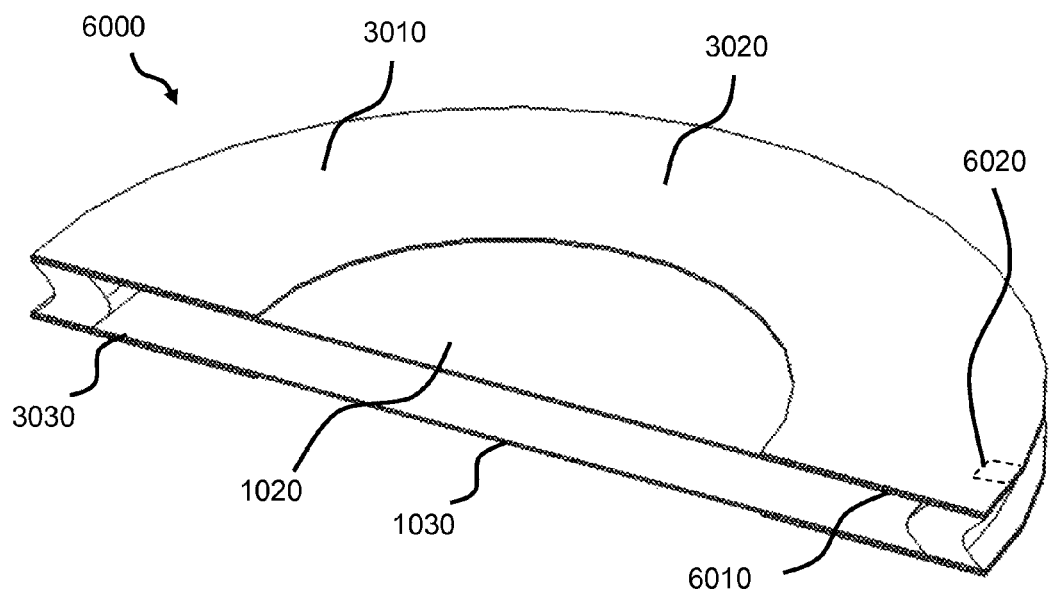
FIG. 6 is a three-dimensional cross-sectional view of a lens member according to an embodiment of the present invention with ring actuators integrated with the optical surfaces.

FIG. 6 shows another embodiment of the present lens member 6000 in conjunction with an actuator 3010. In the present embodiment, actuator 3010 (which may include first actuator 3020 and second actuator 3030) comprises one or more ring bender actuators, each of which may include one or more electroded piezoceramic rings and a number of electrodes. However, it is understood that any suitable actuator technology, as described above, may be employed as desired. Actuator 3010 may be in communication and may be integrated (i.e., formed in a single unit or part) with one or more of first optical surface 1020 and lens member 6000. One example of a method for employing actuator 3010 with first optical surface 1020 is as follows. The electroded piezoceramic ring of actuator 3010 may be bonded to first optical surface 1020. A small portion of actuator 3010 may protrude radially outward from first optical surface 1020, thus affording access to the electrodes of actuator 3010. Alternatively, a conductive electrode pattern 6010 may be deposited in an annular pattern near the periphery of first optical surface 1020. For example, first optical surface 1020 may include a glass or plastic membrane and a metallic electrode pattern may be deposited on it by sputtering, evaporation or any other known technique. A conductive adhesive may be disposed between the bottom electrode of actuator 3010 (i.e., the electrode of actuator 3010 proximal to first optical surface 1020) and electrode pattern 6010. In this fashion, actuator 3010 and electrode pattern 6010 may be disposed in electrical communication with each other. A small notch 6020 (described by dashed lines) may be cut out from the piezoceramic ring section of actuator 3010, thereby providing communication to the otherwise obscured bottom electrode of actuator 3010. Electrical connection to both the bottom electrode and top electrode (i.e., the electrode of actuator 3010 distal to first optical surface 1020) may then be achieved using any known technique. Other connection techniques are also known to those familiar with piezoelectric bender actuators. As shown in FIG. 6, the above description may be similarly applied to a second actuator 3030 disposed in conjunction with second optical surface 1030.

Figure 7:
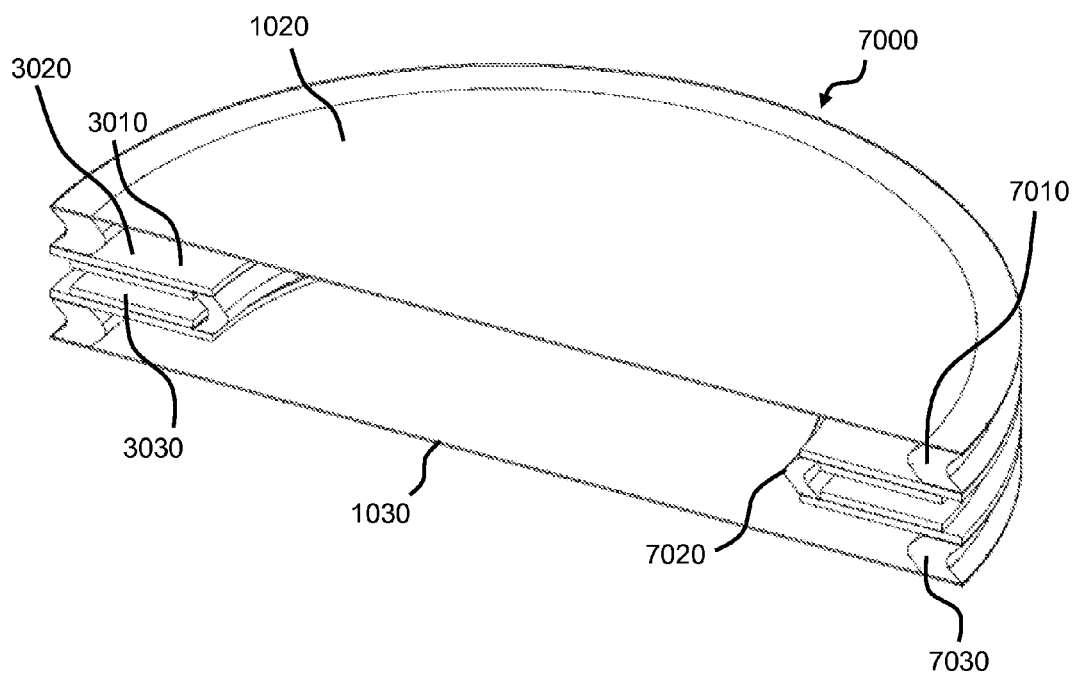
FIG. 7 is a three-dimensional cross-sectional view of a lens member with integrated internal ring bender actuators according to an embodiment of the present invention.

FIG. 7 shows another embodiment of the present device in which lens member 7000 may be integrated with actuator 3010 (which may include first actuator 3020 and second actuator 3030) and optical surfaces 1020, 1030. A plurality of support members 7010, 7020, 7030 may be similar to support member 1040 and may be employed as follows. First support member 7010 may be disposed in communication with first actuator 3020 and the perimeter region of first optical surface 1020. Second support member 7020 may be disposed in communication with first actuator 3020 and the second actuator 3030. Third support member 7030 may be disposed in communication with second actuator 3030 and the perimeter region of second optical surface 1030. In this fashion, a preload can be applied to actuators 3020, 3030 by the application of a "compressive" force delivered to optical surfaces 1020, 1030. As described previously, a force may applied to optical surfaces 1020, 1030, displacing them toward each other, thereby compressing support members 7010, 7020, 7030 and delivering preload to actuators 3020, 3030. One advantage of the present embodiment may be an increased volumetric stroke achievable with two actuators 3020, 3030 when the outer-most (or perimeter) region of the lens member 7000 may be squeezed by converging surfaces. Even greater change in optical power of lens member 7000 may be achieved when deflection of one or more of optical surfaces 1020, 1030 may be concentrated in the central region (or aperture) by providing plates 4010, 4020 (see FIGS. 4A and 4B).

Segmented Actuator

Figure 8:
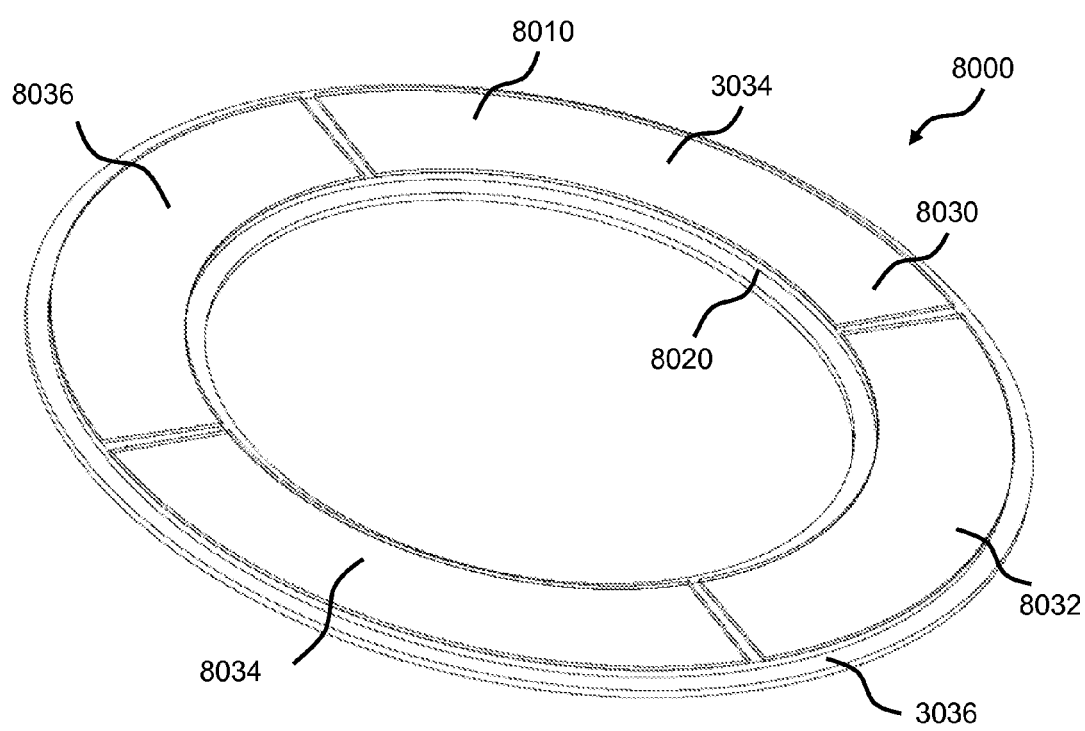
FIG. 8 is a three-dimensional view of a segmented ring bender actuator with four independently addressable electrodes.

FIG. 8 shows an alternative embodiment of a ring bender segmented actuator 8000 ("segmented ring bender") which includes segmented electrodes in order to achieve a combination of both focus and tilt (or "tip"). Actuator 8000 includes a piezoceramic ring member 3034, bendable plate member 3036, first electrode 8010 and second electrode 8020 (or "electrodes 8010, 8020") as described previously (see FIG. 3A). First electrode 8010 may be disposed distally to bendable plate member 3036 (i.e., the "exposed" electrode) and second electrode 8020 may be disposed proximally to bendable plate member 3036. One or more of electrodes 8010, 8020 may be segmented and electrically isolated from each other. For example, first electrode 8010 may be divided into electrode segments 8030, 8032, 8034, 8036 and distributed around piezoceramic ring member 3034. In the present embodiment, electrode segments 8030, 8032, 8034, 8036 may be radially distributed around segmented ring bender 8000 in a symmetric fashion. However, it is understood that any form of segmentation may be employed, including separating first electrode into concentric circular segments. Electrode segments 8030, 8032, 8034, 8036 may be driven with an applied voltage either singly or differentially with second electrode 8020. This segmentation of the applied voltage over piezoceramic ring member 3034 enables segmented ring bender 8000 to selectively bend in a number of manners. For example, segmented ring bender 8000 may be driven with a uniform voltage (or "signal") applied to all segmented electrodes 8030, 8032, 8034, 8036; in this case it may behave similarly to that of a conventional (i.e., non-segmented) ring bender actuator, and thus bend in the typical fashion, deforming from generally flat to dome shape. In this fashion, independent signal sources may be connected to each segment of the segmented ring bender 8000 and the signal sources may be driven in common mode in order to adjust the focal length of the lens system 3000.

Further, different voltages may be applied to any of segmented electrodes 8030, 8032, 8034, 8036, thereby causing segmented ring bender 8000 to warp (i.e., to deform from generally flat to cylindrical, saddle or other shapes). When segmented ring bender 8000 is employed in lens system 3000 (see FIGS. 3A, 3B and 4B), such adaptability in deformation can be utilized to not only provide a change in focal power, but additionally to correct some aspect of an incoming wavefront distortion (for example, as might be useful in wavefront correction applications). Further, the incorporation of segmented ring bender 8000 in a lens system 3000 (see FIGS. 3A, 3B and 4B), may be utilized to introduce tilt into the wavefront (for example, as might be useful in pointing, tracking and image stabilization applications). Hence, a suitable combination of common mode and differential signals, used to drive segmented ring bender 8000, may be employed in order to provide a combination of focus, tilt, tip and other wavefront adjustments in lens system 3000 (see FIGS. 3A, 3B and 4B). Other methods of driving segmented ring bender 8000 may include the following: driving at least two independent signals (connected to at least two segments) differentially to tilt the viewing direction in one direction; driving a first pair of segments on a first segmented ring bender, and a second pair of segments on a second ring bender, in order to achieve viewing angle control (or tip or tilt) in two dimensions (i.e., in two directions, or in two orthogonal directions); and driving at least three segments of the same segmented ring bender 8000 differentially in order to achieve tilt control in two directions.

Tube and Spherical Actuators

C-Block Actuator

Figure 9A:
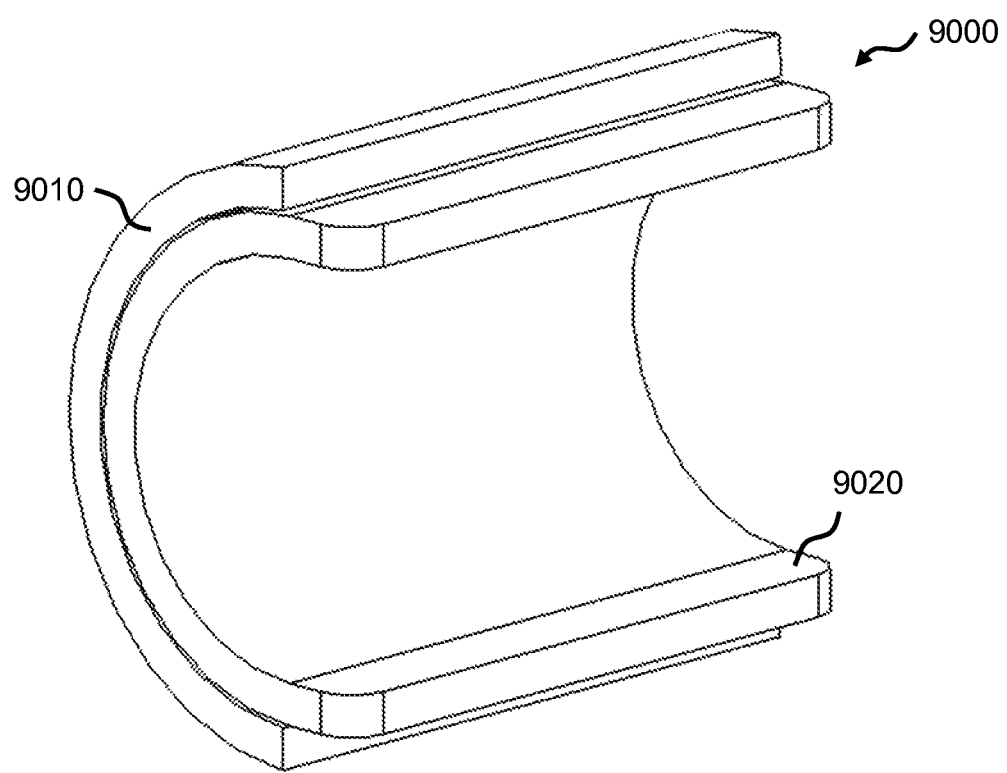
FIG. 9A is a three-dimensional cross-sectional view of a C-Block actuator.

FIG. 9A shows an alternative embodiment of c-block actuator 9000 based on a type of bender actuator called a "C-Block" due to its half-circular cross-sectional shape. C-block actuator 9000 includes a section of c-shaped electroded piezoceramic tube member 9010 (or "piezo tube member"). Piezo tube member 9010 may be bonded to a shim member 9020 which may be formed in c-shape in order to conform to the shape of tube member 9010. Shim member 9020 may be comprised of a spring material like steel, or beryllium-copper alloy, etc. Compared to a regular strip, disc or ring bender, a c-block may be capable of squeezing a component completely on its own without reliance on reaction forces from any other component (i.e., unlike the case of ring benders, a preload may not be necessary in the case of a c-block actuator).

Figure 9B:
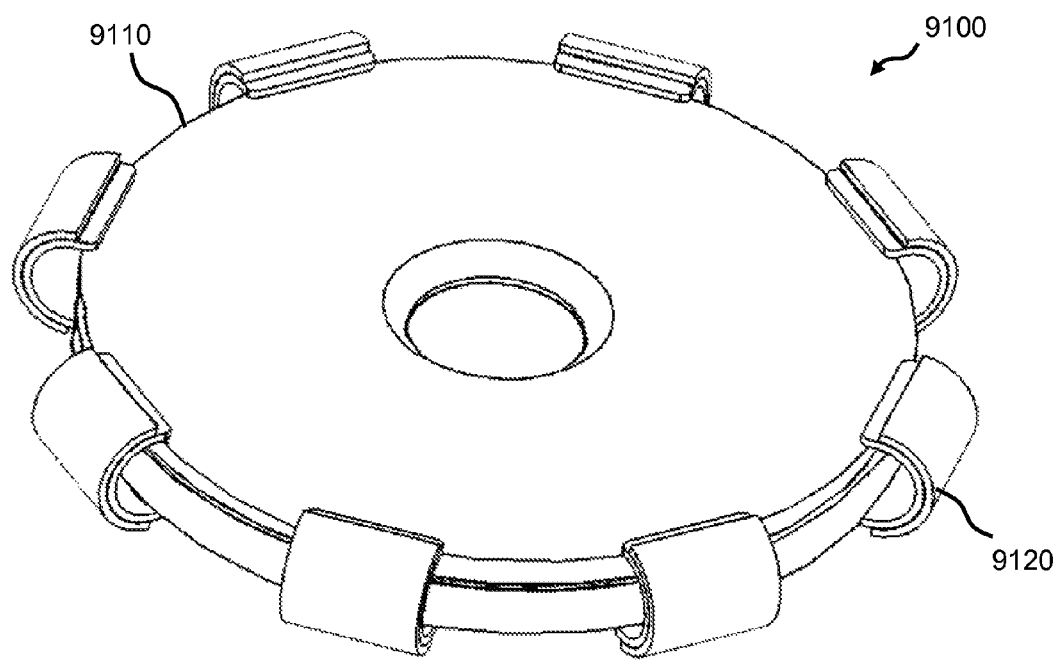
FIG. 9B is a three-dimensional view of a lens member with C-Block actuators according to an embodiment of the present invention.

FIG. 9B shows an embodiment of the present lens system 9100 wherein a lens member 9110 may be provided in conjunction with a plurality of c-block actuators 9120. C-block actuators 9120 may be disposed and driven in a manner to provide a "compressive" or "squeezing" force to lens member 9110 as previously described, thereby actuating lens member 9110. An added benefit of using a plurality of c-block actuators 9120 may be that both focus and tilt adjustments are possible by applying the same (or "uniform") or differing voltage values to the individual actuators as previously described.

Tube Actuator

Figure 10A:
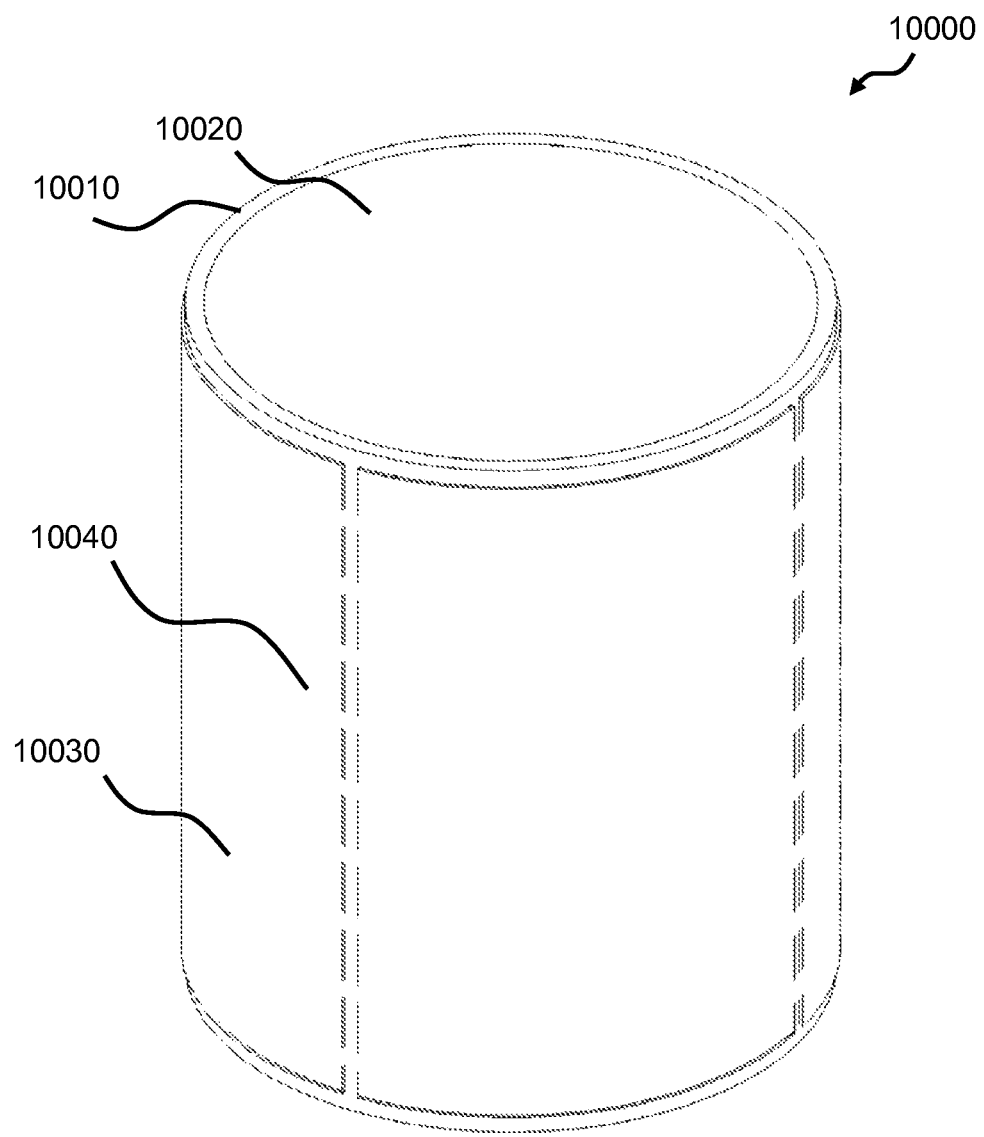
FIG. 10A is a three-dimensional view of a piezoelectric tube actuator with a segmented outer electrodes.

FIG. 10A shows an embodiment for the present actuator based on a tube actuator 10000. Piezoelectric tube actuators are commonly used in highly accurate scanning for applications including atomic force microscopy, fluid dispensing, optical fiber manipulation, etc. The embodiment illustrated in FIG. 10A includes a piezoceramic tube member 10010. An internal tube electrode 10020 may be disposed in communication with the internal cylindrical surface of tube member 10010. Likewise, an external tube electrode 10030 may be disposed in communication with the external cylindrical surface of tube member 10010. A voltage applied across internal and external tube electrodes 10020, 10030 (or "tube electrodes 10020, 10030") may result in a change of the axial length (i.e., a change in length along the cylindrical axis of the tube) of tube actuator 10000. An optional embodiment of the present tube actuator 10000 comprises a segmented tube actuator. Segmented tube actuator includes a number of segmented tube electrodes 10040 on either the internal or external electrode of the piezoceramic tube member 10010 (described by dashed lines). For instance, external tube electrode 10030 may be divided into axially aligned quarters. Driving segmented tube electrodes 10040 either singly or differentially with the internal tube electrode 10020 can cause tube actuator 10000 to bend as well as change its axial length.

Figure 10B:
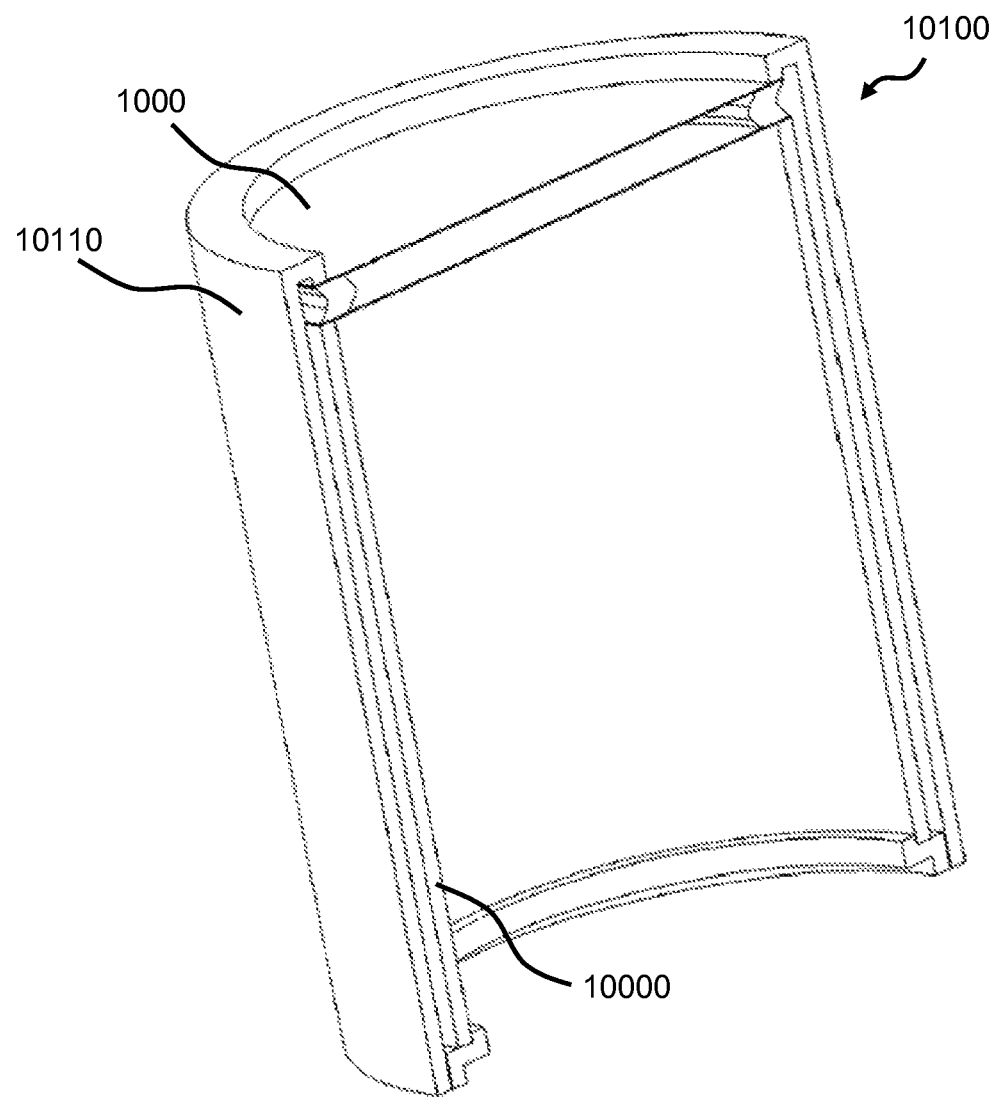
FIG. 10B is a three-dimensional cross-sectional view of a lens system with piezoelectric tube actuator according to an embodiment of the present invention.

FIG. 10B shows a lens system 10100 which includes a tube actuator 10000, lens member 1000 and a tube housing 10110. Tube housing 10110 may be similar to housing 3040, described previously, but in the present case it may be configured with a greater axial extent in order to be disposed in conjunction with tube actuator 10000. As understood in the art, in the present embodiment of tube actuator 10000, a radial field may be used to create an axial strain by means of the so-called "$d_{31}$" (or transverse strain) effect. This axial strain may be then used to compress (or "squeeze") lens member 1000 as described previously. For ease of illustration, electrical and mechanical interfaces have been omitted from FIG. 10B.

Similar to segmented ring bender 8000, a segmented tube actuator may optionally be employed in lens system 10100, utilizing its ability to change axial length as well as bend. In this fashion, lens system 10100 can provide not only a variable-focal length lens, but also correction of some aspect of an incoming wavefront distortion and active tilt into the wavefront, for applications including pointing, tracking and image stabilization. A suitable combination of common mode and differential signals may be employed to create a combination of focus and tilt adjustments.

Figure 11A:
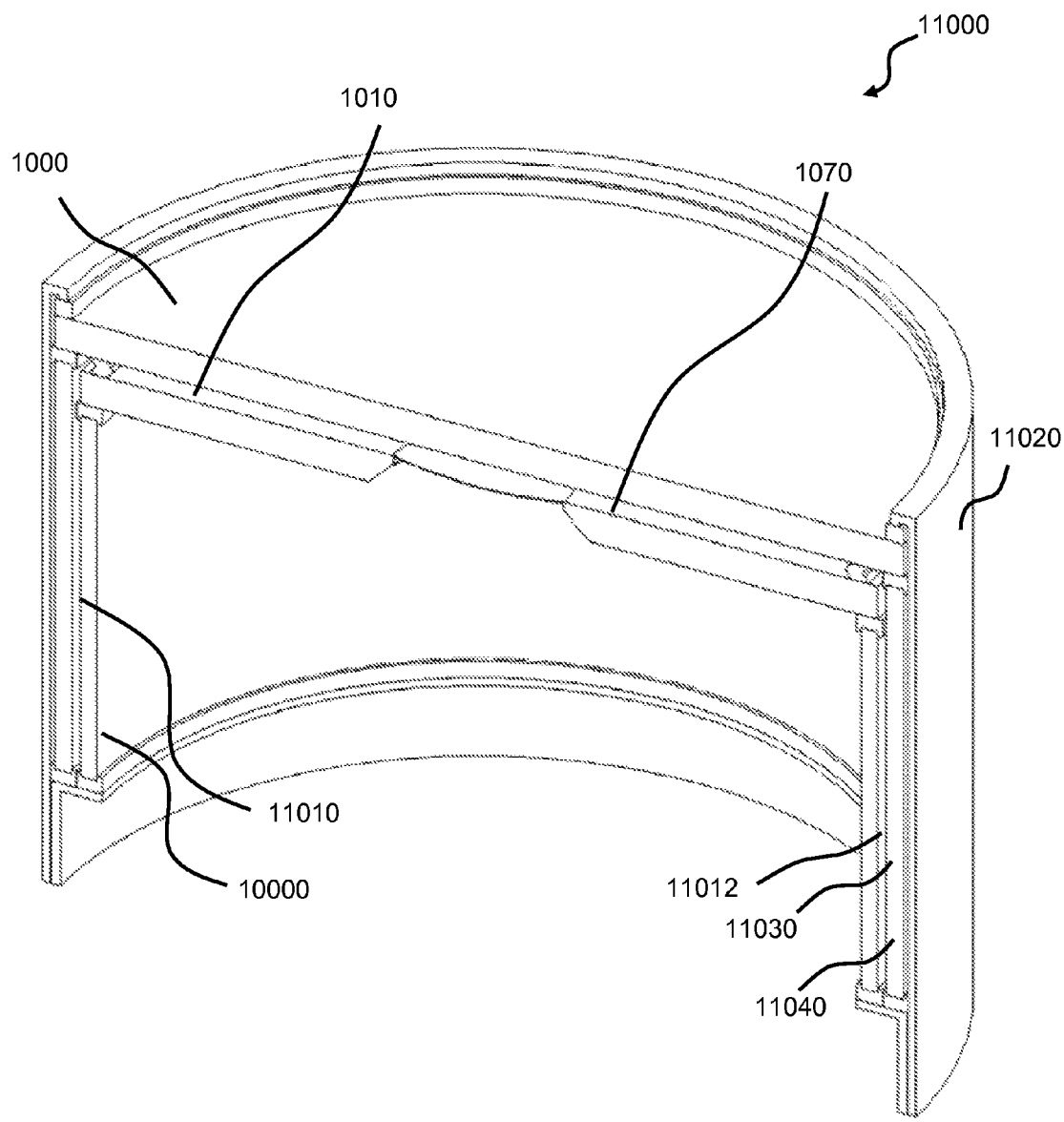
FIG. 11A is a three-dimensional cross-sectional view of a lens system with two tube actuators according to an embodiment of the present invention.

In lens system 10100 (see FIG. 10B), only the axial strain of tube actuator 10000 was utilized. However, as shown in FIG. 11A, an enhanced lens system 11000 utilizes the $d_{31}$ effect in another fashion in order to additionally endow tube actuator 10000 with a tangential strain. Tangential strain can serve to provide a change the radial dimensions of tube actuator 10000. The change in radius of tube actuator 10000 may be utilized to cause an increase in the change in the pressure in chamber 1010. This tangential strain may, in turn, be utilized to increase in the volume of displacement of fluid 1070 (compared to that caused by axial strain alone), thereby increasing the change in focal power of lens member 1000.

In order to accomplish this enhanced change in focal power, a cylindrical-shaped (or "sleeve-shaped") chamber 11010 may be provided and may be in fluid communication with chamber 1010. Further, sleeve-shaped chamber 11010 may be in communication with, and concentrically disposed with respect to, tube actuator 10000 (or "first tube actuator 10000"). Fluid 11012 may be disposed at least partially in sleeve-shaped chamber 11010 in a fashion similar to chamber 1010 as previously described. The sidewall of tube housing ("tube housing sidewall") 11020 delimits and may be disposed in proximity of, and concentrically with respect to, sleeve-shaped chamber 11010. Optionally, in order to delimit sleeve-shaped chamber 11010, a cylindrical fixed wall member 11030 may be disposed in proximity of, and concentrically with respect to, tube actuator 10000. As a further option, cylindrical fixed wall member 11030 may be replaced by a second tube actuator 11040 in order to achieve an even greater change in focal power of lens system 11000. Second tube actuator 11040 may be disposed between first tube actuator 10000 and tube housing sidewall 11020. First and second tube actuators 10000, 11040 may be electrically driven in "push-pull" fashion, as understood in the art, with respect to each other. Such push-pull actuation of first and second tube actuators 10000, 11040 may thereby increase the change in volume of sleeve-shaped chamber 11010, hence, increasing the change in focal power of lens system 11000. Lens system 11000 is shown in FIG. 11 to include a compliant first optical surface 1020 only on one side in order to illustrate the design flexibility of having a more standard optical component form one of its optical surfaces. Although FIG. 11A shows a second optical surface 1030 comprising a simple window, any other known optical element (for example, one or more rigid or compliant standard lenses, filters, polarizers, wave plates, gratings, optical fiber bundles, holographic optical elements, diffractive optics, compliant optical surfaces or membranes or other components) may be incorporated in order to satisfy the optical designer's requirements.

Figure 11B:
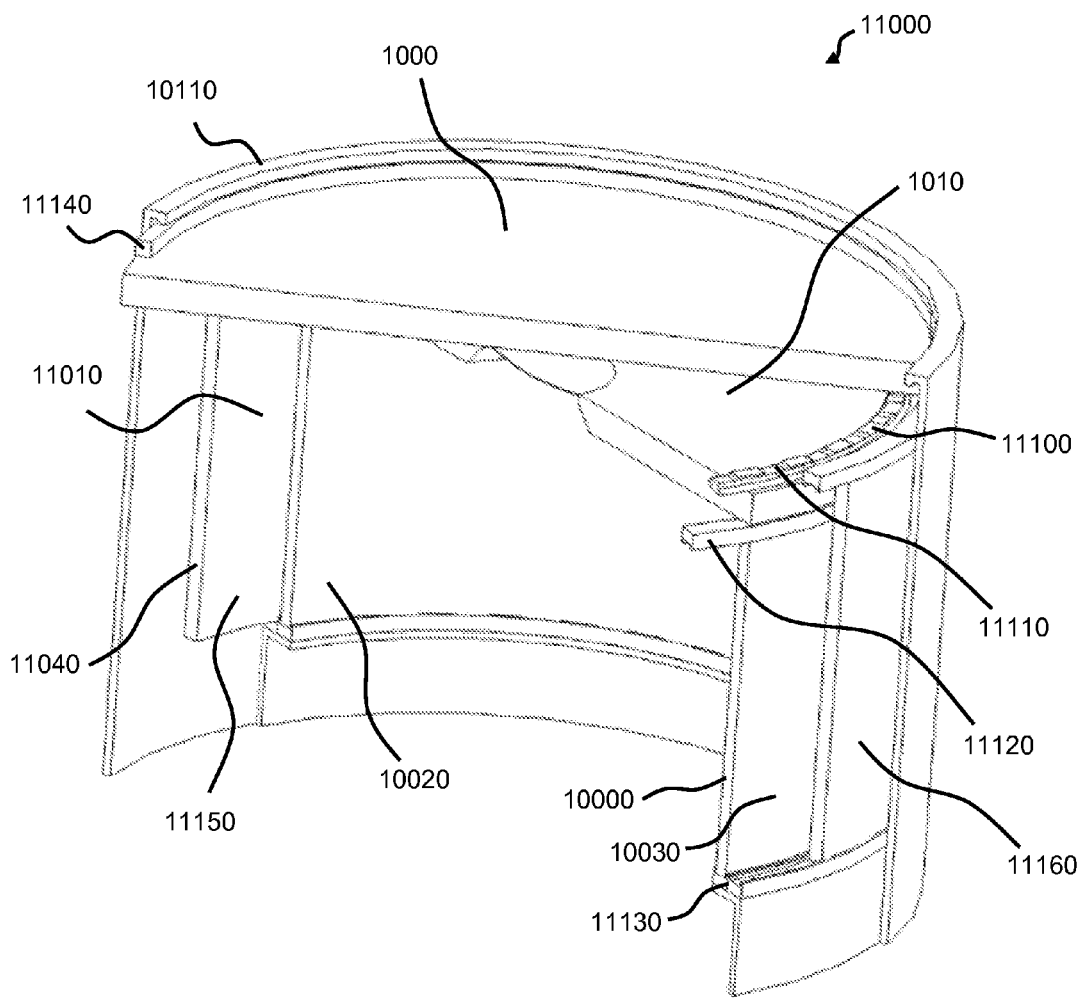
FIG. 11B is a three-dimensional cross-sectional view of a lens system with two tube actuators illustrating the fluid passages according to an embodiment of the present invention.

FIG. 11B shows an alternative embodiment of lens system 11000 in which the support member 11100 includes fluid passages 11110. Fluid passages 11110 preferably may be radial openings, however, they may take any shape as desired. Fluid passages 11110 provide fluid communication between chamber 1010 and sleeve-shaped chamber 11010. Tube seals 11120, 11130 may be provided at either end of tube actuators 10000, 11040 and allow freedom of axial and radial movement (i.e., strain) of tube actuators 10000, 11040. In order to prevent fluid leaks, an outer tube seal 11140 may be provided and may be disposed between the tube housing 10110 and outer edge of the lens member 1000. Outer tube seal 11140 serves to maintain a resilient compressive stress in the axial stack of components of lens system 11000. One or more of support member 11100, tube seals 11120, 11130 and outer tube seal 11140 may be preferably elastomeric but can comprise any material useful for providing a fluid seal.

By way of example, one approach to providing electrical connection to (i.e., driving in a "push-pull" configuration) tube actuators 10000, 11040 is as follows: (a) connect both external tube electrode 10030 (of first tube actuator 10000) and internal tube electrode 11150 (of second tube actuator 11040) to the output of a high voltage amplifier (not shown);

(b) if both of tube actuators 10000, 11040 may be poled such that their external tube electrodes are "positive", then connect the positive rail of the amplifier to external tube electrode 11160 (of second tube actuator 11040); (c) likewise, connect the ground to internal tube electrode 10020 (of first tube actuator 10000); (d) however, if the poling direction is reversed (i.e., if both of tube actuators 10000, 11040 are poled such that their external tube electrodes are "negative"), then the connections to the positive rail and ground of the amplifier should also be reversed.

In operation, the axial length and diameter of tube actuators 10000, 11040 may be roughly proportional to the voltage applied by the amplifier. In this fashion, when first tube actuator 10000 grows radially and axially, second tube actuator 11040 shrinks radially and axially. This coordinated action combines the fluid movements and changes in volume of sleeve-shaped chamber 11010 and chamber 1010, resulting in an enhancement (or "amplification") in the adjustment of the focal length (or change in focal power) of lens system 11000.

Figure 11C:
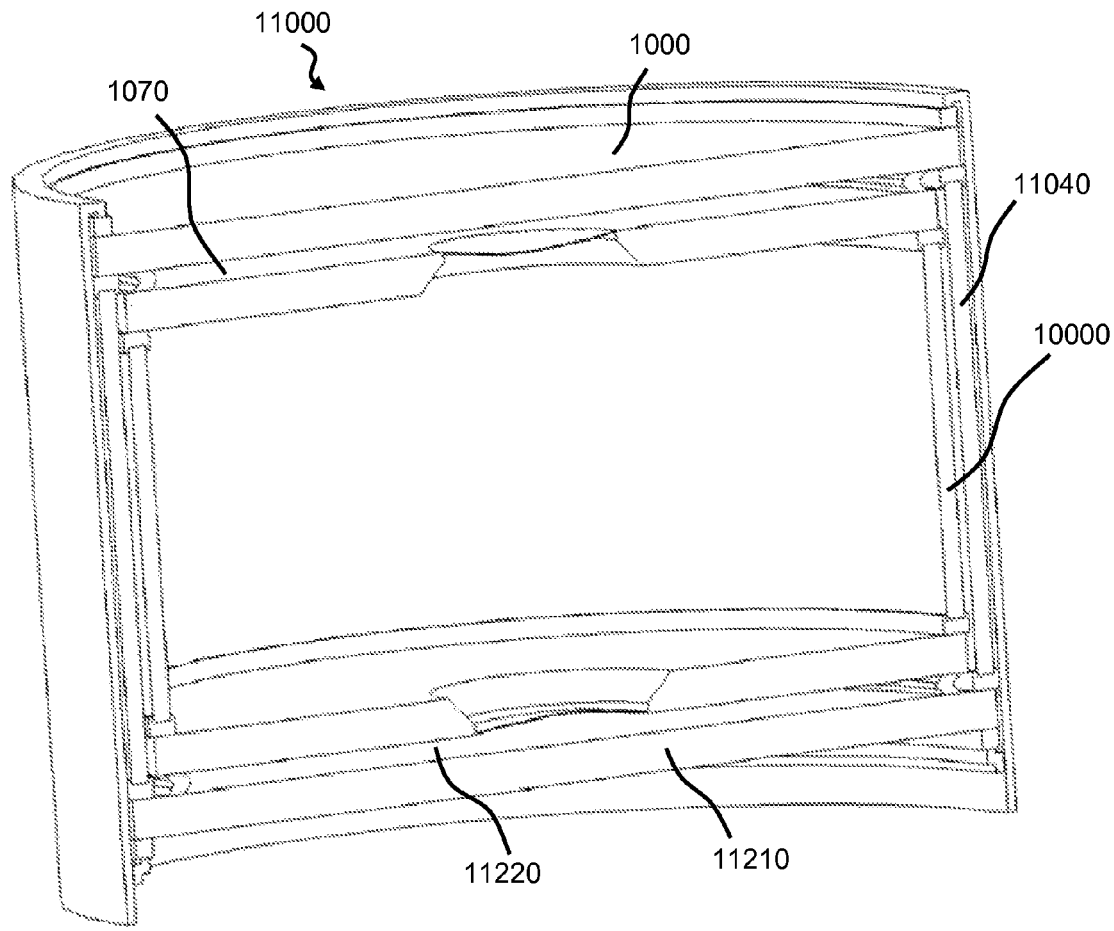
FIG. 11C is a three-dimensional cross-sectional view of a lens system with two tube actuators and two lens members according to an embodiment of the present invention.

FIG. 11C shows another embodiment of the present lens system 11000 which incorporates a pair of lens members 1000, 11210. Preferably, lens members 1000, 11210 may be disposed to operate in tandem with each other, however, it is understood that they may be disposed to operate independently as well. Lens member 1000 (or, "first lens member 1000") may be disposed proximal to one axial end of one or more of tube actuators 10000, 11040 as described previously. A second lens member 11210 may be provided at the other axial end of tube actuators 10000, 11040, distal to first lens member 1000. Second lens member 11210 may be similar to first lens member as previously described. Further, second lens member 11210 includes a second lens member chamber ("second chamber) 11220 which may be disposed in fluid communication with sleeve-shaped chamber 11010 in a similar fashion as that of sleeve-shaped chamber 11010 and chamber 1010 as previously described (see FIGS. 11A and 11B). In this fashion, sleeve-shaped chamber 11010, chamber 1010 and second chamber 11220 may all be in fluid communication with each other. In the present embodiment, the strain of tube actuators 10000, 11040 may be divided between lens members 1000, 11210. One advantage of such a "double-lens-member" (or "symmetrical") arrangement may be that the total displacement of fluid 1070 (which may be provided by the strain of tube actuators 10000, 11040) may be divided between lens members 1000, 11210. The resulting change in focal power of each of lens members 1000, 11210 may be thus decreased in comparison to the case of only a single lens member 1000 (see FIGS. 10B, 11A and 11B). However, the combined change in focal power of the pair of lens members 1000, 11210 may be substantially similar to the "single lens" case. As is well known by practitioners of optical design, such distribution of focal power among a plurality of optical elements may be utilized in order to provide reduced optical aberrations in the overall system. Another benefit of the present embodiment may be a reduction in actuation force. This may be due to the nonlinear force—displacement characteristic of a bulging (or "deformed" or "displaced") membrane where the pressure on the membrane may be approximately proportional to the cube of the lens sag height. For the present double-lens-member embodiment, the pressure (provided by actuators 10000, 11040) may be distributed over two lens members 1000, 11040. Therefore, the sag height of each of lens members 1000, 11040 may be reduced, and, hence, the total required actuation force may likewise be reduced.

Figure 12A:
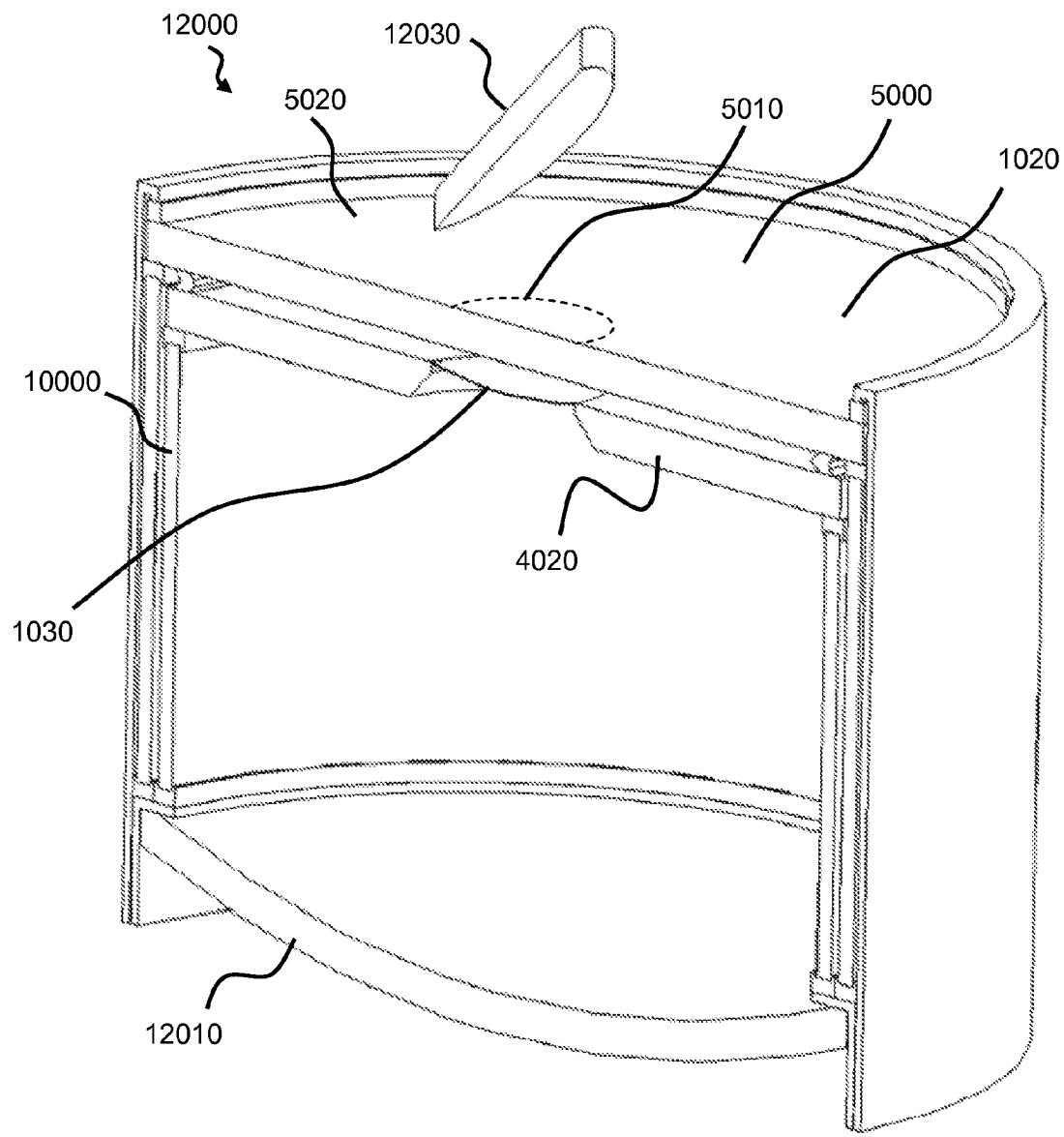
FIG. 12A is a three-dimensional cross-sectional view of a lens system with two tube actuators and a reflector according to an embodiment of the present invention.
Figure 12B:
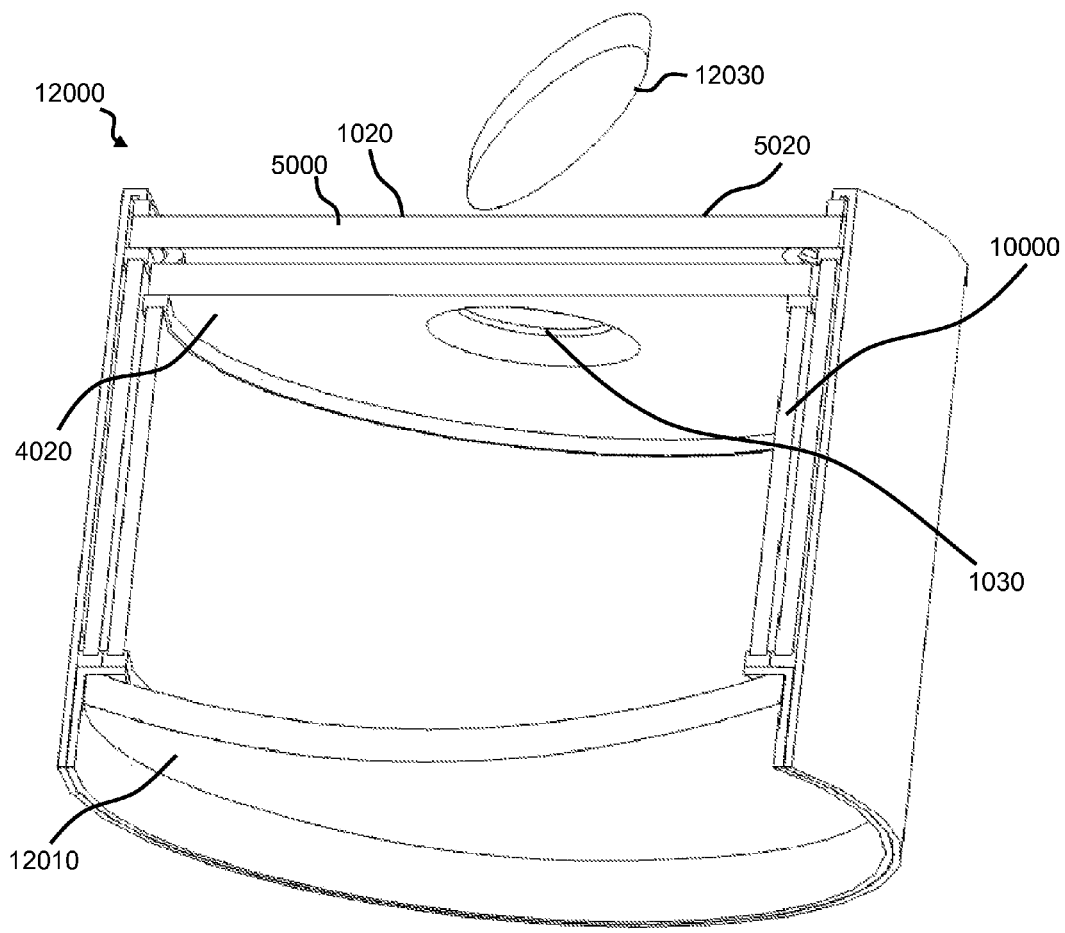
FIG. 12B is a three-dimensional cross-sectional view of a lens system with two tube actuators and a reflector forming part of a Newtonian telescope according to an embodiment of the present invention.
Figure 12C:
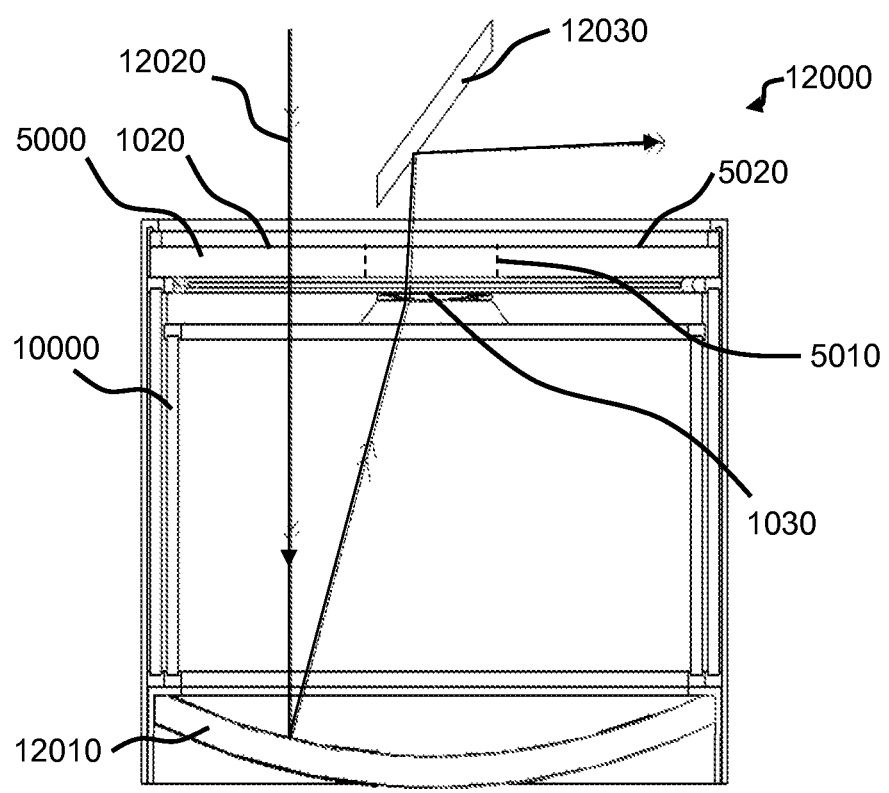
FIG. 12C is a cross-sectional view of a lens system with two tube actuators and a reflector forming part of a Newtonian telescope illustrating the path of an optical wave through the system according to an embodiment of the present invention.

FIGS. 12A, 12B and 12C show an embodiment of a lens system 12000 which may be similar to the embodiments described in FIGS. 11A and 11B and may additionally include a reflector member 12010. The aperture 5010 of lens member 5000 preferably has a smaller diameter than that of the inner diameter of tube actuator 10000. Lens member 5000 may be similar to any of the embodiments previously described, and, particularly, those of FIGS. 4A, 5A, 5B and 5C. An incident optical wave 12020 (see FIG. 12C; indicated by solid line with arrows) may enter lens system 12000 through first optical surface 1020 in a region at least partially external to aperture 5010 (i.e., in a region at least partially overlapping with first rigid member 5020, see FIG. 5A). Optical wave 12020 passes through lens member 5000 and may be received by reflector member 12010. Reflector member 12010 may be preferably at least partially reflective at the wavelengths of the optical wave 12020. Reflector member 12010 may incorporate static optical elements such as mirrors, lenses, gratings, prisms, holographic optical elements and diffractive optical elements. Additionally, reflector member 12010 may include active optical elements, such as lens member 5000, fluidic lenses, liquid crystal devices, deformable mirrors, micro-electromechanical (MEMS) devices. Optical wave 12020 may be at least partially reflected and focused by reflector member 12010 and transmitted through lens member 5000 in a region at least partially overlapping second optical surface 1030. The second optical surface 1030 may be supported by second plate 4020 and at least partially covers a second aperture therein.

A turning mirror 12030 may be disposed in the proximity of lens member 5000, on the side distal to reflector member 12010. Optical wave 12020 may be received and at least partially reflected by turning mirror 12030. Turning mirror 12030 reflects (or "deflects") optical wave 12020 to be received by an eyepiece, image sensor, optical detector or other received (not shown). In this fashion, lens system 12000 may be employed similarly to a Newtonian telescope. For example, reflector member 12010 and turning mirror 12030 may be similar to the primary and secondary mirrors of a Newtonian telescope. Actuation of the lens member 5000 may be utilized for fine focus adjustment of the telescope. With the addition of reflector member 12010, lens system may be considered similar to a catadioptric optical system. Lens system 12000 may take alternate embodiments such as Cassegrain, Schmidt-Cassegrain, Maksutov-Cassegrain and other telescope configurations.

Hemispherical Actuators

Figure 13A:
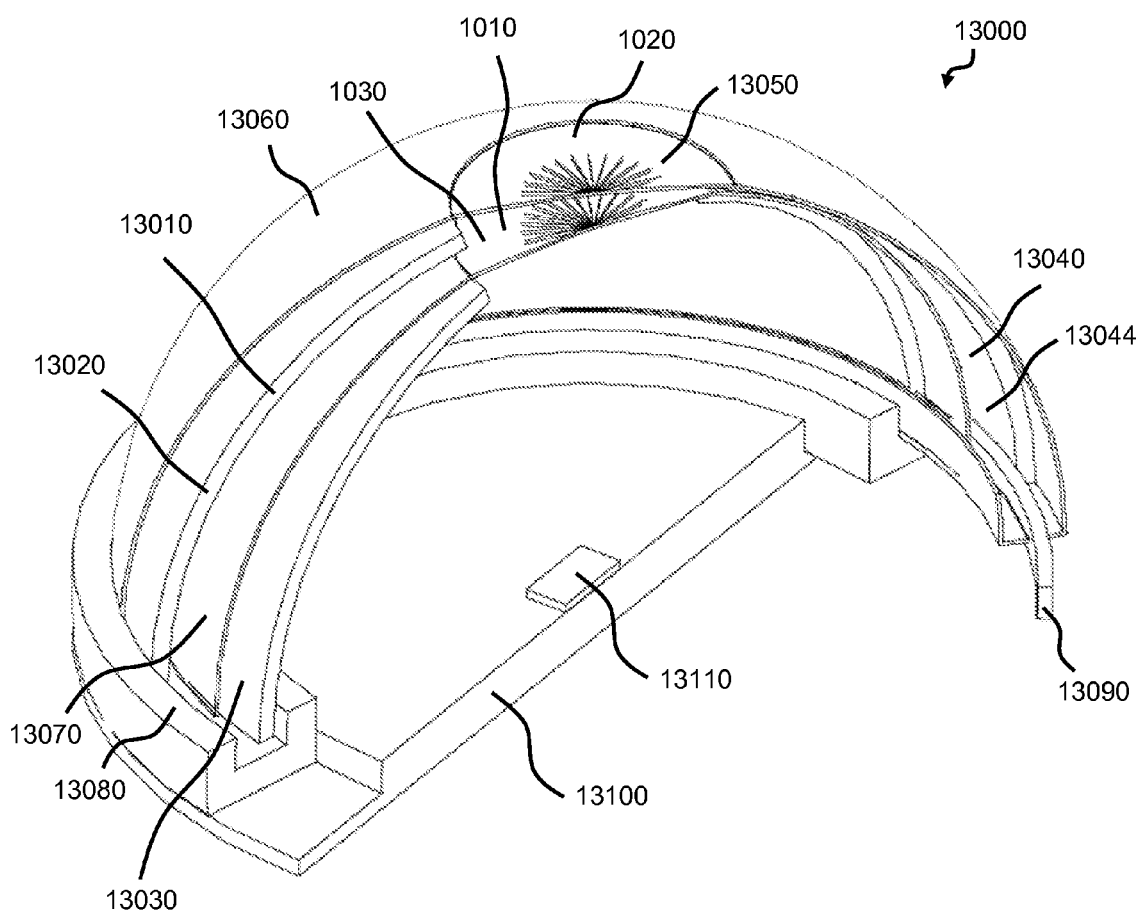
FIG. 13A is a three-dimensional cross-sectional view of a lens system with a hemisphere lens system comprising hemisphere actuators according to an embodiment of the present invention.

FIG. 13A shows an embodiment of a hemisphere lens system 13000 wherein a hemisphere actuator 13010 may be disposed and replaces tube actuators 10000, 11040 (see FIGS. 11A, 11B, 11C, 12A, 12B and 12C). Hemisphere actuator 13010 may include a first hemisphere actuator 13020 and a second hemisphere actuator 13030 (or, "hemisphere actuators 13020, 13030"). Hemisphere actuators 13020, 13030 preferably may be shaped in hemispheres (or half-spheres), however, it is understood that they may comprise complete, or portions of, ellipsoids, cones, spheres, or any other shape. Hemisphere actuators 13020, 13030 preferably may at least partially include piezoelectric (or piezoceramic) actuators as understood in the art, however, any actuator may be used. Hemisphere actuators 13020, 13030 may be disposed in a mutually-concentric fashion, similar to that of tube actuators 10000, 11040 (see FIGS. 11A, 11B, 11C, 12A, 12B and 12C), as previously described. A hemisphere-shaped chamber 13040 may be disposed in a more or less hemispherical shell region between hemisphere actuators 13020 and 13030 and may be similar to chamber 1010 (or sleeve-shaped chamber 11010), as previously described. Fluid 13044 may be disposed at least partially internal to one or more of hemisphere-shaped chamber 13040 and chamber 1010 in a fashion similar to that previously described (see FIG. 11A). Hemisphere-shaped chamber 13040 may be in fluid communication with one or more of hemisphere actuators 13020, 13030 and a lens member 13050 (in a fashion similar to that of chamber 1010 or sleeve-shaped chamber 11010 as previously described). Lens member 13050 may be similar to lens members 1000, 5000 as previously described. In this fashion, one or more of hemisphere actuators 13020, 13030 and hemisphere-shaped chamber 13040 may provide actuation of lens member 13050 (in a fashion similar to that described previously). Lens member 13050 may include fluid passages in a fashion similar to fluid passages 11110 (see FIG. 11B). Lens member 13050 may include optical surfaces 1020, 1030 and hemispherical layer members 13060, 13070. Hemispherical layer members 13060, 13070 may be similar to layer member 5040 (see FIG. 5A) and may be have a shape at least partially similar (or conformal) to hemisphere actuators 13020, 13030. One or more of optical surfaces 1020, 1030 and hemisphere layer members 13060, 13070 may include at least partially rigid or compliant materials, such as elastomer, glass, plastic, metal, polymer, membrane and any other desired materials as understood in the art. One or more of hemisphere actuators 13020, 13030 may function similarly to that of a mandrel on which one or more of optical surfaces 1020, 1030 and layer members 13060, 13070 may be at least partially stretched. Support members 13080, 13090 may be disposed and provide a resilient seal for hemisphere-shaped chamber 13040 in a fashion similar to those previously described for chamber 1010 and sleeve-shaped chamber 11010 (see, for example, FIGS. 1A, 11A). Numerous techniques are known in the art for sealing a fluid within a chamber. Further, one or more of support members 13080, 13090 may provide structural support for, and serve to prevent unwanted stresses from damaging, one or more of hemisphere actuators 13020, 13030. A support plate 13100 may be disposed in communication with, and serve to provide additional support for, one or more of hemisphere actuators 13020, 13030. A focal plane may be located in the plane of support plate 13100 and a sensor 13110 may be disposed in communication with support plate 13100. A sensor 13110 may be provided and may comprise any optical sensor, including a focal plane array (FPA) sensor, image sensor, complimentary metal-oxide-semiconductor (CMOS) sensor, charge-coupled device (CCD) sensor and optical detector. Additional static and active optical elements, as known in the art and described previously, may additionally be disposed at any location internal or external to lens system 13000. In this fashion, lens system 13000 may be considered to have similar functionality to that of an eye. An external positioning system (not shown) in communication with lens system 13000 may then be employed in order to control the direction of pointing of lens system 13000 while sensor 13110 remains stationary.

Figure 13B:
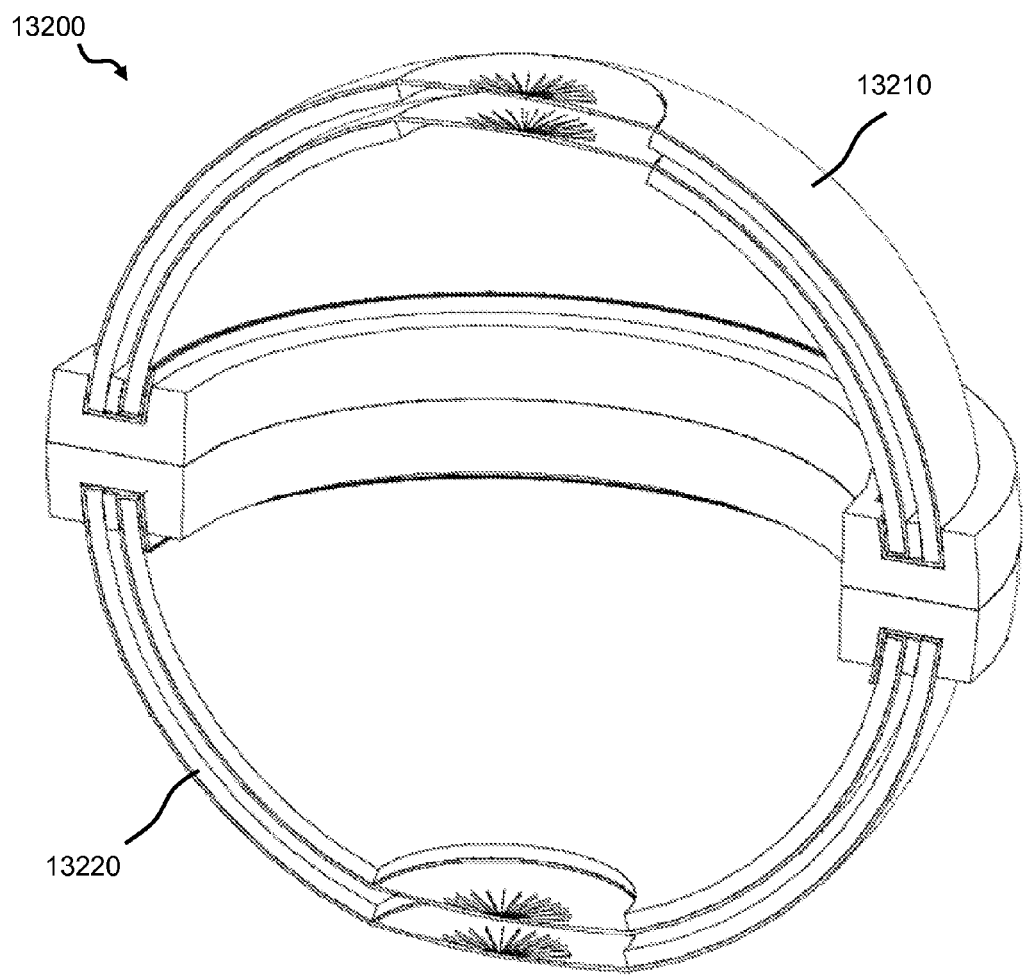
FIG. 13B is a three-dimensional cross-sectional view of a lens system with two hemisphere lens systems in communication with each other according to an embodiment of the present invention.

Actuating elements may be combined in various arrangements. FIG. 13B shows one such configuration, a lens system 13200, wherein two hemisphere lens systems (or "hemisphere lens members 13210, 13220") may be disposed in communication with each other (in the present embodiment, support plate 13100 and sensor 13110 (see FIG. 13A) have been omitted, however, it is understood that these elements may be optionally incorporated in lens system 13200). Hemisphere lens members 13210, 13220 may be operated (or actuated) independently of one another, in which case the optical power for each becomes separately controllable. Alternatively, hemisphere lens members 13210, 13220 may be operated in tandem (or dependently) with respect to each other, in which case the optical power for one may be dependent on that of the other. A number of static lenses may be added to lens system 13200, as is known in the art wherein zoom (or "zooming") and focusing functionality may be achieved.

Figure 13C:
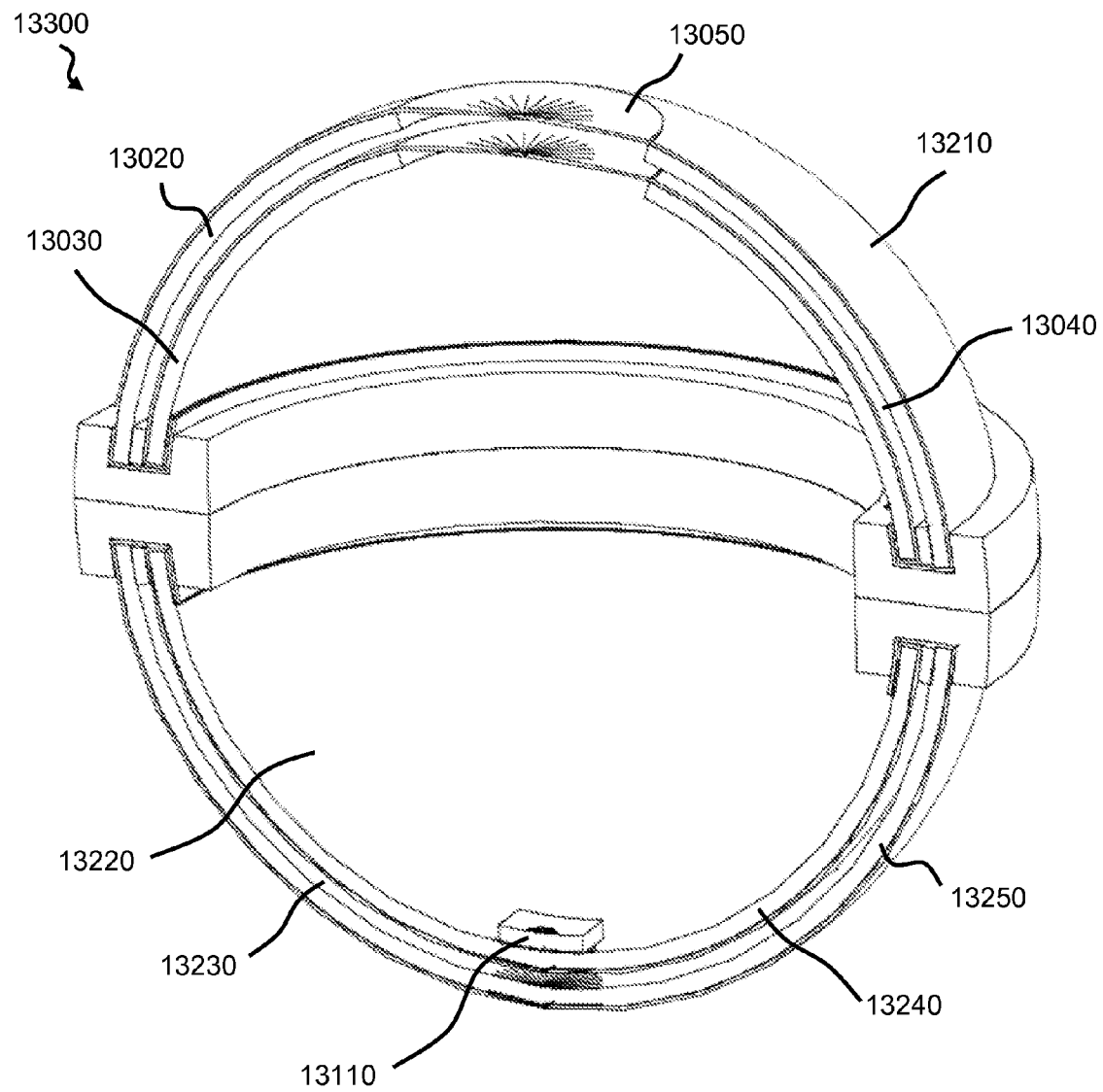
FIG. 13C is a three-dimensional cross-sectional view of a lens system with two hemisphere lens systems and an image sensor according to an embodiment of the present invention.

FIG. 13C shows an embodiment of the present lens system 13300 which includes hemisphere lens members 13210, 13220, a lens member 13050 and sensor 13110. In the present embodiment, hemisphere lens members 13210, 13220 may be operated in tandem as described previously. In this fashion, hemisphere-shaped chambers 13040, 13230 may be brought into fluid communication with each other, so that one or more of hemisphere actuators 13020, 13030, 13240, 13250 may contribute to the actuation of lens member 13050. The present embodiment may be considered similar to a human eye, including the presence of an artificial retina represented by sensor 13110. As is known in the art, sensor 13110 may include an array of pixel sensors disposed on a compliant substrate which may be capable of conforming to a spherical (or other curved shaped) surface (or substrate) similar to the back of the natural eye. As is well known in the art, in typical imaging systems, the image plane may be generally "curved", however, the sensor may be disposed on or comprise a generally flat surface. Therefore, corrective optics (for example, field flattening lenses) may be commonly employed in order avoid aberrations. One advantage of the present embodiment, wherein sensor 13110 may be disposed on a spherical (or other curved shape) surface, may be that such aberrations associated with the field curvature may be eliminated without requiring corrective optics. This may be because the sensor array itself may be located on a surface of curvature similar to that of the optical field.

Actuating elements may be combined in various ways. One such configuration includes the employment of one or more tube actuators (or concentric pairs of tube actuators) in communication with one or more hemisphere actuators (or pairs of concentric hemisphere actuators). For example, if a tube actuator is interposed between two hemisphere actuators, the result may include a greater distance between the two lens members, in addition to a greater volume of displaced fluid, and, hence a greater change in optical power. As an additional example, static optical elements, ring-bender-actuated lens members, or other optical elements, as described previously, may be disposed in interior of, or external to, one or more of lens system 13000, 13200 or 13300.

Figure 14A:
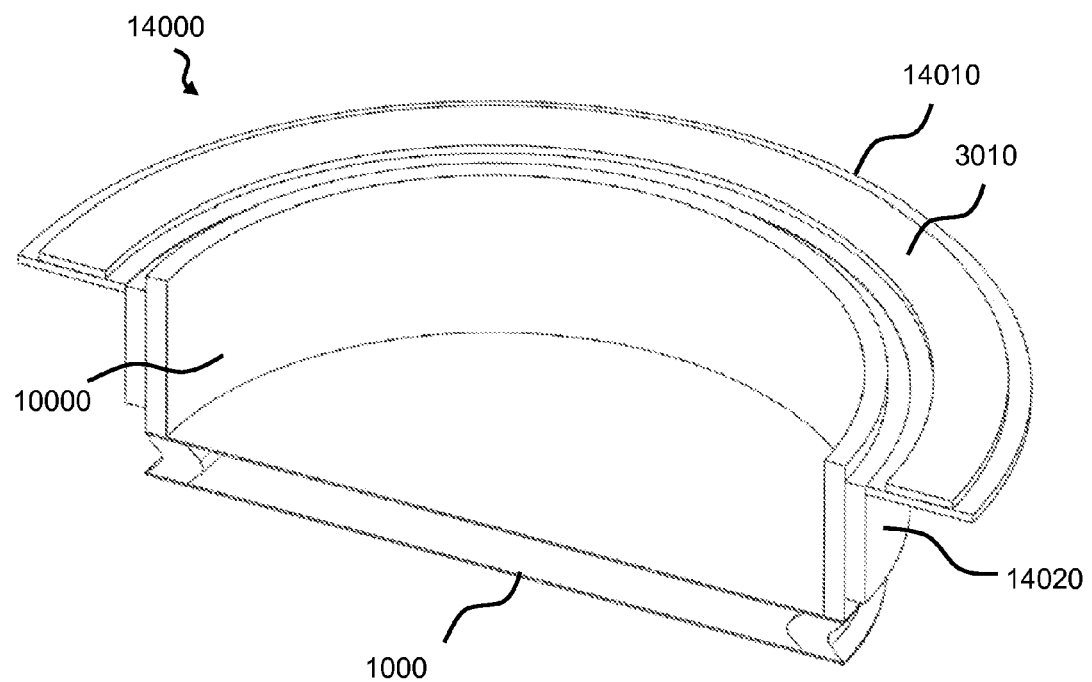
FIG. 14A is a three-dimensional cross-sectional view of a lens system with a stick-slip actuator comprising a ring bender actuator and tube actuator according to an embodiment of the present invention.

FIG. 14A shows an embodiment of a lens system 14000 which includes one or more reciprocating actuator 14010. Reciprocating actuator 14010 includes ring bender actuator 3010 and tube actuator 10000. A lens member 1000 may be disposed in communication with one axial end of cylindrical tube actuator 10000. A sleeve member 14020 may be disposed in communication with ring bender actuator 3010. Sleeve member 14020 may be preferably at least partially rigid and cylindrically shaped. Sleeve member 14020 may be preferably mounted (or fixed, bonded, molded or clamped) in coaxial fashion to the internal surface of the ring bender actuator 3010. Additionally, sleeve member 14020 may be disposed concentrically to, and in communication with, the external cylindrical surface of tube actuator 10000. Ring bender actuator 3010 produces "reciprocating" axial movement, while tube actuator 10000 serves as a "clutch" (or "brake") to be engaged and disengaged at predetermined moments in the axial cycle of ring bender actuator 3010. Depending on selected timing of the engagement, tube actuator 10000 may move up or down, travelling with either the upward or downward strokes of ring bender actuator 3010. Preferably, fit (or "friction") between the outer surface of tube actuator 10000 and the inner surface of sleeve member 14020 may be such that in a first state of radial strain, tube actuator may be free to slide smoothly within sleeve member 14020 (i.e., there may be low friction between the two elements). In a second state of radial strain, the outer diameter of tube actuator 10000 may be increased and it fits tightly against the inner diameter of sleeve member 14020 (i.e., there may be high friction between the two elements). This variable friction (or, "stick-slip" action) results in the "clutching" action between tube actuator 10000 and the combination of sleeve member 14020 and ring bender actuator 3010. In operation, one end of tube actuator 10000 applies an axially compressive force onto lens member 1000 in a fashion similar to that described previously. Just before the "return stroke" of ring bender actuator 3010, tube actuator 10000 may be adjusted to its low-friction state, thereby releasing its grip of sleeve member 14020. In this fashion, ring bender actuator 3010 may return to the beginning of its cyclic movement without the inertia of tube actuator 10000 causing it to "slow down" (or restrict its motion). This inertia, as well as the inertia due to fluid 1070, optical surfaces 1020, 1030 and other elements of lens member 1000, also serve to slow down (i.e., restrict the motion or) the elastic rebound of lens member 1000 during the return half of the cycle of stroke of ring bender actuator 3010. If the return stroke of ring bender actuator 3010 is fast enough, only a small fraction of the "forward" stroke may be negated during the return stroke. The speed of ring bender actuator 3010 may be enhanced by keeping its "radial extent" small (i.e., by minimizing its mass or by minimizing the difference between the inner and outer diameters of ringer bender actuator 3010). Additionally, a small radial extent of ring bender actuator 3010 may assist in keeping the footprint (i.e., size) of lens system 14000 conveniently small. As well, such a small radial extent may help keep the net forward stroke of ring bender actuator 3010 minimal, thus enhancing the "axial resolution" (i.e., the resolution in a direction parallel to the cylindrical axis of tube actuator 10000). When actuation takes place in quasi-continuous fashion, the high acoustic frequency associated with this fast movement may fall outside of (i.e., may be of higher frequency than) the human audible range, thus making lens system 14000 more desirable for consumer applications. In sum, the benefits of ring bender actuator 3010 having a small radial extent may include the following: smaller radial package footprint; greater blocking force; smaller stroke thus allowing finer positioning resolution; small capacitance making higher bandwidth possible; greater average speed; acoustic frequency beyond human audible range possible; and lower cost. Ring bender actuator 3010 may be simply supported along its outer rim by contact with a housing structure (not shown). Additionally, the reaction force from the housing structure may serve to increase the force delivered to (i.e., the "preload" as described previously) lens member 1000.

Figure 14B:
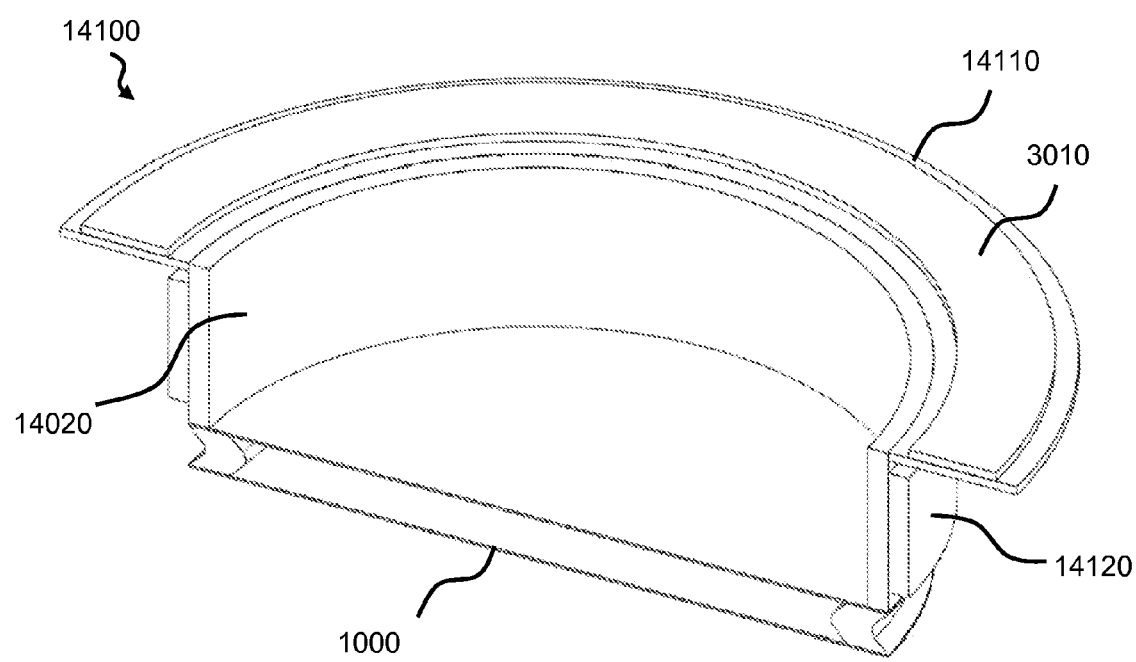
FIG. 14B is a three-dimensional cross-sectional view of a lens system according to an embodiment of the present invention with a stick-slip actuator comprising a ring bender actuator and passive housing sleeve.

FIG. 14B shows an alternative embodiment of the lens system 14100 which incorporates a modified reciprocating actuator 14110. In the present embodiment, tube actuator 10000 (see FIG. 14A) may be replaced by a passive housing sleeve 14120. Passive housing sleeve 14120 may be preferably at least partially rigid and cylindrical in shape, similar to sleeve member 14020. Further, passive housing sleeve 14120 may be mounted in fixed relationship to a surrounding housing structure (not shown). In the present embodiment, the outer diameter edge of ring bender actuator 3010 may be left unsupported by support structure (not shown). Further, sleeve member 14020 may be in communication with lens member 1000 (in a fashion similar to that of tube actuator 10000, see FIG. 14A). In the present embodiment, the reaction force comes from the inertial mass of ring bender actuator 3010. This reaction force may thus be transmitted to lens member 1000 via sleeve member 14020. In the present embodiment, it may be static friction (i.e., instead of "dynamic" or variable friction as described previously) between sleeve member 14020 and passive housing sleeve 14120 which serves to keep the compressed lens member 1000 from rebounding during the return stroke of ring bender actuator 3010. In order to achieve this "passive clutching" (or intentional stick-slip action), it may be necessary to utilize the difference between static and dynamic friction, and thus employ an asymmetric acceleration and deceleration waveform shape in driving (i.e., actuating) ring bender actuator 3010. The use of asymmetric acceleration profiles to convert reciprocating motion into quasi continuous, step-like motion is known in the art. The present embodiment thus introduces such an actuation principle with a combination of a hollow shaft (i.e., sleeve member 14020) acting on lens member 1000. Although this "passive clutching" of the present embodiment has advantages in terms of cost and simplicity over that of "active" clutching (see FIG. 14A, which incorporated tube actuator 10000), active clutching has the following advantages: greater efficiency due to reduced friction; reduced noise; improved durability due to reduced wear and maintenance of tolerances; and better focusing performance stemming from the higher available force due to the addition of tube actuator 10000.

External Hydrostatic Actuation.

Figure 15A:
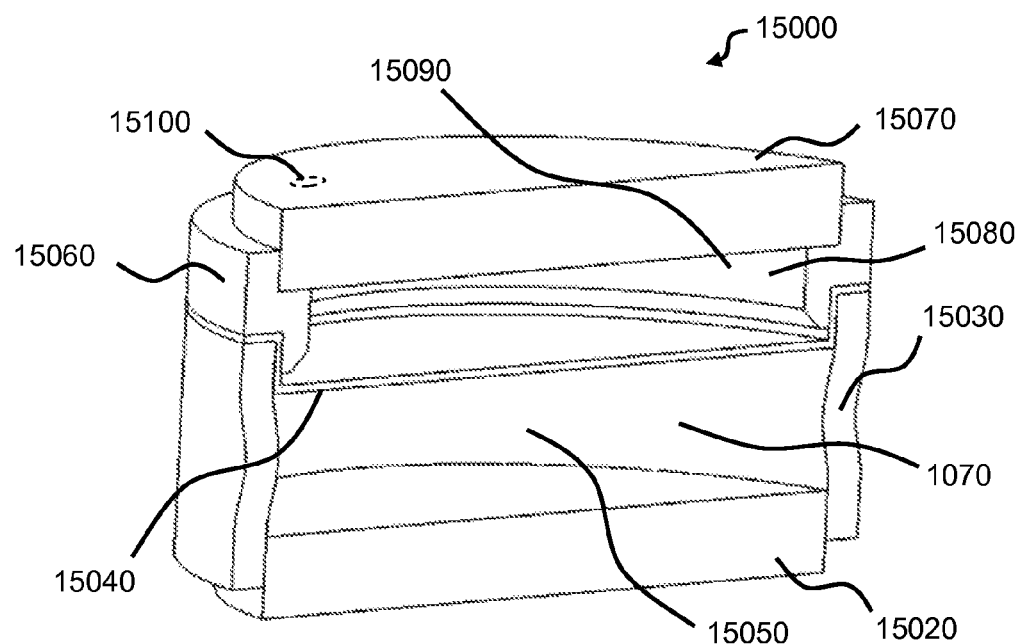
FIG. 15A is a three-dimensional cross-sectional view of a lens member according to an embodiment of the present invention having two stacked chambers in a first state of actuation.

FIG. 15A shows an alternative embodiment of a lens member 15000 which includes multiple chambers. Lens member 15000 includes a first optical surface 15020. First optical surface 15020 may be preferably at least partially rigid. First optical surface 15020 may be in disposed communication with a first support member 15030 which may be preferably at least partially compliant and may include curved sidewalls. A second optical surface 15040 may be disposed in communication with first support member 15030 near the end distal to that of first optical surface 15020. Second optical surface 15040 preferably comprises an at least partially resilient (or "compliant") material such as an elastomer, glass, plastic or polymer membrane. A first chamber 15050 may be thus generally bounded by first optical surface 15020, first support member 15030 and second optical surface 15040. First chamber 15050 may be filled with a first fluid 1070 which may be preferably incompressible, e.g., a liquid. A second support member 15060 may be disposed in communication with one or more of second optical surface 15040 and first support member 15030. Second support member 15060 may be preferably at least partially rigid and may serve to help fix (or clamp) second optical surface 15040 in position. In one embodiment, second support member 15060 may form a "snap fit", "interference fit" or other type of fit with one or more of second optical surface 15040 and first support member 15030. A third optical surface 15070 may be disposed in communication with second support member near the end distal to that of second optical surface 15040. Third optical surface 15070 may be preferably at least partially rigid. A second chamber 15080 may be thus generally bounded by second optical surface 15040, second support member 15060 and third optical surface 15070. Second chamber 15080 may be filled with a second fluid 15090 which may be preferably compressible (for example, air or an inert gas). One or more passages 15100 may be provided in second chamber 15080 in order to provide fluid communication between second chamber 15080 and the space external to lens member 15000. For example, FIG. 15A shows passages 15100 comprising a hole going through third optical surface 15070. Alternatively, second fluid 15090 may include vacuum, in which case, passages 15100 may not be included in second chamber 15080. Alternatively, second fluid 15090 may include an incompressible fluid (preferably of a different refractive index than that of first fluid 1070), in which case, passages 15100 may again be necessary (possibly in conjunction with an auxiliary, external or additional reservoir (not shown)). It is understood that, in some embodiments, first and third optical surfaces 15020, 15070 may function similarly to, or comprise, optical windows, lenses or other static optical elements. Likewise, second optical surface 15040 may function similarly to, or comprise, one or more elastic or compliant optical membrane or optical surface.

Figure 15B:
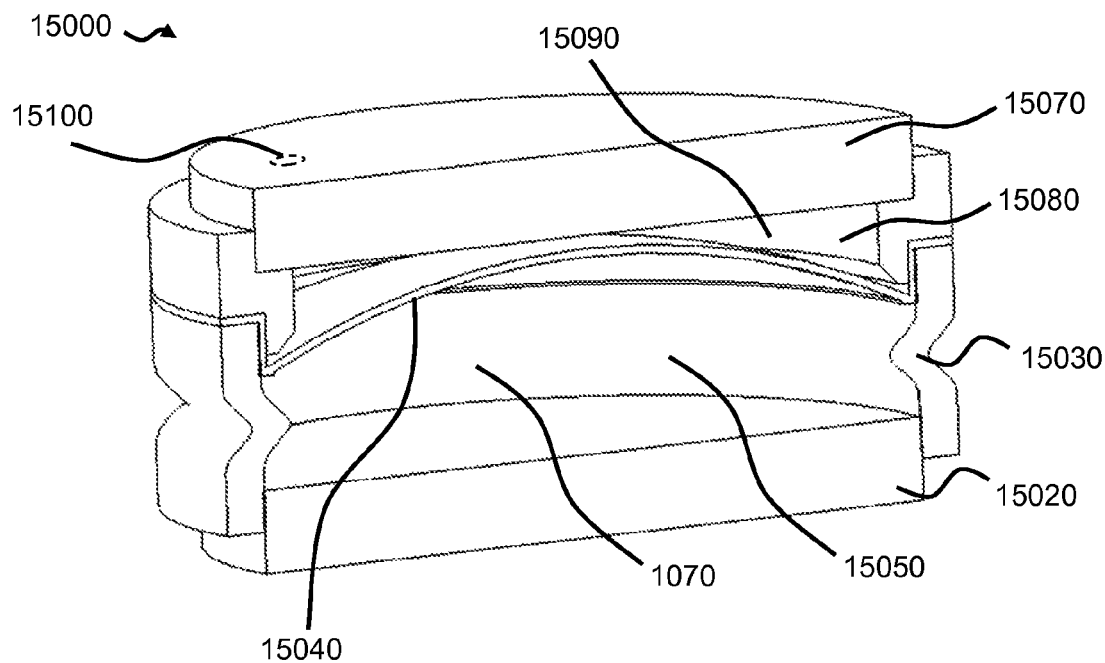
FIG. 15B is a three-dimensional cross-sectional view of a lens member according to an embodiment of the present invention having two chambers in a second state of actuation.

FIG. 15B shows lens member 15000 in an actuated state. Actuator (not shown) applies a compressive (or "squeezing") force between first and third optical surfaces 15020, 15070. This force may be communicated to first support member 15030, which, being compliant, compresses as described previously. This compression of first support member 15030 tends to reduce the volume of first chamber 15050. Preferably, as first support member 15030 may be squeezed axially, its sidewalls may be also forced to move radially inward as previously described, thereby enhancing the reduction in volume of first chamber 15050. Since first fluid 1070 may be substantially incompressible (i.e., its volume must be conserved), the compression of first support member 15030 results in the bulging (or "deflection", or "deformation") of second optical surface 15040, thereby adjusting the focal power of lens member 15000. This bulging of second optical surface 15040 tends to reduce the volume of second chamber 15080. As second optical surface 15040 bulges, second fluid 15090 is forced out of lens member 15000 through passages 15100. The resilience of one or more of first support member 15030 and second optical surface 15040 provides a restoring force which opposes the actuation force. In this fashion, when the actuation force is removed the restoring force causes first support member 15030 and second optical surface 15040 to return toward their non-actuated states. Likewise, the resulting increase in volume of second chamber 15080 may cause second fluid 15090 to return into second chamber 15080 through passages 15100.

Figure 16A:
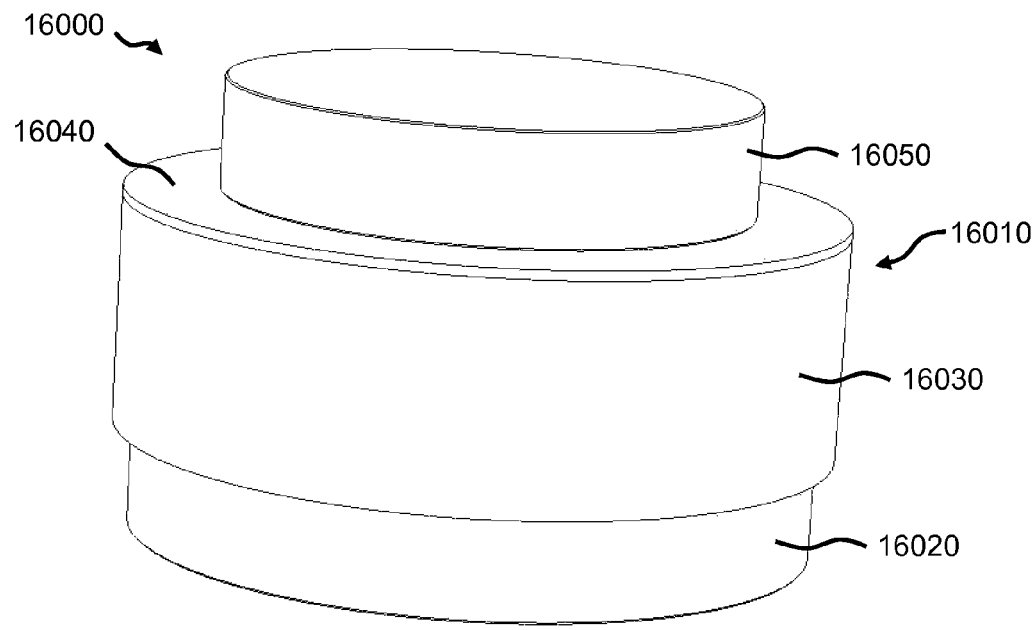
FIG. 16A is a three-dimensional view of a lens member according to an embodiment of the present invention having two nested chambers.

FIG. 16A shows another alternative embodiment of the present lens member 16000 which includes a sealed housing 16010 and employs external hydrostatic actuation. Sealed housing 16010 includes a first optical surface 16020. First optical surface 16020 may be preferably at least partially rigid. First optical surface 16020 may be disposed in communication with a first support member 16030 which may be preferably at least partially rigid. A second support member 16040 may be disposed in communication with first support member 16030 and may be at least partially resilient. It is understood that first support member 16030 and second support member 16040 may be formed as a single part or unit. A second optical surface 16050 may be disposed in communication with second support member 16040. Thus, an external chamber 16060 (see FIG. 16B) may be disposed internally to sealed housing 16010 and may be bounded (or "confined") by first optical surface 16020, first support member 16030, second support member 16040 and second optical surface 16050. First optical surface 16020, first support member 16030, second support member 16040 and second optical surface 16050 which form a fluid seal around external chamber 16060.

Figure 16B:
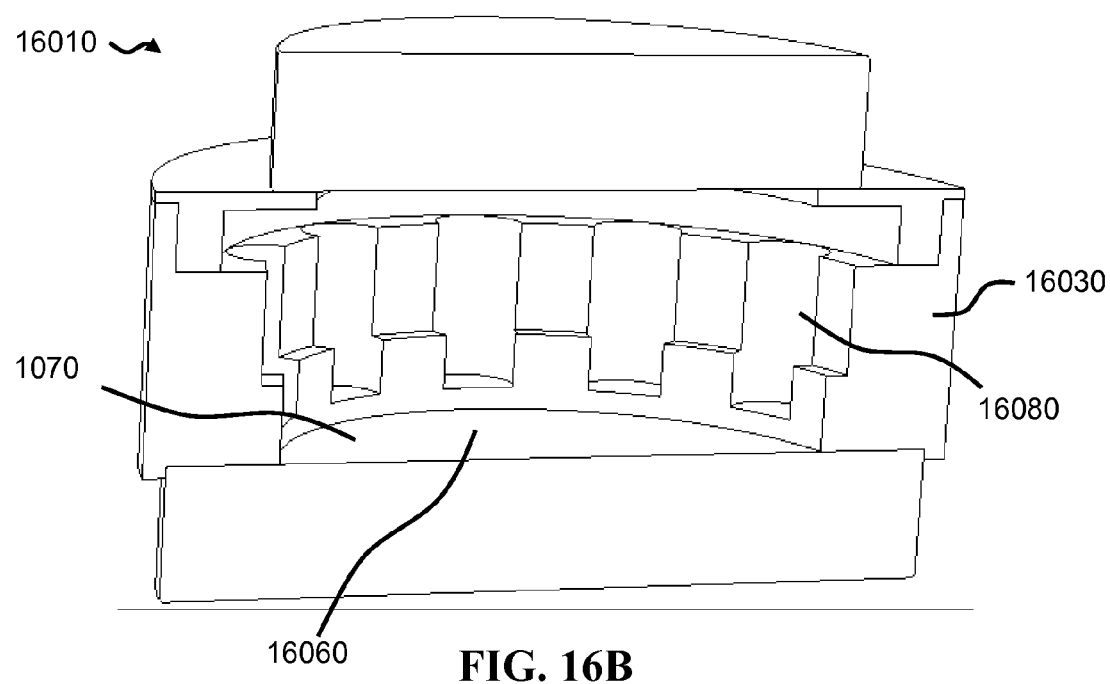
FIG. 16B is a three-dimensional cross-sectional view of a lens member according to an embodiment of the present invention having two nested chambers, specifically showing a sealed housing with fluid passages.

FIG. 16B shows an embodiment of the sealed housing 16010. A first fluid 1070, which may be preferably incompressible, may be disposed in external chamber 16060. In one embodiment of the present device, one or more fluid passages 16080 may be disposed along the internal sidewalls of first support member 16030.

Figure 16C:
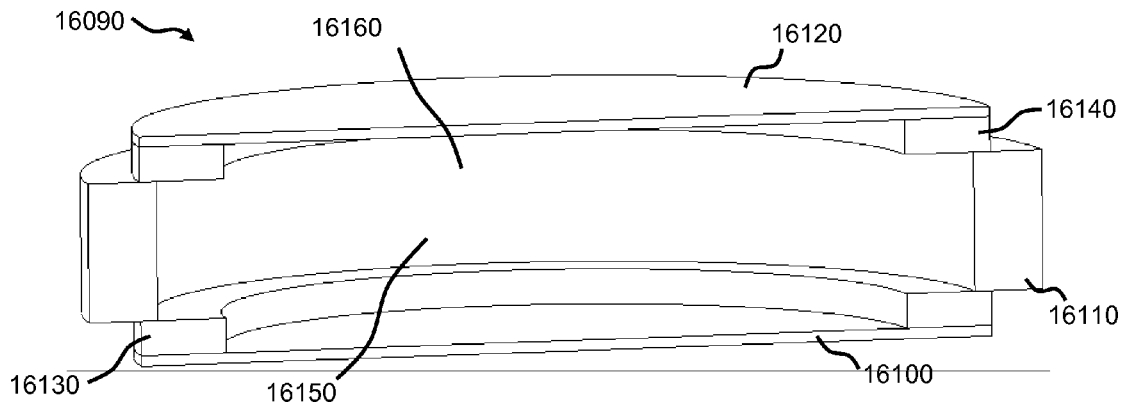
FIG. 16C is a three-dimensional cross-sectional view of an internal lens member according to an embodiment of the present invention.

FIG. 16C shows one embodiment of an internal lens member 16090. Internal lens member 16090 may be similar to lens members described previously (for example, see FIG. 1A). Internal lens member 16090 may be disposed internally to external chamber 16060 (see FIG. 16D). Internal lens member 16090 may be comprised of a third optical surface 16100. Third optical surface 16100 may be disposed in communication with a third support member 16110. Third support member 16110 may be preferably at least partially rigid, however, it is understood that it may be resilient (or "compliant") as well. A fourth optical surface 16120 may be disposed in communication with third support member 16110. Optical surfaces 16100, 16120 may be preferably comprised of an at least partially resilient material (for example, elastomer, glass, plastic or polymer membranes). Optionally, one or more of a fourth support member 16130 and a fifth support member 16140 may be disposed in communication with one or more of optical surfaces 16100, 16120 and third support member 16110. It is understood that one or more of support members 16110, 16130, 16140 and optical surfaces 16100, 16120 may be formed as a unitary part. Thus, an internal chamber 16150 may be disposed internally to internal lens member 16090 and may be bounded by support members 16110, 16130, 16140 and optical surfaces 16100, 16120. A second fluid 16160 may be disposed in internal chamber 16150 preferably comprises an at least partially compressible fluid (i.e., such as air or gas, or alternatively, vacuum).

Figure 16D:
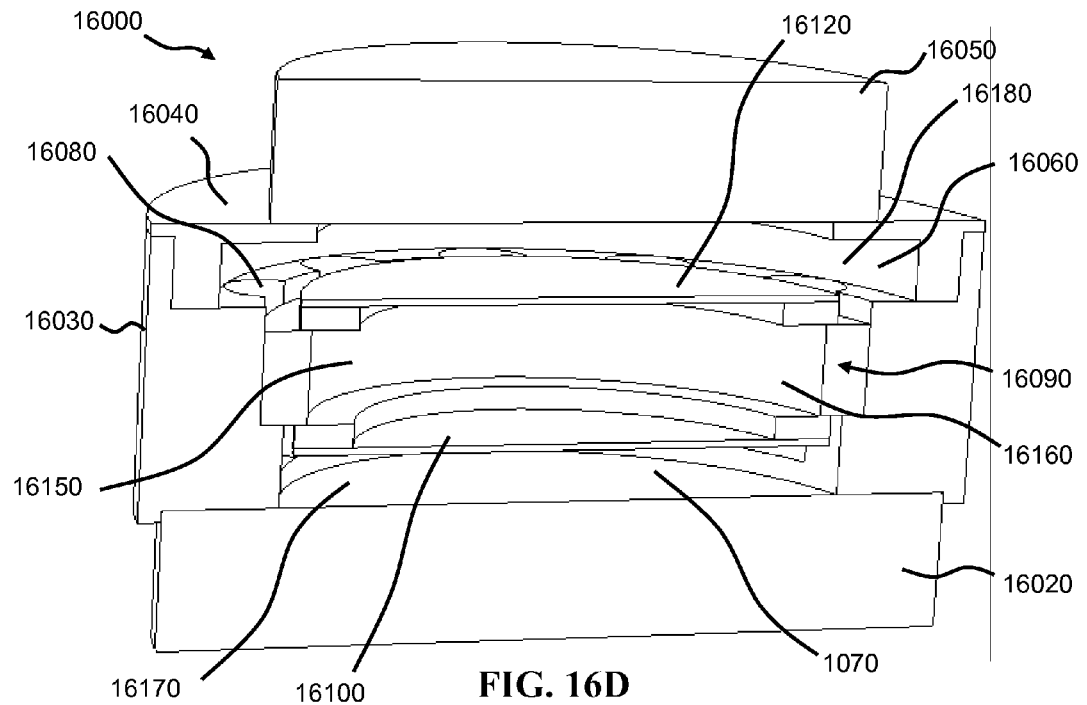
FIG. 16D is a three-dimensional cross-sectional view of a lens member having two nested chambers and internal lens member according to an embodiment of the present invention.

FIG. 16D shows an embodiment of the lens member 16000. Internal lens member 16090 may be disposed at least partially inside external chamber 16060. Passages 16080 serve to provide fluid communication within external chamber 16060 between a first region 16170 and a second region 16180. First region 16170 may be disposed proximally to first optical surface 16020 and second region 16180 may be disposed proximally to second optical surface 16050. Alternatively, passages 16080 may be disposed in other portions of lens member 16000 (i.e., such as along one or more of support members 16110, 16130 and 16140, see FIG. 16C). Lens member 16000 may be actuated by increasing the fluid pressure in external chamber 16060. For example, if the pressure in external chamber 16060 increases, first fluid 1070 (which may be incompressible) may force one or more of optical surfaces 16100, 16120 to bulge inward toward internal chamber 16150. Since second fluid 16160 may be compressible, it may allow the inward deflection of optical surfaces 16100, 16120, thereby adjusting the focal power of lens member 16000. The pressure in external chamber 16060 may be varied in a number of ways, such as: (a) using a remotely controlled pressure pump (which may be in fluid communication with external chamber 16060), or (b) using any convenient actuator to squeeze (or compress) second support member 16040 (which may be compliant in order to allow chamber compression). Such compliant second support member 16040 may alternatively include polymeric or metallic bellows structures. The resilience of one or more of second support member 16040, optical surfaces 16100, 16120 and second fluid 16160 provides a restoring force which opposes the actuation force. In this fashion, when the actuation force is removed the restoring force may cause lens member 16000 to return toward its non-actuated state.

Thermal Compensation.

It is known in the art that certain types of actuators exhibit sensitivity to temperature. For example, piezoelectric benders may suffer a change in maximum stroke of a few percent per degree C. More critically, the absolute position of the moving edge of the piezoelectric bender may vary by a significant fraction of its maximum stroke per degree C. This may be true regardless of whether the inner or outer edge is attached to the mounting structure. Such a dependence on temperature can have a severe impact on the performance of the actuator and the device to which it is applied.

Figure 17A:
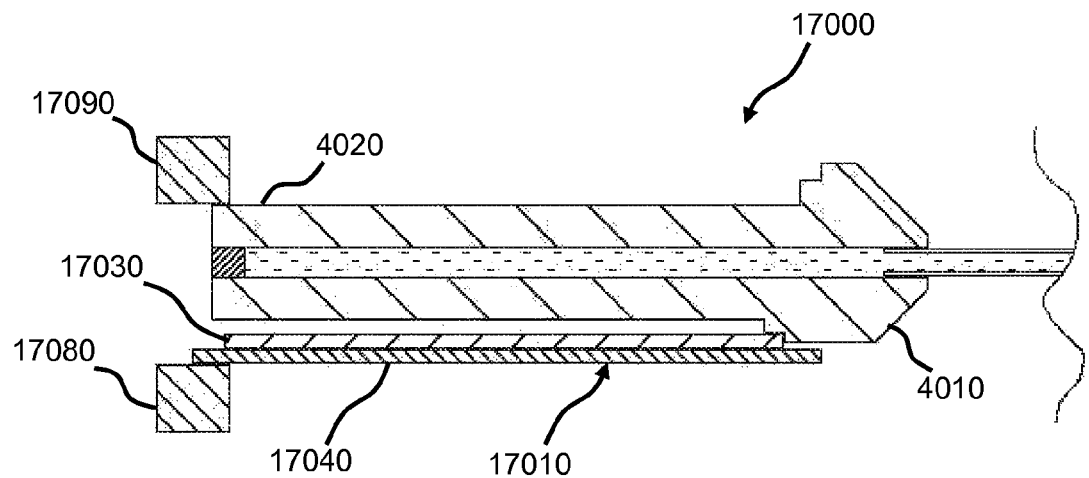
FIG. 17A is a cross-sectional view of a non-thermally-compensated lens system in a first thermal state according to an embodiment of the present invention.
Figure 17B:
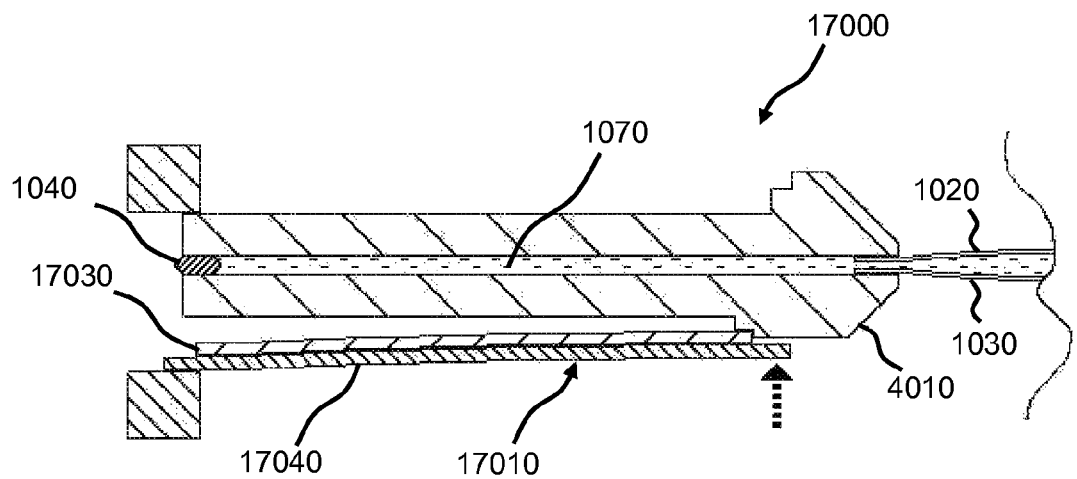
FIG. 17B is a cross-sectional view of a non-thermally-compensated lens system in a second thermal state according to an embodiment of the present invention.

By way of example, FIGS. 17A and 17B show how such temperature sensitivity may impact the performance of a lens system. In FIG. 17A, a lens member 17000 is substantially provided at a first temperature (or in a "first thermal state"; for example, room temperature). An actuator 17010 (such as a ring bender actuator) may include a piezoceramic plate 17030 which may be bonded to (or in communication with) a shim 17040. Bender actuators, ring bender actuators, piezoceramic plates and shims are known in the art and described previously (see, e.g., FIG. 3A and the associated description thereof). Lens member 17000 is provided and disposed such that its "lower" (or "first") side may be proximal to piezoceramic plate 17030. In this fashion, the inner edge of piezoceramic plate 17030 may be disposed in communication with plate 4010. The outer edge of shim 17040 may be disposed in communication with a first housing member 17080. Likewise, the outer "upper" (or "second") side of lens member 17000 (or plate 4020) may be disposed in communication with a second housing member 17090. (Note, housing members 17080, 17090 may be similar to housing members 3050, 3060 as described above). At first thermal state, actuator 17010 is shown in a first shape (for example, substantially flat).

By way of example, FIG. 17B illustrates how a change in temperature may affect the performance of lens member 17000. Actuator 17010 is now shown at a second temperature (or in a "second thermal state"; for example, several degrees Celsius above room temperature). Due to physical effects such as a mismatch in the coefficients of thermal expansion between piezoceramic plate 17030 and shim 17040, actuator 17010 may deform to a second shape. For example, the inner section of actuator 17010 may bend upward relative to its outer section (indicated by the dashed arrow). Such deformation of actuator 17010 may result in actuator 17010 applying a force to plate 4010 and a compressive force on lens member 17000. Such compressive force applied to lens member 17000 may thus result in one or more of the following: a deformation (for example, compression) of support member 1040; a displacement of at least a portion of fluid 1070; deformation of optical surfaces 1020, 1030; and a change in the optical properties (for example, the focal power) of lens member 17000.

Figure 17C:
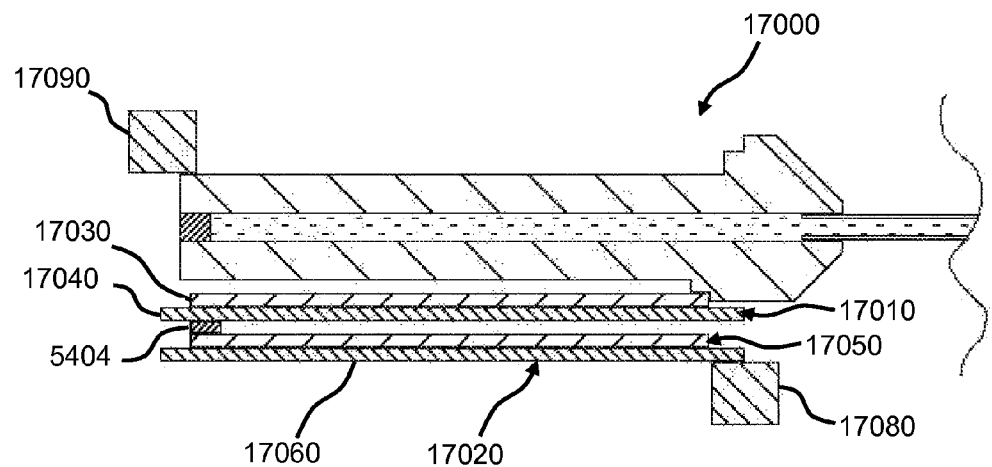
FIG. 17C is a cross-sectional view of a unilateral thermally-compensated lens system in a first thermal state according to an embodiment of the present invention.
Figure 17D:
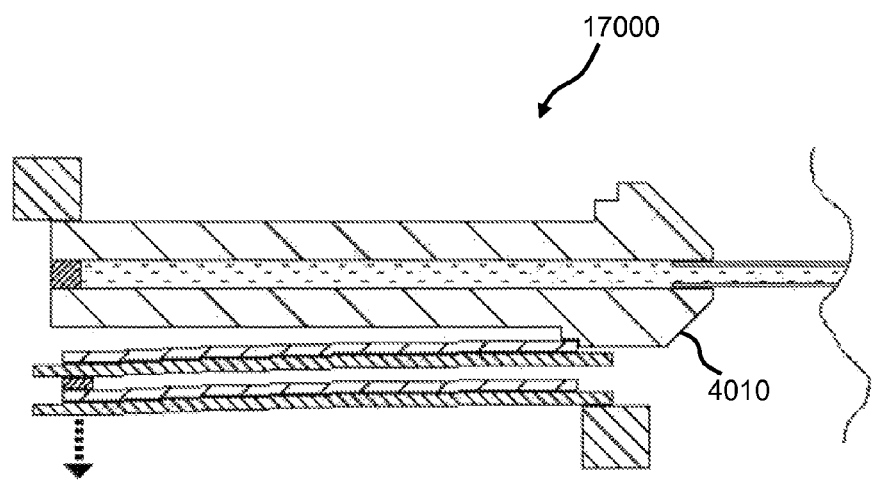
FIG. 17D is a cross-sectional view of a unilateral thermally-compensated lens system in a second thermal state according to an embodiment of the present invention.

FIGS. 17C and 17D show an alternative embodiment of the lens member 17000 wherein a pair of actuators 17010, 17020 may be arranged in a fashion that serves to compensate for their dependence on temperature (other equivalent terms could be used such as "temperature-compensated", "temperature-compensating", "thermally compensated", "temperature-independent", "temperature insensitive" or "athermal" arrangement). (Note, actuators 17010, 17020 may be similar to actuators 3020, 3030 as described above). Second ring bender actuator (or "second actuator" or "actuator") 17020 may include a second piezoceramic plate 17050 bonded to (or in communication with) a second shim 17060. An actuator spacer ring 5404 may be disposed in communication with the outer sections (or edges) of first shim 17040 and a second piezoceramic plate 17050. The inner edge of a second shim 17060 may be in communication with housing member 17080. FIG. 17C shows lens member 17000 in a first thermal state (for example, in first thermal state, actuators 17010, 17020 are substantially flat).

FIG. 17D shows lens member 17000 in a second thermal state. For example, in second thermal state, actuators 17010, 17020 may be deformed (indicated by the dashed arrow). However, in the present configuration, actuators 17010, 17020 may be selected such that their thermal deformations are substantially identical, and thus their net thermal deformation may be compensated. In this fashion, substantially zero change in net force may be applied to lens member 17000 due to the change in temperature, and hence, substantially no change in optical performance due to such thermal deformation (or distortion) of actuators 17010, 17020. In the present configuration, actuators 17010, 17020 may be disposed on the same side of lens member 17000 (i.e., in communication with plate 4010). In this fashion, we may refer to this general arrangement as "unilateral" thermally-compensated actuation as a way of conveying that actuators 17010, 17020 are disposed on the same side of lens member 17000. Advantages of such a unilateral thermally-compensated actuation configuration may include a lack of parasitic thermal motion of lens member 17000. In this context, the term "parasitic" may refer to a slight translation of the lens member 17000 which is not associated with an intentional optical effect. Disadvantages of this approach may include a reduction in the bandwidth of the device. This may be due to a slight center-of-gravity motion of lens member 17000 during actuation.

Figure 17E:
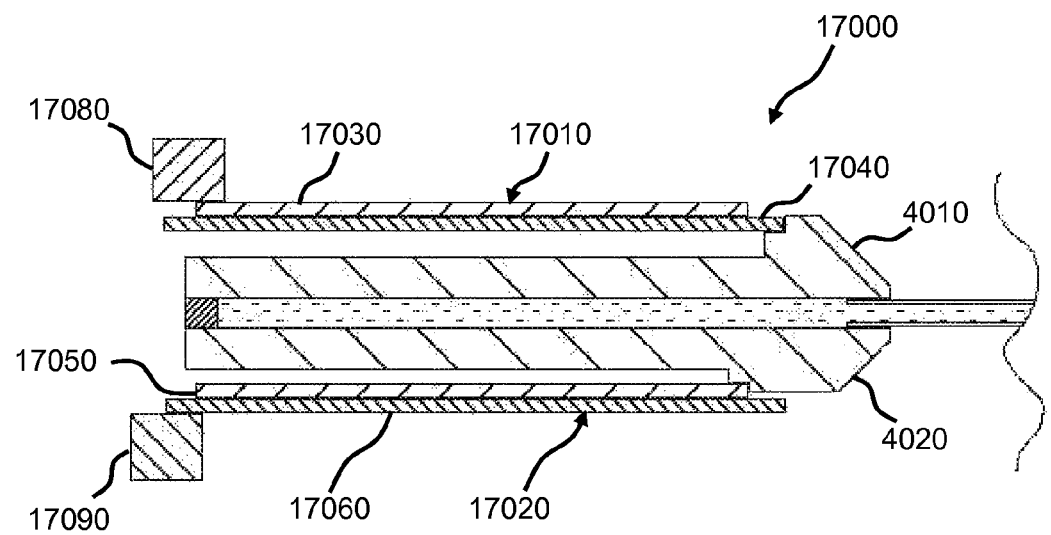
FIG. 17E is a cross-sectional view of a bilateral thermally-compensated lens system in a first thermal state according to an embodiment of the present invention.
Figure 17F:
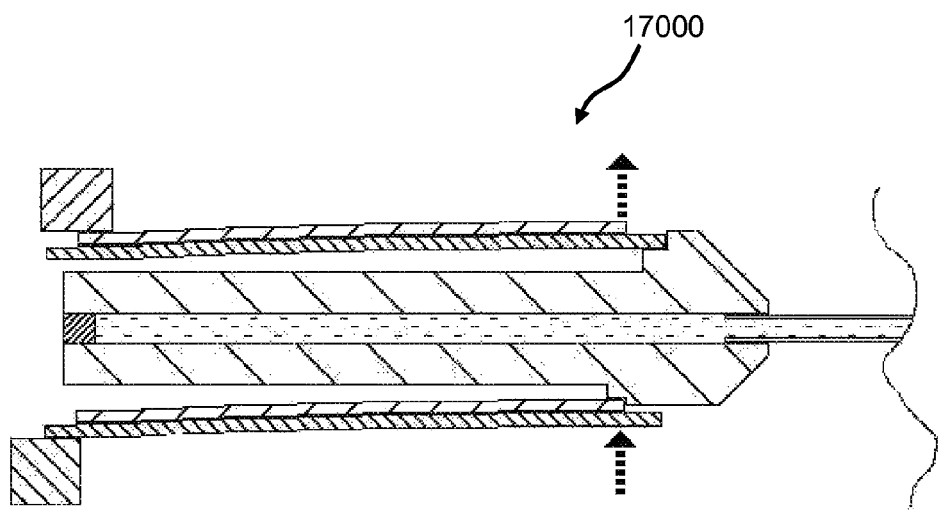
FIG. 17F is a cross-sectional view of a bilateral thermally-compensated lens system in a second thermal state according to an embodiment of the present invention.

FIGS. 17E and 17F show another alternative temperature-compensated embodiment of the lens member 17000. FIG. 17E shows lens member in first thermal state wherein actuators 17010, 17020 may substantially flat. The outer edge of first piezoceramic plate 17030 may be in communication with housing member 17080, and the inner edge of a first shim 17040 may be in communication with plate 4010. Likewise, inner edge of second piezoceramic plate 17050 may be in communication with plate 4010, and the outer edge of second shim 17060 may be in communication with housing member 17090.

FIG. 17F shows lens member 17000 in a second thermal state wherein actuators 17010, 17020 may be deformed (indicated by the dashed arrows). Similar to the previous thermally-compensated configuration, the net thermal deformation of actuator 17010, 17020 may be compensated and substantially zero net force may be applied to lens member 17000 due to a change in temperature.

In FIGS. 17E and 17F, actuators 17010, 17020 are disposed on opposing sides of lens member 17000 (i.e., in communication with plates 4010, 4020). In this fashion, we may refer to this general arrangement as "bilateral" thermally-compensated actuation as a way of conveying that actuators 17010, 17020 are disposed on opposite (or both) sides of lens member 17000 in a thermally compensated arrangement. Advantages of bilateral thermally-compensated actuation may include an increase in bandwidth (i.e., an increase in available speed of actuation or resonant frequency of the device). This may be due to a lack of center-of-gravity motion of lens member 17000 during actuation, a result of the case when actuators 17010, 17020 apply substantially equal forces on opposite sides of the lens member. Disadvantages of this approach may include parasitic thermal motion resulting in a slight offset (or displacement or shift) in the position of lens member 17000 (indicated by dashed arrows in FIG. 17F) due to slight changes in shape of actuators 17010, 17020 resulting from a change in temperature. That is, although actuators 17010, 17020 may be arranged to avoid a variation in focal length of lens member 17000 due to changes in temperature, there may exist a slight offset (or displacement) of the location of lens member 17000 due to such changes in temperature and configuration of actuators 17010, 17020.

Figure 17G:
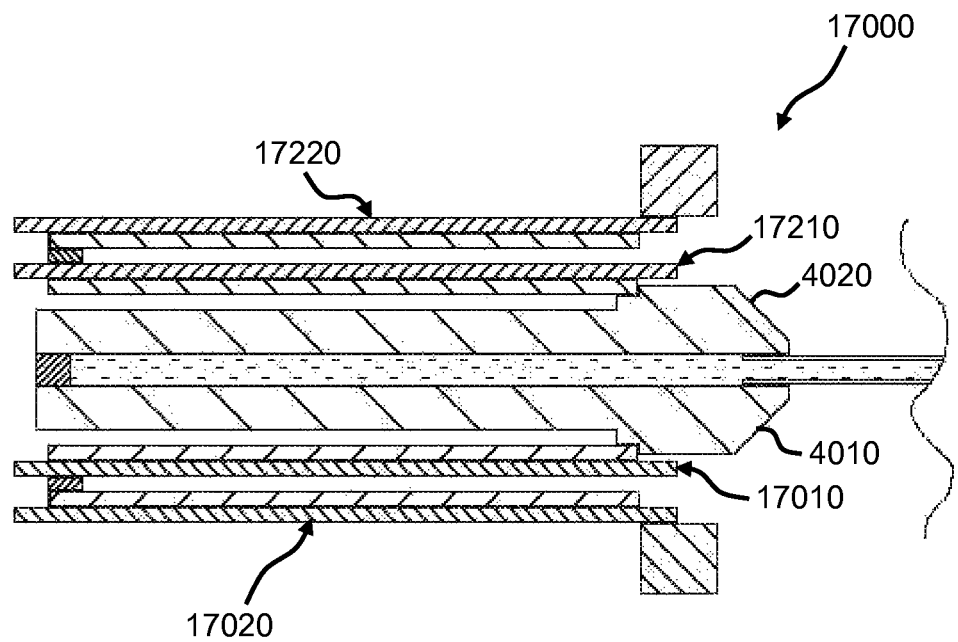
FIG. 17G is a cross-sectional view of a bilateral thermally-compensated lens system and capable of providing a reduction in thermal parasitic displacement in a first thermal state according to an embodiment of the present invention.
Figure 17H:
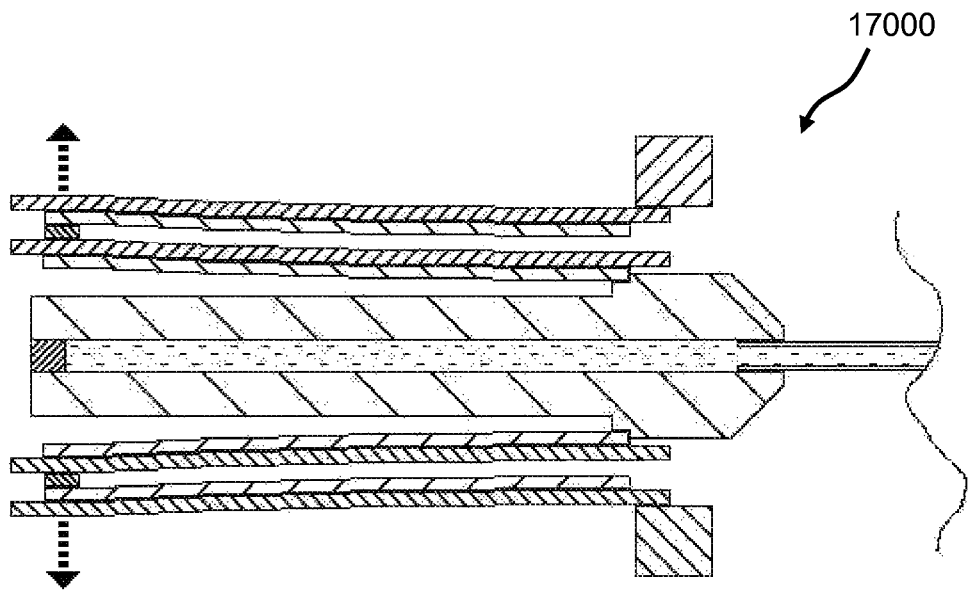
FIG. 17H is a cross-sectional view of a bilateral thermally-compensated lens system and capable of providing a reduction in thermal parasitic displacement in a second thermal state according to an embodiment of the present invention.

FIGS. 17G and 17H show an alternative bilateral temperature-compensated embodiment of the lens member 17000 that substantially reduces (or eliminates) parasitic thermal displacement of the center of mass of lens member 17000 (as described in association with FIG. 17F above). In the present configuration, four actuators 17010, 17020, 17210, 17220 may be disposed in pairs (i.e., actuator pair 17010, 17020 and actuator pair 17210, 17220). Actuator pair 17010, 17020 may be disposed proximal to a first side of lens member 17000 and actuator pair 17210, 17220 may be disposed proximal to a second side of lens member 17000. In this fashion, actuator pair 17010, 17020 may be disposed proximal to plate 4010 similar to the configuration described in association with FIG. 17C above. Likewise, actuator pair 17210, 17220 may be disposed proximal to plate 4020, also in a fashion similar to the configuration described in association with FIG. 17C above. FIG. 17G shows actuators 17010, 17020, 17210, 17220 in a first thermal state wherein they may be substantially flat.

FIG. 17H shows lens member in a second thermal state wherein actuators 17010, 17020, 17210, 17220 may be substantially deformed (indicated by dashed arrows). In the present configuration, actuator pair 17010, 17020 and actuator pair 17210, 17220 may be arranged such that their respective thermal deformations are substantially identical and oriented in opposite directions (this is indicated by the dashed arrows pointing in opposite directions). As a result of the opposing directions of thermal deformation, the displacement of the center of mass of lens member 17000 due to changes in temperature (as described in association with FIG. 17F above) may be substantially reduced or cancelled.

Figure 17I:
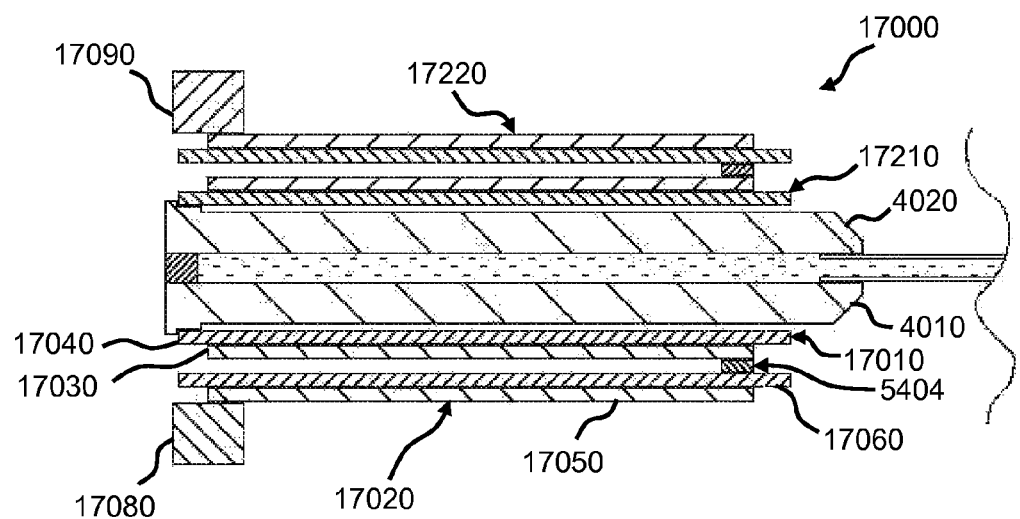
FIG. 17I is a cross-sectional view of an alternate configuration of a bilateral thermally-compensated lens system and capable of providing a reduction in thermal parasitic displacement in a first thermal state according to an embodiment of the present invention.
Figure 17J:
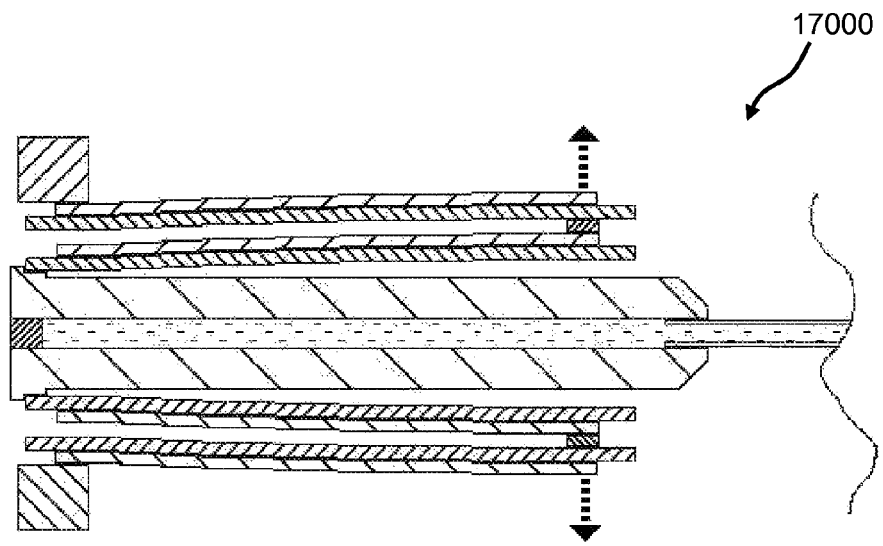
FIG. 17J is a cross-sectional view of an alternate configuration of a bilateral thermally-compensated lens system and capable of providing a reduction in thermal parasitic displacement in a second thermal state according to an embodiment of the present invention.

FIGS. 17I and 17J show yet an alternative bilateral temperature-compensated embodiment of the lens member 17000 that again substantially reduces (or eliminates) thermal displacement of the center of mass of lens member 17000. Previously, in FIGS. 17G and 17H, actuator pair 17010, 17020 and actuator pair 17210, 17220 were disposed such that a portion of their inner edges were mounted in communication with plates 4010, 4020. The present configuration is similar that of FIGS. 17G and 17H, however, now a portion of the outer edges of actuator pair 17010, 17020 and actuator pair 17210, 17220 may be mounted in communication with plates 4010, 4020. In the present configuration of FIG. 17I, actuator pair 17010, 17020 is disposed as follows. The outer edge of first shim 17040 may be mounted in communication with the outer section of plate 4010. The inner section of first piezoceramic plate 17030 may be disposed in communication with a first side of first actuator spacer ring 5404. Likewise, inner section of second shim 17060 may be disposed in communication with a second side of first actuator spacer ring 5404. Outer section of second piezoceramic plate 17050 may be mounted in communication with housing member 17080. Likewise, actuator pair 17210, 17220 may be disposed in a fashion similar to that of actuator pair 17010, 17020 on the opposite side of lens member (i.e., proximal to plate 4020 and housing member 17090).

FIG. 17J shows lens member in a second thermal state wherein actuators 17010, 17020, 17210, 17220 may be substantially deformed (indicated by dashed arrows). In a fashion similar to that described in association with FIG. H above, actuator pair 17010, 17020 and actuator pair 17210, 17220 may be arranged such that their respective thermal deformations are substantially identical and oriented in opposite directions. In this fashion, actuator pair 17010, 17020 and actuator pair 17210, 17220 can provide thermal compensation as well as substantially reduce or eliminate the parasitic displacement of the center of mass of lens member 17000 due to changes in temperature.

In the thermally-compensated embodiments of lens member 17000 described above, an applied voltage may be provided to actuate (i.e., control the pressurization and optical properties of) lens member 17000. However, as discussed above, changes in temperature may result in a slight (i.e., typically in the range of 1 to 100 microns) translation of lens member 17000 along its axis (i.e., the axis substantially normal to the large surfaces of ring bender actuators 17010, 17020; or, the axis substantially parallel to the axis of displacement of the actuators). In this fashion, the temperature-dependent change in absolute position of one actuator may substantially compensate for that of the other. Such a thermally-compensated actuator pair (or "bender pair") may achieve the typical force and/or stroke of two actuators acting individually (for example, two series-mounted actuators). Likewise, the employment of two thermally-compensated actuator pairs (as described in association with FIGS. 17G and 17I above) may achieve the typical force and/or stroke of four individual actuators (which may be mounted in series). Further, such reduced sensitivity to temperature may be optimized over desired ranges in temperature. For example, the actuators may be configured to provide thermal compensation over typical temperature ranges associated with consumer electronics products, such as: −5 to +45 degrees Celsius (normal operation or "full specification"); −20 to +75 degrees Celsius (degraded performance); or −30 to +80 degrees Celsius (storage).

To increase force, the inventive temperature compensation embodiments disclosed above may also be augmented with additional actuators (such as benders) arranged in "nested" fashion. For example, one actuator's convexity will fit against another's concavity. This, and other variations known to those skilled in the art, may be practiced without departing from the scope of the inventive concepts taught herein.

Drive Circuitry.

FIGS. 18A, 18B, 18C, 18D, and 18E show embodiments of thermally-compensated lens members similar to those described in association with FIGS. 17C, 17D, 17E, 17F, 17G, 17H, 17I, and 17J, above, and further show electronic drive circuits. The electronic drive circuits may be configured to provide first and second voltages to first and second actuators. The first and second voltages may be linearly dependent on each other. In this context, each of said first and second actuators (or "benders" or "ring benders") may consist of, or be construed to consist of, stacks of "nested" actuators as described above. In such a stack, the electrode of the ceramic element belonging to one actuator may be brought into electrical and mechanical communication with the metal shim belonging to an adjacent actuator. Such a stack may be interfaced with the rest of the device as if it consisted of just one actuator. As will be obvious to those skilled in the art, a voltage applied across such a stack of actuators, will distribute itself to each of the component benders in accordance to their capacitance. This way, a single stack voltage can be used to drive each member of the stack.

Figure 18A:
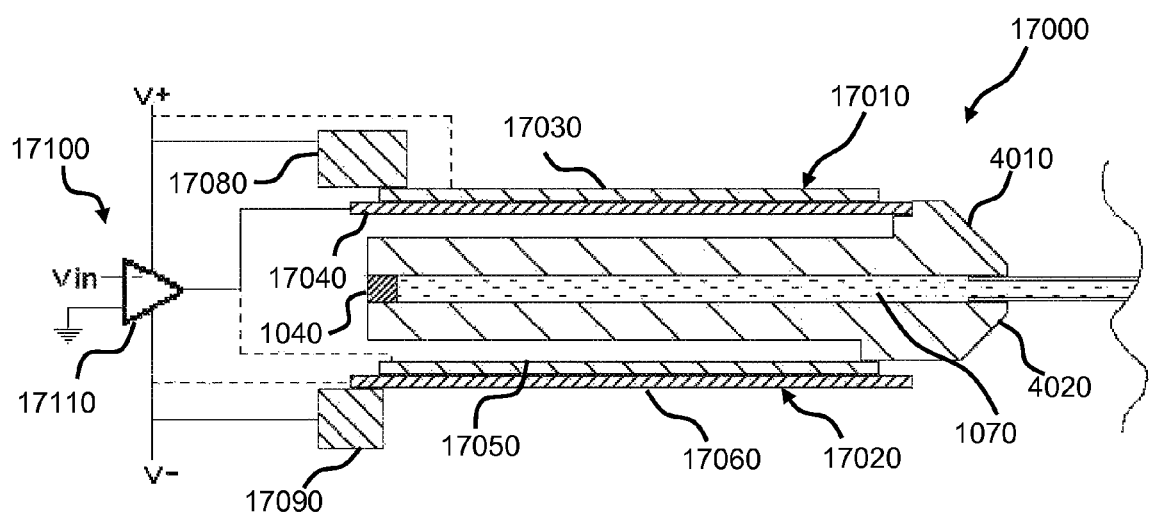
FIG. 18A is a cross-sectional view of a lens system with thermally-compensated actuators in a first bilateral configuration and employing a control circuit according to an embodiment of the present invention.

FIG. 18A shows a bilateral thermally-compensated lens member 17000 similar to that described in association with FIG. 17E above. As an example of a driver circuit for actuators 17010, 17020 an electrical (or control) circuit 17100 may utilize a "push-pull" configuration as understood in the art and described previously (see FIG. 10B). In this configuration, the output of a high voltage amplifier 17110 may be in electrical communication (as indicated by solid and dashed lines) with both first shim 17040 and second piezoceramic plate 17050. Such electrical communication may be achieved by directly connecting both first shim 17040 and second piezoceramic plate 17050 to the output of amplifier 17110. (Alternatively, first shim 17040 or second piezoceramic plate 17050 may be connected to the output of amplifier 17110. Plate members 4010, 4020 and one or more of support member 1040 and fluid 1070 may be electrically conductive.) A positive rail of the amplifier 17110 may be connected to first piezoceramic plate 17030. (Alternatively, the positive rail maybe directly connected to first housing member 17080. First housing member 17080 may be electrically conductive and disposed in electrical communication with first piezoceramic plate 17030.) Likewise, a ground of the amplifier 17110 may be then connected to second shim 17060. (Alternatively, the ground maybe directly connected to second housing member 17080. Second housing member 17090 may be electrically conductive and disposed in electrical communication with second shim 17060.)

Figure 18B:
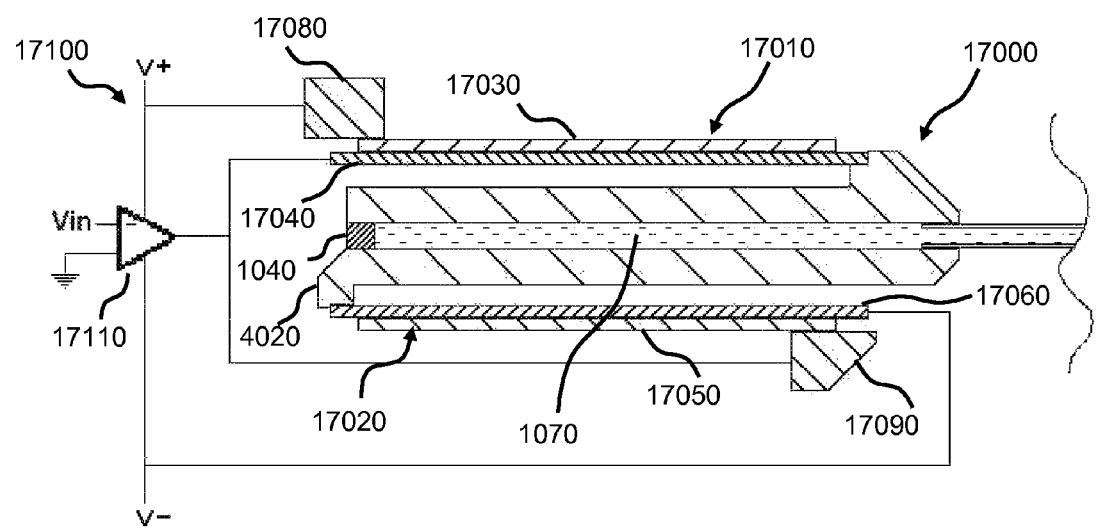
FIG. 18B is a cross-sectional view of a lens system with thermally-compensated actuators in a second bilateral configuration and employing a control circuit according to an embodiment of the present invention.

FIG. 18B shows a bilateral thermally-compensated lens member 17000 similar to that described in association with FIGS. 18A and 17E above. However, in the present embodiment, actuator 17020 is now flipped upside-down such that second shim 17060 may be oriented proximal to lens member 17000. Further, inner section (or edge) of second piezoceramic plate 17050 may be mounted to (or in communication with) housing member 17090, and outer section of second shim 17060 may be disposed (or mounted) in communication with plate 4020. A push-pull circuit 17100 may be employed for driving lens member 17000. In this configuration, the output of the amplifier 17110 may be disposed in electrical communication with first shim 17040 and second piezoceramic plate 17050. The positive rail of the amplifier 17110 may be disposed in electrical communication with first piezoceramic plate 17030. The ground of the amplifier 17110 may be disposed in electrical communication with second shim 17060. In the present embodiment, it may be preferable that one or more of support member 1040 (and fluid 1070) and plates 4010, 4020 are substantially electrical insulators.

Figure 18C:
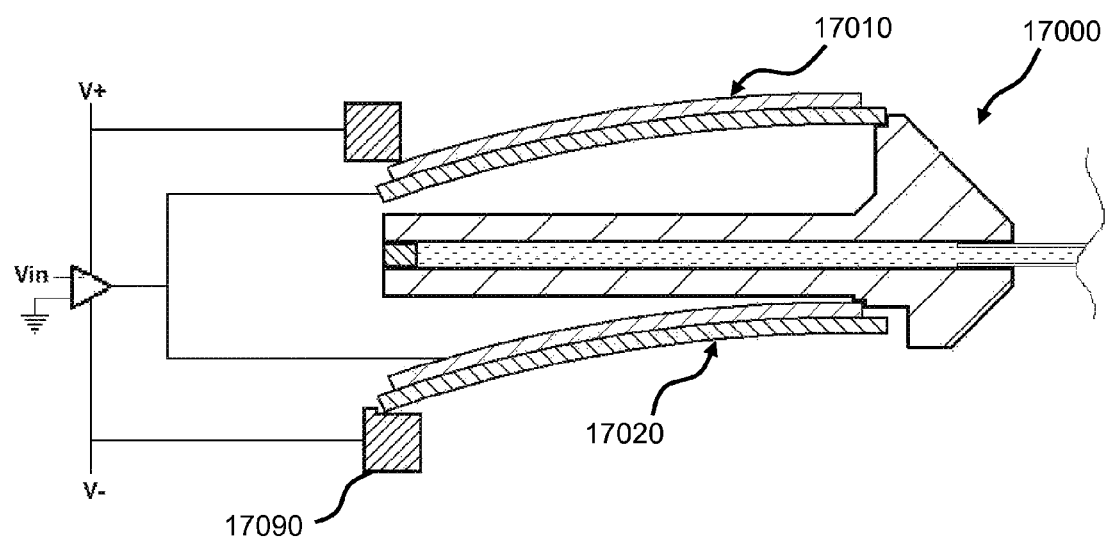
FIG. 18C is a cross-sectional view of a lens system with thermally-compensated pre-stressed actuators in a first bilateral configuration and employing a control circuit according to an embodiment of the present invention.

FIG. 18C shows an alternative embodiment of the lens member 17000 similar to that described in association with FIG. 18A. In the present embodiment actuators 17010, 17020 may be ring-shaped (i.e., annular disk shaped) pre-stressed piezoelectric bender actuators. Pre-stressed piezoelectric bender actuators (such as lightweight piezo-composite curved actuators (or "LIPCA"), and THUNDER™) are understood in the art and indicated in FIG. 18C by the curvature of actuators 17010, 17020.

Figure 18D:
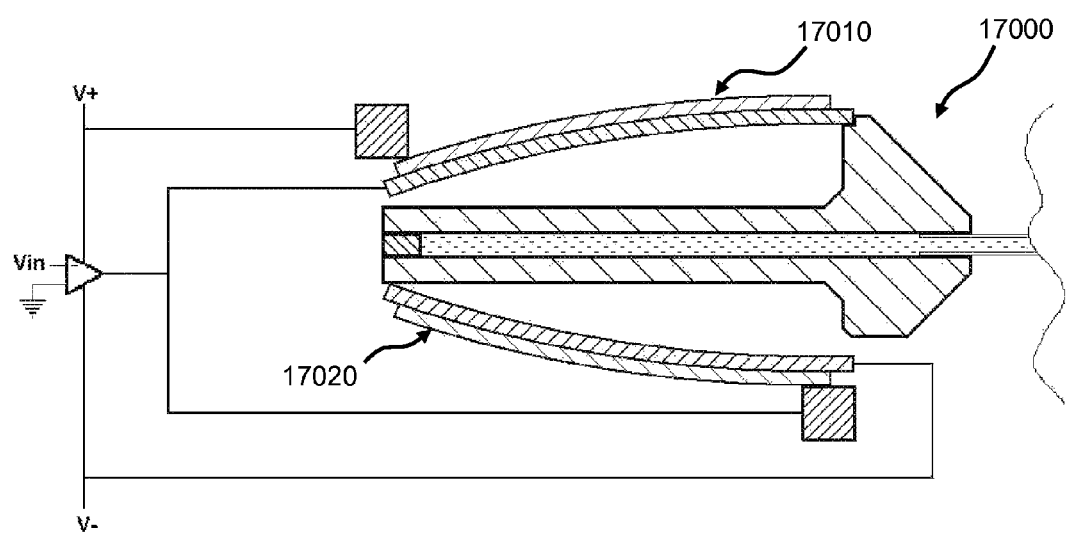
FIG. 18D is a cross-sectional view of a lens system with thermally-compensated pre-stressed actuators in a second bilateral configuration and employing a control circuit according to an embodiment of the present invention.

FIG. 18D shows an alternative embodiment of the lens member 17000, similar to that described in association with FIG. 18B, wherein actuators 17010, 17020 may be pre-stressed piezoelectric ring bender actuators as understood in the art.

Figure 18E:
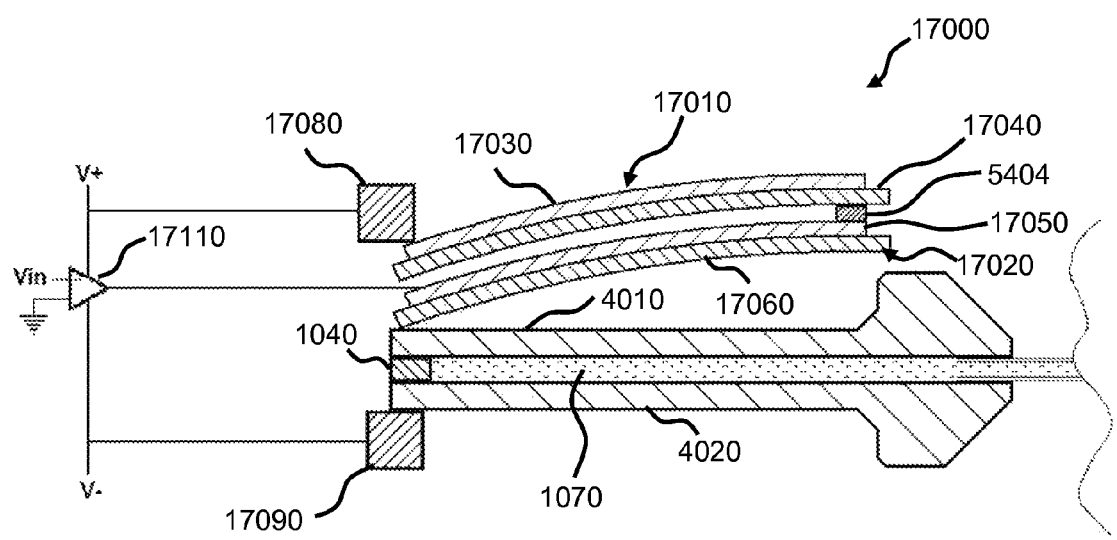
FIG. 18E is a cross-sectional view of a lens system with thermally-compensated pre-stressed actuators in a unilateral configuration and employing a control circuit according to an embodiment of the present invention.

FIG. 18E shows an alternative thermally-compensated embodiment for the lens member 17000, similar to that described in association with FIG. 17I above, which is capable of also compensating for (or preventing) parasitic thermal offset of the position of the lens member (as discussed above). In FIG. 17I (described above), two actuator pairs were disposed with one pair on each side of lens member 17000. In the present embodiment, a single actuator pair 17010, 17020 may be provided on one side of lens member 17000 in a unilateral thermally-compensated configuration. As one example of a driver for the present embodiment, a push-pull amplifier, similar to ones described above, may be employed. In this fashion, a positive rail of the amplifier 17110 may be disposed in electrical communication with first piezoceramic plate 17030; as discussed above, this may be accomplished by direct connection or via a conductive first housing member 17080. Similarly, the ground of the amplifier 17110 may be disposed in electrical communication with second shim 17060. To accomplish this, the amplifier ground may be disposed directly in electrical communication with second shim 17060. Alternatively, electrical communication between amplifier ground and second shim 17060 may achieved via conductive second housing member 17090, conductive plates 4010, 4020 and conductive support member 1040. The output of amplifier 17110 may be disposed in electrical communication with second piezoceramic plate 17050 and first shim 17040. To accomplish this, the amplifier output may be disposed directly in electrical communication with second piezoceramic plate 17050 and first shim 17040. Alternatively, amplifier output may be disposed in direct electrical communication with second piezoceramic plate 17050 or first shim 17040. Second piezoceramic plate 17050 and first shim 17040 may be disposed in electrical communication with each other via an electrically conductive actuator spacer ring 5404.

Figure 18F:
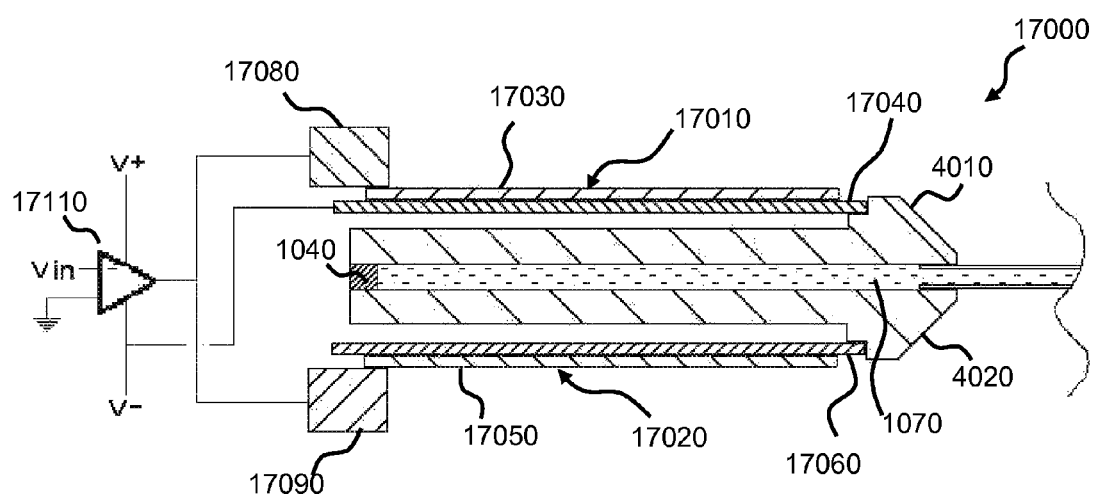
FIG. 18F is a cross-sectional view of a lens system with non-thermally-compensated actuators in a bilateral configuration and employing a control circuit according to an embodiment of the present invention.

FIG. 18F shows, by way of example, an alternative embodiment of the lens member 17000 that lacks thermal compensation. This bilateral configuration is similar to that described in association with FIG. 18A above, however, now actuator 17020 is flipped upside down. In this fashion, the inner section of second shim 17060 may be disposed in communication with plate 4020 and the outer section of second piezoceramic plate 17050 may be disposed in communication with housing member 17090. One optional drive circuit for the present (i.e., bilateral non-thermally-compensated) embodiment of lens member 17000 may include connecting actuators 17010, 17020 in parallel. In this configuration, the output of amplifier 17110 may be disposed in electrical communication with first piezoceramic plate 17030 and second piezoceramic plate 17050. This may be accomplished by directly connecting piezoceramic plates 17030, 17050 to the output of amplifier 17110. Alternatively, piezoceramic plate 17030 and second piezoceramic plate 17050 may be disposed in electrical communication with the output of amplifier 17110 via conductive housing members 17080, 17090. The ground of amplifier 17110 may be disposed in electrical communication with first shim 17040 and second shim 17060. This may be accomplished by directly connecting first shim 17040 and second shim 17060 to the output of amplifier 17110. Alternatively, first shim 17040 or second shim 17060 may be connected to the output of amplifier 17110. First shim 17040 and second shim 17060 may be disposed in electrical communication with each other via conductive plates 4010, 4020 and conductive support member 1040 (or conductive fluid 1070). The present embodiment may be considered a "bilateral non-thermally compensated" arrangement. It is understood that unilateral non-thermally compensated arrangements (as previously described) may also be employed in a similar fashion.

Figure 19:
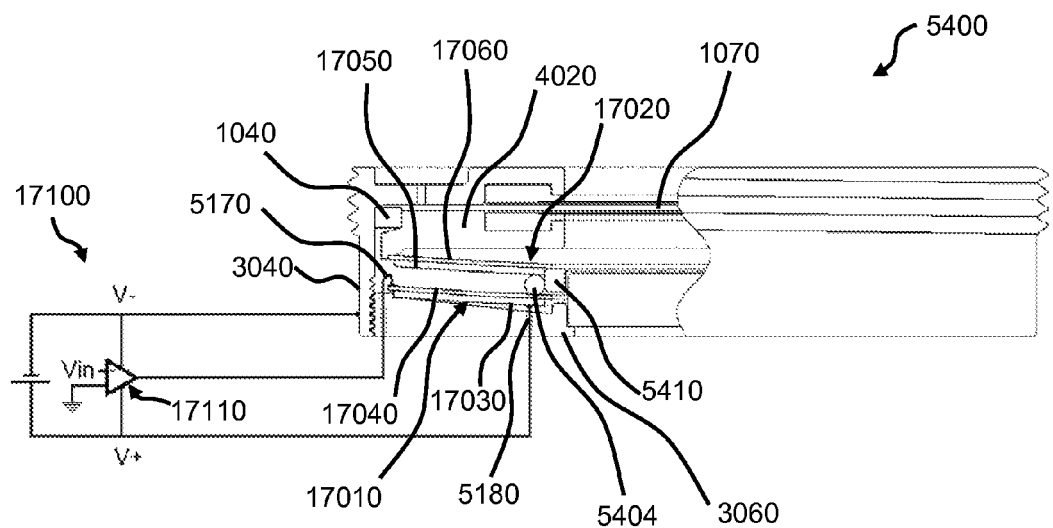
FIG. 19 is a semi-exposed cross-sectional view of a lens system with actuators disposed in a unilateral configuration and support member and plates disposed in a shear-strain configuration and employing a control circuit according to an embodiment of the present invention.

FIG. 19 shows an embodiment of the lens system 5400, similar to the one depicted in FIG. 5J, connected to a control circuit 17100. One example of a control circuit (or "electrical circuit" or "driving circuit") 17100 that may be provided for driving the present embodiment of lens system 5400 may utilize a push-pull configuration as understood in the art and described above. In this configuration, the positive rail of the amplifier 17110 ("V+") may be disposed in electrical communication with first piezoceramic plate 17030. In order to enable such electrical communication between positive rail of amplifier 17110 and first piezoceramic plate 17030, one or more electrode, similar to electrode member 5180 (previously described with respect to FIG. 5E) may be disposed proximal to housing member 3060. Likewise, the output of the amplifier 17110 may be disposed in electrical communication with a first shim 17040. In order to enable such electrical communication between the output of amplifier 17110 and first shim 17040, the output of amplifier 17110 may be disposed in electrical communication with an electrode, similar to electrode member 5170 (previously described with respect to FIG. 5E). Electrode member may be disposed in electrical communication with first shim 17040. First shim 17040 may be disposed in electrical communication with second piezoceramic plate 17050 via conductive actuator spacer ring 5404. Similarly, the ground of amplifier 17110 may be disposed in electrical communication with second shim 17060. This may be accomplished by connecting the ground of amplifier 17110 to electrically conductive housing member 3040. Second shim 17060 may be disposed in electrical communication with housing member 3040 via electrically conductive (or "conductive") support member 1040 (or fluid 1070) and conductive plate 4020. An actuator centering ring 5410 may be optionally disposed and may serve to help maintain the relative positions of one or more of actuators 17010, 17020, and actuator spacer ring 5404 during actuation. Optionally, actuator spacer ring 5404 and actuator centering ring 5410 may be formed as a single part.

While the above description for the control and implementation of actuators (for example, actuators 17010, 17020) has been focused on the use of piezoelectric ring benders, it is understood that other types of actuators may utilized. For example, the shims and piezoceramic plates of typical ring benders may be replaced by first and second electrical contact surfaces (or contacts or pads) when using electroactive polymer actuators.

It is understood that the invention described herein may take other embodiments. Other actuators may be used to compress, tension, shear or activate in other ways the lens member, including the following: electrostatic actuators; electromagnetic actuators; voice coils; piezoelectric; piezoceramic; electrostrictive; shape memory; shape memory alloy; dielectric electroactive polymer; electroactive polymer; conductive electro-active polymer; resonant motors; resonant piezoelectric motors; ultrasonic motors; ultrasonic piezoelectric motors; elliptical path motors; precessing motors; stepper motors; stepper motors combined with a mechanism for conversion of rotary into linear motion (i.e., such as a lead screw arrangement); other types of piezoelectric actuators (i.e., such as flextensional, recurve, prestressed, multilayer, bimorph, unimorph, piezoelectric ring bender, piezoelectric tube, piezoelectric sphere or spherical sector, piezoelectric c-block, piezoelectric multilayer stack, piezoelectric rings, etc.); and piezoelectric tubes combined in telescopic arrangements to multiply their axial stroke by the number of telescoping segments.

In order to gain additional actuation amplitude and/or additional actuation force, a plurality of actuators (for instance, ring benders) may be stacked before being brought into contact with the lens member.

It is also understood that the fluid or any fluidic element of the device may comprise fluid, gas, gel, plasma or solid chosen for its performance characteristics including optical, mechanical, physical and chemical properties.

It is also understood that multiple elements of the present device may be combined and formed as "integrated" (or "unitary" or "monolithic") units or parts.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for." Any feature described herein, whether preferred or not, may be combined with any other feature, whether preferred or not.

We claim:

1. A fluidic optical device, comprising:
a first optical surface that includes an deformable material;
a second optical surface that includes a rigid material;
an optical fluid disposed between first and second optical surfaces;
and an actuator disposed in communication with first optical surface;
wherein activation of actuator results in a deformation of first optical surface and displacement of optical fluid;
wherein deformation of first optical surface and displacement of optical fluid result in a change in an optical property of the device.

2. The device of claim 1 wherein deactivation of said actuator results in first optical surface and optical fluid returning substantially to their non-actuated states;
wherein the return of first optical surface and optical fluid to their non-actuated states results in a substantial reversal of said change in optical property of the device.

3. The device of claim 1 wherein said first optical surface is made at least partially of glass.

4. The device of claim 1 wherein said first optical surface is made at least partially of plastic.

5. The device of claim 1 wherein said second optical surface is made at least partially of glass.

6. The device of claim 1 wherein said actuator includes a piezoelectric actuator.

7. The device of claim 1 wherein said actuator includes a piezoelectric material bonded to first optical surface.

8. The device of claim 1 wherein said actuator includes a piezoelectric ring bender.

9. The device of claim 1 wherein said actuator is annular in shape an includes an aperture;
wherein said aperture provides an optical aperture for said device.

10. The device of claim 1 wherein said optical fluid includes a gel.

11. The device of claim 1 wherein said optical fluid includes a polymer.

12. The device of claim 1 wherein said optical fluid includes a liquid.

13. The device of claim 1 wherein said optical fluid includes a solid.

14. The device of claim 1 wherein deformation of first optical surface is substantially a bending deformation.

15. The device of claim 1 wherein deformation of first optical surface is substantially an elastic deformation.

16. The device of claim 1 wherein application of a voltage to said actuator results in said change in an optical property of the device.

17. The device of claim 1 wherein said optical property of the device is focal power.

18. A fluidic optical device, comprising:
   a first optical surface that includes an elastic material;
   a second optical surface that includes a rigid material;
   an optical fluid disposed between first and second optical surfaces;
   an actuator disposed in communication with first optical surface;
   wherein activation of actuator results in an elastic deformation of first optical surface and displacement of optical fluid;
   wherein deformation of first optical surface and displacement of optical fluid result in a change in an optical property of the device;
   and an image sensor configured to receive light transmitted through said first and second optical surfaces and optical fluid.

19. The device of claim 18 configured as part of a camera, zoom lens, lens system, eyeglasses, telescope, cell phone camera, mobile email device camera, web camera, video phone, microscope, magnifier, eyepiece, telephoto lens, zoom lens, mirror, anamorphic aspect ratio lens, projector, projection television, plasma display, di-chromatic optical element, theodolite, fiber optic coupler, radar system, currency authentication device, or video surveillance system.

* * * * *